United States Patent
Kim et al.

(10) Patent No.: US 8,311,011 B2
(45) Date of Patent: Nov. 13, 2012

(54) METHOD OF PERFORMING PROCEDURES FOR INITIAL NETWORK ENTRY AND HANDOVER IN A BROADBAND WIRELESS ACCESS SYSTEM

(75) Inventors: Yong Ho Kim, Bucheon-si (KR); Ki Seon Ryu, Seoul (KR); Jeong Ki Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 12/300,633

(22) PCT Filed: May 14, 2007

(86) PCT No.: PCT/KR2007/002360
§ 371 (c)(1),
(2), (4) Date: Apr. 6, 2009

(87) PCT Pub. No.: WO2007/133034
PCT Pub. Date: Nov. 22, 2007

(65) Prior Publication Data
US 2009/0323634 A1   Dec. 31, 2009

(30) Foreign Application Priority Data

| May 13, 2006 | (KR) | ............. 10-2006-0043181 |
| Jul. 7, 2006 | (KR) | ............. 10-2006-0063874 |
| Aug. 18, 2006 | (KR) | ............. 10-2006-0078284 |
| Sep. 4, 2006 | (KR) | ............. 10-2006-0084764 |

(51) Int. Cl.
*H04W 4/00* (2009.01)
(52) U.S. Cl. ............. 370/331; 370/311; 455/436

(58) Field of Classification Search ............. 370/311, 370/331, 329, 351, 310, 236, 208, 278, 395.52, 370/477, 431, 468, 335; 455/343.2, 574, 455/452.2, 439, 343.1, 343.4, 456.1, 432.1, 455/436, 452.1, 522, 450, 517, 442, 466; 709/219, 220
See application file for complete search history.

(56) References Cited

U.S. PATENT DOCUMENTS

| 2005/0197126 A1* | 9/2005 | Kang et al. ............. 455/442 |
| 2005/0197171 A1* | 9/2005 | Son et al. ............. 455/574 |
| 2005/0266848 A1* | 12/2005 | Kim ............. 455/436 |
| 2005/0272481 A1* | 12/2005 | Kim ............. 455/574 |
| 2005/0288022 A1* | 12/2005 | Ryu et al. ............. 455/439 |
| 2006/0029011 A1* | 2/2006 | Etemad et al. ............. 370/311 |
| 2006/0030305 A1* | 2/2006 | Lee et al. ............. 455/418 |
| 2006/0079235 A1  | 4/2006 | Kim |
| 2006/0084453 A1* | 4/2006 | Kim et al. ............. 455/517 |
| 2006/0099950 A1* | 5/2006 | Klein et al. ............. 455/439 |
| 2006/0160558 A1* | 7/2006 | Kim et al. ............. 455/522 |

(Continued)

FOREIGN PATENT DOCUMENTS

EP    1608197 A1   12/2005

(Continued)

*Primary Examiner* — Abdullah Riyami
(74) *Attorney, Agent, or Firm* — Lee, Hong, Degerman, Kang & Waimey

(57) ABSTRACT

Disclosed is a method of performing procedures for network entry of a mobile station in a broadband wireless access system. The method includes being allocated with transmission parameters from a base station, at least one time performing a request of an uplink band for transmission of an uplink management message to the base station, and receiving a downlink message for next procedure from the base station if the uplink band is not allocated even after the lapse of a preset time period.

3 Claims, 34 Drawing Sheets

U.S. PATENT DOCUMENTS

| | | | |
|---|---|---|---|
| 2006/0172742 A1* | 8/2006 | Chou et al. | 455/450 |
| 2006/0203712 A1* | 9/2006 | Lim et al. | 370/208 |
| 2006/0281436 A1* | 12/2006 | Kim et al. | 455/343.2 |
| 2007/0104179 A1* | 5/2007 | Srinivasan et al. | 370/351 |
| 2007/0133451 A1* | 6/2007 | Lee et al. | 370/318 |
| 2007/0211744 A1* | 9/2007 | Crocker et al. | 370/431 |
| 2008/0268844 A1* | 10/2008 | Ma et al. | 455/436 |
| 2008/0285500 A1* | 11/2008 | Zhang et al. | 370/315 |
| 2009/0137260 A1* | 5/2009 | Son | 455/466 |
| 2010/0150044 A1* | 6/2010 | Kim et al. | 370/311 |
| 2011/0103279 A1* | 5/2011 | Srinivasan et al. | 370/311 |

FOREIGN PATENT DOCUMENTS

| | | |
|---|---|---|
| WO | 2005/109768 | 11/2005 |
| WO | 2006/101369 A1 | 9/2006 |
| WO | 2007/014025 A2 | 2/2007 |

\* cited by examiner

METHOD OF PERFORMING PROCEDURES FOR INITIAL NETWORK ENTRY AND HANDOVER IN A BROADBAND WIRELESS ACCESS SYSTEM

CROSS-REFERENCE TO RELATED APPLICATIONS

This application is the National Stage filing under 35 U.S.C. 371 of International Application No. PCT/KR2007/002360, filed on May 14, 2007, which claims the benefit of earlier filing date and right of priority to Korean Application No. 10-2006-0084764, filed on Sep. 4, 2006, Korean Application No. 10-2006-0078284, filed on Aug. 18, 2006, Korean Application No. 10-2006-0063874, filed on Jul. 7, 2006, and Korean Application No. 10-2006-0043181, filed on May 13, 2006.

TECHNICAL FIELD

The present invention relates to a broadband wireless access system, and more particularly, to a method of performing procedures for initial network entry and handover of a mobile station in a broadband wireless access system.

BACKGROUND ART

A broadband wireless access system defines protocols of a media access control (MAC) layer and a physical (PHY) layer for point-to-multipoint connection between a base station and a mobile station. A protocol layer structure of the broadband wireless access system is as shown in FIG. 1. The uppermost of the MAC layer is a service specific convergence sublayer, and serves to convert packet data of various core networks of high level into common protocol data unit (PDU) data according to MAC standards and compress a header of a corresponding packet.

FIG. 2 illustrates procedures of performing network entry when a mobile station is initiated in an orthogonal frequency division multiple access (OFDMA) type broadband wireless access system according to the related art.

1. If a mobile station is initially turned on, the mobile station retrieves a downlink channel and receives downlink/uplink map message (DL/UL MAP) and downlink/uplink channel descriptor messages (DCD, UCD) to acquire synchronization with a base station.

2. If the mobile station receives uplink map message having allocation information of an initial ranging region, the mobile station selects one of initial ranging codes and transmits the selected ranging code to the base station by using the initial ranging region. The base station which has received the initial ranging codes notifies the mobile station of uplink transmission parameter adjustment values such as time offset, frequency offset and power offset through a ranging response message (RNG-RSP), and the mobile station which has received the uplink transmission parameter adjustment values adjusts uplink transmission parameters. The mobile station and the base station repeat such exchange procedures of the ranging codes and the ranging response message to allow the mobile station to perform uplink transmission parameter adjustment. If the uplink transmission parameter adjustment is successfully performed, the base station forwards a success code to a corresponding mobile station along with the ranging response message. At this time, the base station allocates non-contention based uplink resources to the corresponding mobile station through a specific uplink map information element (i.e., CDMA allocation UL-MAP IE) to allow the mobile station to transmit a ranging request message. The mobile station transmits a ranging request message having its MAC address by using the allocated uplink resources, and the base station which has received the ranging request message transmits a ranging response message (RNG-RSP) for allocation of a basic connection identifier (basic CID) and a primary CID to the corresponding mobile station.

3. The mobile station which has assigned with the basic CID and the primary CID through the ranging response message transmits to the base station SS basic capability request (SBC-REQ) message for negotiation of basic capability with the base station, and receives SS basic capability response (SBC-RSP) message from the base station. To transmit the SBC-REQ message, the mobile station should be allocated with an uplink band from the base station. To this end, the mobile station receives bandwidth request allocation region information from the base station through the uplink map, and transmits a randomly selected bandwidth request code to a corresponding uplink region. The base station which has received the bandwidth request code from the mobile station allocates the non-contention based uplink resources to the corresponding mobile station through the specific uplink map information element (CDMA allocation UL-MAP IE), and the mobile station which has received the non-contention based uplink resources transmits a bandwidth request header for requesting an uplink band required for transmission of the SBC-REQ message by using a corresponding uplink resource. The base station which has received the bandwidth request header allocates the uplink resource to the corresponding mobile station through the uplink map information element (UL-MAP IE). The mobile station transmits the SBC-REQ message by using the allocated uplink resource to forward its basic capability information to the base station. The base station which has received the SBC-REQ message forwards the SBC-RSP message to the corresponding mobile station to complete basic capability negotiation procedures between the mobile station and the base station. After transmitting the bandwidth request code to the base station, if the mobile station is assigned with the uplink resource that can transmit the SBC-REQ message, the mobile station can directly transmit the SBC-REQ message to the base station without transmission of the bandwidth request header.

4. The mobile station which has received the SBC-RSP message exchanges a privacy key management request (PKM-REQ) message and a privacy key management response (PKM-RSP) message for authentication and key exchange procedures with the base station. At this time, the mobile station may perform the bandwidth request code transmission of the procedure 3 above to request uplink resource allocation for transmission of the PKM-REQ message.

5. If the authentication and key exchange procedures between the mobile station and the base station is completed through exchange of the PKM-REQ message and the PKM-RSP message, the mobile station exchanges a registration request (REG-REQ) message and a registration response (REG-RSP) message with the base station to perform a registration procedure to the base station. At this time, in the same manner as the procedures 3 and 4, the mobile station may transmit the bandwidth request code to the base station to request the uplink band for transmission of the REG-REQ message.

6. The mobile station and the base station, which have completed the registration procedure through exchange of the REG-REQ message and the REG-RSP message, perform a procedure for setting Provisioned Service Flow of a network.

'Provisioned Service Flow' is performed in such a manner that the base station transmits a dynamic service addition request (DSA-REQ) message having a service quality related parameter and the mobile station forwards a dynamic service addition response (DSA-RSP) message to the base station in response to the DSA-REQ message. Simultaneously with completing setting of 'Provisioned Service Flow,' the mobile station and the base station complete an initial network registration procedure and are converted into to a normal operation status.

According to the related art, the number of several timers and the number of retransmission times are prescribed so that the mobile station can normally exchange a management message with the base station during initial network entry. For example, a timer T3 which waits for reception of the ranging response message from the base station is defined in the mobile station which has transmitted the ranging request message, and the mobile station retransmits the ranging request message by the number of retransmission times previously defined if the mobile station does not receive the ranging response message until a corresponding timer expires. If the mobile station does not receive the ranging response message from the base station until the number of retransmission times of the ranging request message exceeds the number of prescribed retransmission times, the mobile station determines abnormal status and tries to access another base station or restarts the initiation procedure for access to the corresponding base station.

According to the related art, the Parameters relating to the number of timers and the number of retransmission times required for the initiation procedure of the mobile station are prescribed as shown in Table 1.

TABLE 1

| System | Name | Time reference | Minimum value | Default value | Maximum value |
| --- | --- | --- | --- | --- | --- |
| BS | Initial Ranging Interval | Time between Initial Ranging regions assigned by the BS | | | 2 s |
| SS | Contention Ranging Retries | Number of retries on contention Ranging Requests | 16 | | |
| SS, BS | Invited Ranging Retries | Number of retries on inviting Ranging Requests | 16 | | |
| SS | Request Retries | Number of retries on bandwidth allocation requests | 16 | | |
| SS | Registration Request Retries | Number of retries on registration requests | 3 | | |
| BS | Tproc | Time provided between arrival of the last bit of a UL-MAP at an SS and effectiveness of that map | SC: 200 μs OFDM: 1 ms OFDMA: 10 OFDMA symbols | | |
| BS | SS Ranging Response Processing Time | Time allowed for an SS following receipt of a ranging response before it is expected to reply to an invited ranging request | 10 ms | | |
| SS, BS | DSx Request Retries | Number of Timeout Retries on DSA/DSC/DSD Requests | | 3 | |
| SS, BS | DSx Response Retries | Number of Timeout Retries on DSA/DSC/DSD Responses | | 3 | |
| SS | T1 | Wait for DCD timeout | | | 5 * DCD interval maximum value |
| SS | T2 | Wait for broadcast ranging timeout | | | 5 * ranging interval |
| SS | T3 | Ranging Response reception timeout following the transmission of a Ranging Request | | 200 ms | 200 ms |
| SS | T4 | Wait for unicast ranging opportunity. If the pending-until-complete field was used earlier by this SS, then the value of that field shall be added to this interval. | 30 s | | 35 s |
| BS | T5 | Wait for Uplink Channel Change response | | | 2 s |
| SS | T6 | Wait for registration response | | | 3 s |

TABLE 1-continued

| System | Name | Time reference | Minimum value | Default value | Maximum value |
|---|---|---|---|---|---|
| SS, BS | T7 | Wait for DSA/DSC/DSD Response timeout | | | 1 s |
| SS, BS | T8 | Wait for DSA/DSC Acknowledge timeout | | | 300 ms |
| BS | T9 | Registration Timeout, the time allowed between the BS sending a RNG-RSP (success) to an SS, and receiving a SBC-REQ from that same SS | 300 ms | 300 ms | |
| SS, BS | T10 | Wait for Transaction End timeout | | | 3 s |
| SS | T12 | Wait for UCD descriptor | | | 5 * UCD Interval maximum value |
| SS | T14 | Wait for DSX-RVD Timeout | | | 200 ms |
| SS | T18 | Wait for SBC-RSP timeout | | 50 ms | <<T9 |

Table 2 illustrates an example of initial ranging backoff window start parameter and initial ranging backoff end parameter which are included in an uplink channel descriptor message, wherein the parameters are used as minimum and maximum values of backoff window during initial ranging of the mobile station.

TABLE 2

| Name | Type (1 byte) | Length | Value |
|---|---|---|---|
| Initial_ranging_backoff_start | 198 | 1 | Initial backoff window size for initial ranging contention, expressed as a power of 2. Values of n range 0-15 (the highest order bits shall be unused and set to 0) This TLV shall be used in NBR-ADV message only to represent corresponding values that appear in UCD message fields. |
| Initial_ranging_backoff_end | 199 | 1 | Final backoff window size for initial ranging contention, expressed as a power of 2. Values of n range 0-15 (the highest order bits shall be unused and set to 0) This TLV shall be used in NBR-ADV message only to represent corresponding values that appear in UCD message fields. |

FIG. 3 is a block diagram illustrating the operation when random backoff is used during initial ranging of the mobile station.

Hereinafter, an example of transmitting initial ranging codes from the mobile station when an initial ranging backoff value is set to 13 during initial ranging of the mobile station will be described with reference to FIG. 3. In this case, since the mobile station randomly selects a backoff value within an initial backoff window, the size of the initial back off window in Table 1 should be set to be greater than 13.

When the mobile station selects the initial ranging backoff value of 13 as shown in FIG. 3, the mobile station transmits a ranging code to a fourteenth uplink ranging slot. In this way, the mobile station randomly selects the ranging slot for transmitting the ranging code within the ranging backoff window so as to minimize collision that may occur as several mobile stations simultaneously transmit the ranging code.

Furthermore, according to the related art, when the base station is restarted during normal operation, mobile stations recognize restart of the base station and perform initial network entry to the base station. To this end, the base station forwards the number of restart times of the base station to the mobile station through a downlink channel descriptor (DCD), and the mobile station, which has received the number of restart times, determines whether to perform initial network entry by determining whether the base station is restarted.

Table 3 is an example of a base station (BS) restart counter parameter, which is included in the downlink channel descriptor (DCD).

TABLE 3

| Name | Type (1 byte) | Length | Value (variable length) | PHY scope |
|---|---|---|---|---|
| BS Restart Count | 154 | 1 | The value is incremented by one whenever BS restarts (see 6.3.9.11). The value rolls over from 0 to 255. | All |

The base station increases a BS restart count parameter setting value by 1 as shown in Table 3 whenever restart is performed. After receiving the downlink channel descriptor message, the mobile stations compare a previous BS restart count value with the current value and determine whether the base station has been restarted. If the base station has been restarted, (i.e., if the BS restart count value is increased as compared with the previous BS restart count value) the mobile stations are again registered in the base station by performing initial network entry.

FIG. 4 illustrates problems that may occur between the initial ranging procedure and the basic capability negotiation procedure according to the related art.

As shown in FIG. 4, the mobile station is allocated with the basic CID and the primary CID from the base station through the initial ranging procedure. Then, the mobile station transmits the SBC-REQ message to the base station to initiate the basic capability negotiation. Also, the base station transmits the ranging response message to the mobile station to allocate the basic CID and the primary CID to the mobile station and then operates a timer T9 to wait for the SBC-REQ message from the mobile station. If the base station does not receive the SBC-REQ message until the timer expires, the base station releases the basic CID and the primary CID allocated to the mobile station, and the same CIDs can be allocated to another mobile station.

The mobile station should be allocated with uplink resources from the base station to transmit the SBC-REQ message to the base station. To this end, the uplink bandwidth request procedure is required. However, in this case, the uplink bandwidth request procedure may collide with another uplink bandwidth request procedure of another mobile station or the base station may not receive the uplink bandwidth request from the mobile station due to deterioration of channel quality. For this reason, the uplink bandwidth request may be retried. In other words, if the mobile station does not transmit the SBC-REQ message as the timer which is being operated within the base station expires in a state that the mobile station is not allocated with the uplink resources, the base station releases the CIDs allocated to the mobile station, and the mobile station may not recognize that the CIDs are released. If the base station allocates the corresponding CID to another mobile station, a problem may occur in that the same CID may be allocated to two different mobile stations.

FIG. 5 illustrates problems that may occur between the base station registration procedure and the 'Provisioned Service Flow' procedure when the mobile station is initiated in the related art.

The mobile station and the base station complete network entry procedure of the mobile station by completing the provisioned service flow procedure after the registration procedure is completed. However, as shown in FIG. 5, if the mobile station does not receive a service flow request message for a certain time period after receiving a registration response message from the base station, the mobile station is not converted into normal operation and gets into error status. Also, if the base station which has transmitted the service flow request message to the mobile station does not receive the service flow response message for a certain time period, the base station retransmits the service flow request message. If the base station does not receive the service flow response message even after transmitting the service flow request message by the number of given times, the base station becomes abnormal status. The related art fails to disclose the operation of the mobile station and the base station against the error status.

In the related art, examples of the initial network entry procedure of the mobile station include a spontaneous initial network entry procedure in which the mobile station spontaneously accesses the network or the base station having good channel environment, and an initial network entry procedure in which the mobile station performs the initial network entry procedure due to restart of the base station in a normal operation state registered in the base station.

In case of the spontaneous initial network entry procedure of the mobile station, the number of mobile stations which perform spontaneous initial network entry and a timing point when the network entry procedure is performed are randomly provided. In case of the initial network entry procedure of the mobile station due to restart of the base station, the number of mobile stations which perform the initial network entry and a timing point when the network entry procedure is performed can be predicted and can be concentrated in a moment.

Furthermore, the mobile station performs random backoff to avoid collision with another mobile station during initial ranging for the initial network entry procedure, and the base station forwards a backoff window value for the random backoff to the mobile station through the uplink channel descriptor (UCD) message.

Meanwhile, a broadband wireless access system based on IEEE802.16e system supports a power saving mode for minimizing power consumption of the mobile station. The operation of the mobile station in the power saving mode is performed by repetition of a sleep interval and a listening interval. The length of the sleep interval and the listening interval, which is determined by each value of a sleep window and a listening window, has different values depending on characteristics of traffic set in a corresponding mobile station. Accordingly, the mobile station can have three types of power saving classes as follows depending on characteristics of traffic which is currently set.

Power Saving Mode Class of type 1
Power Saving Mode Class of type 2
Power Saving Mode Class of type 3

Class 1 targets a best effort (BE) having characteristics of an existing Internet traffic or a non-real-time variable rate (nrt-VR), and is defined by an initial sleep window, a final window base, a final window exponent, a listening window, and a start frame number for sleep window.

Class 2 targets VoIP or a real-time variable rate (rt-VR), and is defined by an initial sleep window, a listening window, and a start frame number for sleep window.

Class 3 is for a management message, such as DCD/UCD and MOB_NBR-ADV, to be periodically forwarded to the mobile station which is in a power saving mode, or data to be forwarded in multicast, and is defined by a final window base, a final window exponent, and a start frame number for sleep window.

Meanwhile, in a state that any one of the above classes is activated and converted into a power saving mode, the procedure of performing handover of the mobile station will be described as follows. For reference, FIG. 6 illustrates a signal flow between the mobile station and the base station to illustrate the procedure of performing related art handover in a power saving mode.

The mobile station of the power saving mode does not receive a downlink signal forwarded from a service base station to minimize power consumption for a sleep interval which corresponds to an unavailable communication interval. Also, the mobile station does not transmit uplink traffic to the service base station. On the other hand, the mobile station can receive downlink data from the base station and transmit uplink data to the service base station for a listening interval which corresponds to an available communication interval.

The mobile station can perform scanning procedure for retrieving channel status of a peripheral base station for a sleep interval which is an unavailable communication interval (S601). At this time, if the peripheral base station uses a frequency band equal to that of the service base station, the mobile station can perform the scanning procedure for the corresponding base station for a listening interval as well as a sleep interval.

As a result of scanning of the peripheral base station, if a condition for handover is satisfied, the mobile station transmits a sleep request message (MOB_SLP-REQ) to the service base station to deactivate all the power saving classes (S603). The service base station which has received the sleep request message from the mobile station transmits a sleep response message (MOB_SLP-RSP), which indicates deactivation of all the power saving classes, to the corresponding mobile station in response to the sleep request message (S605).

The mobile station which has received the sleep response message (MOB_SLP-RSP) deactivates all the power saving classes which are currently activated (S607), and transmits a handover request message (MOB_MSHO-REQ) which requests handover to another base station, to the service base station (S609). The service base station which has received the handover request message (MOB_MSHO-REQ) transmits a handover response message (MOB_MSHO-RSP) to the corresponding mobile station in response to the handover request message (MOB_MSHO-REQ) (S611).

The mobile station which has received the handover response message (MOB_MSHO-RSP) forwards a handover indication message (MOB_HO_IND) to the service base station to request release of connection with the service base station (S613). Afterwards, the mobile station performs network re-registration procedure with handover target base station to perform handover (S615).

In the above steps, the mobile station of the power saving mode may omit the steps S603 and S605 and end the power saving mode. At the same time, the mobile station may transmit the handover request message (MOB_MSHO-REQ) to the service base station to perform handover to another base station.

In the related art, when the mobile station of the power saving mode performs handover, the mobile station deactivates all the power saving classes which are activated and performs handover procedure. At this time, a problem occurs in that the related art fails to suggest how to maintain and update information of the deactivated power saving classes after handover.

Meanwhile, if the mobile station moves from a specific mobile communication region to another mobile communication region, handover which automatically converts a communication channel to prevent communication from being disconnected is performed. The general procedure of performing such handover will be described as follows. FIG. 7 is a flow chart illustrating the procedure between a mobile station and base stations to sequentially illustrate the general procedure of performing handover according to the related art.

The service base station transmits handover triggering information to the mobile station through a downlink channel descriptor (DCD) for transmission of channel information or message (MOB_NBR_ADV) for transmission of information of neighboring base stations (S701), wherein the handover triggering information designates trigger conditions of various operations of the mobile station with respect to handover, i.e., handover related operations. One example of lists included in the handover triggering information is as follows.

TABLE 4

| Name | Type | Length (1 byte) | Value |
|---|---|---|---|
| Type/Function/Action | 54.1 | 1 | See Table 358b for description |
| Trigger value | 54.2 | 1 | Value to be compared with measurement metric value to decide trigger conditions |
| Trigger averaging duration | 54.3 | 1 | Averaging duration of metric measurement value in mobile station |

Also, the handover triggering information may further include the following lists.

TABLE 5

| Name | Length | Value |
|---|---|---|
| Type | 2 bits (MSB) | 0x00: CINR metric<br>0x01: RSSI metric<br>0x02: RTD metric<br>0x03: Reserved |
| Function | 3 bits | 0x00: Reserved<br>0x01: metric of neighboring base station is greater than absolute value<br>0x02: metric of neighboring base station is smaller than absolute value<br>0x03: metric of neighboring base station is relatively greater than metric of service base station<br>0x04: metric of neighboring base station is relatively smaller than metric of service base station<br>0x05: metric of service base station is greater than absolute value<br>0x06: metric of service base station is smaller than absolute value<br>0x07: Reserved |
| Enabled Action | 3 bits (LSB) | 0x00: Reserved<br>0x01: MOB_SCN-REP message response after each scanning interval to trigger<br>0x02: MOB_MSHO-REQ message response to trigger<br>0x03: mobile station initiates scanning of neighboring base station by transmitting MOB_SCN-REQ message in response to trigger<br>0x04~0x07: Reserved |

Afterwards, if the mobile station triggers scanning initiation of a neighboring base station to a service base station as a predetermined metric received from the neighboring base station satisfies scanning initiation condition (0x03 of Action list) of the handover triggering information (S702), the mobile station transmits a scanning request message (MOB_SCN-REQ) to the service base station, and the service base station allocates a predetermined scan duration and at the same time transmits a scanning response message (MOB_SCN-RSP) to the corresponding mobile station in response to the scanning request message (MOB_SCN-REQ). The mobile station synchronizes a downlink signal with the neighboring base station for the allocated scan duration and measures quality level of the signal received from the neighboring base station, strength of the signal, transmission synchronization, etc. to perform scanning of the neighboring base station (S703).

If the mobile station triggers scan reporting to the service base station as the scanning result satisfies scan report condition (0x01 of Action list) of the handover triggering information (S704), the mobile station transmits carrier to interference and noise ratio (CINR), received signal strength indication (RSSI) and round trip delay (RTD), which are measured through the scanning, to the service base station through the MOB_SCN-REP message.

If the mobile station triggers handover request to the service base station as the scanning result satisfies handover condition (0x02 of Action list) of the handover triggering information (S705), the mobile station transmits the handover request message (MOB_MSHO-REQ) to the service base station, and the service base station transmits the handover response message (MOB_MSHO-RSP) to the corresponding mobile station in response to the handover request message. Subsequently, the mobile station transmits the handover indication message (MOB_HO-IND) to the service base station to request release of connection with the service base station (S706) and then performs the network re-registration procedure with the handover target base station.

Meanwhile, a broadband wireless access system based on IEEE802.16e system supports a power saving mode for minimizing power consumption of the mobile station. The operation of the mobile station in the power saving mode is performed by repetition of a sleep interval and a listening interval. The sleep interval and the listening interval are determined by each value of a sleep window and a listening window. In this case, the sleep interval and the listening interval may have different values depending on characteristics of traffic set in a corresponding mobile station. The power saving mode can be classified into power saving mode class of type 1, power saving mode class of type 2, and power saving mode class of type 3.

The mobile station which is being operated in the power saving mode can perform scanning of the neighboring base station even though the mobile station does not receive and transmit the scanning request message (MOB_SCN-REQ) and the scanning response message (MOB_SCN-RSP) from and to the service base station. If the mobile station transmits the scanning report message to the service base station whenever performing scanning of the neighboring base station, a problem occurs in that power consumption of the mobile station is inevitably required unlike intention of the power saving mode. However, if the base station does not receive the scanning report message for handover from the mobile station, a problem occurs in that the base station cannot control handover to the mobile station of the power saving mode appropriately.

Furthermore, a problem occurs in that the current mobile station fails to effectively perform handover related operation and power saving operation as the mobile station does not use characteristics of each class by performing handover related operation regardless of the power saving class which is being operated.

DISCLOSURE OF THE INVENTION

Accordingly, the present invention is directed to a method of performing procedures for initial network entry of a mobile station in a broadband wireless access system, which substantially obviates one or more problems due to limitations and disadvantages of the related art.

An object of the present invention is to provide a method of efficiently performing procedures for initial network entry of a mobile station in a broadband wireless access system.

Another object of the present invention is to provide a method of preventing abnormal operation of a mobile station due to error occurring during initial network entry of the mobile station in a broadband wireless access system.

Still another object of the present invention is to provide a method of operating a mobile station in the most efficient power saving mode depending on network status during handover by suggesting a definite standard as to how to process a power saving class deactivated for handover in a first base station after handover to a second base station.

Further another object of the present invention is to allow at least one operation class information to be included in a related art handover triggering information transmitted from a base station, so that each class performs separate handover related operation.

Further still another object of the present invention is to decrease the number of transmission and reception times of triggering information by simultaneously designating a plurality of handover related operations triggered by a mobile station.

In one embodiment of the present invention, if a base station does not receive uplink transmission messages (SBC-REQ, PKM-REQ, REG-REQ, etc.) from a mobile station within a given time period during initial network entry procedure of the mobile station, error status is avoided by the following method.

The base station releases management resources such as management connection identifiers allocated to the mobile station, and transmits a reset command message (RES-CMD) to allow the mobile station to newly perform network entry procedure. The mobile station which has received the reset command message stops trying a bandwidth request for transmission of an uplink management message such as SBC-REQ and restarts the network entry procedure including ranging procedure.

The base station determines that try of the bandwidth request of the mobile station through a contention based uplink bandwidth request region is repeatedly failed, and allocates a non-contention based uplink band to the corresponding mobile station to transmit an uplink management message.

If channel status between the mobile station and the base station becomes bad or the base station does not receive an uplink management message from the corresponding mobile station due to an excess of mobile stations that can be received in the base station, the base station forwards a management message (for example, registration release command message (DREG-CMD), which commands the corresponding mobile station to be registered in another base station, to the mobile station so that the corresponding mobile station performs network entry procedure to another base station.

Through the above method, the error status, which may occur when the base station does not receive the uplink transmission messages (SBC-REQ, PKM-REQ, REG-REQ, etc.) from the mobile station within a given time period during initial network entry procedure of the mobile station, can be avoided.

If the mobile station does not receive a provisioned service flow request message from the base station within a given time period after receiving a registration response message, error status can be avoided by the following method.

The mobile station forwards the uplink management message (for example, either a service response message in which an error code indicating that a timer waiting for a service request message has expired is set, or a management message or header which performs the same function as that of the timer) to the base station to indicate that the mobile station has not received the service request message, and allows the base station to transmit the service request message. Preferably, the number of retransmission times for transmission of the uplink management message and the timer waiting for the service request message can be defined together.

If the provisioned service flow is not generated as the base station does not receive a service response message of the mobile station in response to the service request message during the initial network entry procedure of the mobile station, the base station transmits a reset command message (RES-CMD) to the mobile station to again perform an initiation procedure of the mobile station.

In one aspect of the present invention, a method of performing procedures for network entry of a mobile station in a broadband wireless access system includes being allocated with transmission parameters from a base station, at least one time performing a request of an uplink band for transmission of an uplink management message to the base station, and receiving a downlink message for next procedure from the base station if the uplink band is not allocated even after the lapse of a preset time period.

In another aspect of the present invention, a method of performing network entry in a wireless communication system includes receiving first network entry control information of network entry time of at least one mobile station, which is set to a specific first value, performing network entry depending on the received first network entry control information, receiving second network entry control information of network entry time of the at least one mobile station, which is set to a specific second value, and performing network entry depending on the received second network entry control information.

Preferably, the first network entry control information is ranging backoff value for spontaneous access, and the second network entry control information is backoff value according to restart of the base station. Preferably, the backoff value according to restart of the base station is greater than the ranging backoff value for spontaneous access.

In another aspect of the present invention, a method of performing network entry in a wireless communication system includes receiving first network entry control information including network entry time of mobile stations, performing network entry depending on the received first network entry control information, receiving second network entry control information of network entry time of the mobile stations, which is determined depending on an operation mode of the mobile stations, and performing network entry depending on the received second network entry control information.

Preferably, the operation mode of the mobile station is divided depending on connection status between the mobile station and network or a power control method of the mobile station. Preferably, the operation mode is divided into a normal mode, an idle mode, a sleep mode, etc. Preferably, the first network entry control information is ranging backoff value for spontaneous access, and the second network entry control information is backoff value according to restart of the base station. Preferably, the backoff value according to restart of the base station is greater than the ranging backoff value for spontaneous access.

In another aspect of the present invention, a method of performing network entry in a wireless communication system includes setting first network entry control information of network entry time of at least one mobile station to a specific first value and transmitting the set value to a first mobile station, performing registration procedure of the first mobile station which tries network entry based on the first network entry control information, if re-registration of the first mobile station is needed, setting second network entry control information of network entry time of the at least one mobile station to a specific second value and transmitting the set value to the first mobile station, and performing re-registration procedure of the first mobile station which tries network entry based on the second network entry control information.

In another aspect of the present invention, a method of performing network entry in a wireless communication system includes transmitting first network entry control information of network entry time of at least one mobile station to a specific first mobile station, performing registration procedure of the first mobile station which tries network entry based on the first network entry control information, if re-registration of the first mobile station is needed, transmitting second network entry control information of network entry time of the at least one mobile station to the first mobile station, which is determined depending on an operation mode of the at least one mobile station, and performing re-registration procedure of the first mobile station which tries network entry based on the second network entry control information.

In another aspect of the present invention, a method of performing handover of a mobile station in a power saving mode in controlling power saving class configuration information of a first base station during handover from the first base station to a second base station includes transmitting a ranging request message for network entry from a mobile station to the second base station, receiving a ranging response message from the second base station, the ranging response message including control information of the power saving class configuration information of the first base station, and processing the power saving class configuration information of the first base station depending on the control information.

The control information is information which indicates release of the power saving class configuration information of the first base station, and the mobile station releases the corresponding class configuration information depending on the control information. In this case, the method further includes transmitting a request message for definition and activation of a new power saving class from the mobile station to the second base station, and receiving a response message to the request message from the second base station, defining and activating the new power saving class depending on the corresponding response message, and performing conversion to the power saving mode.

Furthermore, the control information includes information which indicates update of the power saving class configuration information of the first base station and power saving class configuration information to be updated, and the mobile station updates the existing class configuration information to class configuration information included in the control information. In this case, an item of the existing class configuration information, which is not updated, is maintained as it is, or is released. Also, the method further includes transmitting a request message for activation of the updated power saving class from the mobile station to the second base station, and receiving a response message to the request message from the second base station, activating the power saving class depending on the corresponding response message, and performing conversion to the power saving mode.

Furthermore, the control information includes information which indicates maintenance of the power saving class configuration information of the first base station, and the mobile station maintains the corresponding class configuration information depending on the control information. In this case, the method further includes transmitting a request message for activation of the maintained power saving class from the mobile station to the second base station, and receiving a response message to the request message from the second base station, activating the power saving class depending on the corresponding response message, and performing conversion to the power saving mode.

Furthermore, if handover to the second base station is canceled and re-entry to the first base station is performed, the method further includes transmitting a ranging request message for network re-entry to the first base station, receiving a ranging response message from the first base station, the ranging response message including control information of the power saving class configuration information, and processing the power saving class configuration information depending on the control information.

Meanwhile, another aspect of the present invention relates to a mobile station which controls power saving class configuration information of a first base station during handover from the first base station to a second base station, the mobile station including a radio communication module transmitting a ranging request message for network entry to the second base station and receiving a ranging response message from the second base station, the ranging response message including control information of the power saving class configuration information of the first base station, and a control module processing the power saving class configuration information of the first base station depending on the control information.

The control information is information which indicates release of the power saving class configuration information of the first base station, and the control module releases the corresponding class configuration information depending on the control information. In this case, the radio communication module further includes a function of transmitting a request message for definition and activation of a new power saving class to the second base station and receiving a response message to the request message from the second base station, and the control module further includes a function of defining and activating a new power saving class depending on the corresponding response message and performing conversion to a power saving mode.

Furthermore, the control information includes information which indicates update of the power saving class configuration information of the first base station and power saving class configuration information to be updated, and the control module updates the existing class configuration information to class configuration information included in the control information. In this case, the radio communication module further includes a function of transmitting a request message for activation of the updated power saving class to the second base station and receiving a response message to the request message from the second base station, and the control module further includes a function of activating the power saving class depending on the corresponding response message and performing conversion to a power saving mode.

Furthermore, the control information is information which indicates maintenance of the power saving class configuration information of the first base station, and the control module maintains the corresponding class configuration information depending on the control information. In this case, the radio communication module further includes a function of transmitting a request message for activation of the maintained power saving class to the second base station and receiving a response message to the request message from the second base station, and the control module further includes a function of activating the power saving class depending on the corresponding response message and performing conversion to a power saving mode.

Meanwhile, another aspect of the present invention relates to a method of performing handover of a mobile station in a power saving mode in controlling power saving class configuration information of the mobile station in a second base station during handover from a first base station to the second base station, the method including receiving a ranging request message for network entry to a second base station from a mobile station, and transmitting a ranging response message to the mobile station, the ranging response message including control information of the power saving class configuration information of the first base station.

The control information is information which indicates release of the power saving class configuration information of the first base station, information which indicates update of the power saving class configuration information of the first base station and power saving class configuration information to be updated, or information which indicates maintenance of the power saving class configuration information of the first base station.

The control information includes a parameter (referred to as 'power saving update class parameter') for indicating release/update/maintenance of the power saving class configuration information, and an example of the parameter is as follows.

TABLE 6

| Parameter Name | type | Lenth (byte) | value |
|---|---|---|---|
| Power_Saving_Class_Update | TBD | 1 | 0x00 = Release all power saving classes defined at previous serving BS<br>0x01 = Update parameters of power saving classes according to the Power_Saving_Class_Paramters TLV.<br>0x02 = Maintain all power saving classes defined at previous serving BS without change. |

Furthermore, if handover to the second base station is canceled and re-entry to the first base station is performed, the radio communication module further includes a function of transmitting a request message for network re-entry to the first base station and receiving a ranging response message from the first base station, the ranging response message including control information of the power saving class configuration information, and the control module further includes a function of processing the power saving class configuration information depending on the control information transmitted from the first base station.

Another aspect of the present invention relates to a method of performing handover of a mobile station in performing handover related operation depending on handover triggering information, the method including receiving the handover triggering information from a service base station, performing scan of neighboring base stations in a sleep mode, and triggering specific handover related operation designated in the triggering information if the scan result adapts to trigger condition set in the triggering information. The method further includes changing a specific item of the handover triggering information during entry to a power saving mode.

Another aspect of the present invention relates to a mobile station of performing handover related operation depending on handover triggering information, the mobile station including a radio communication module receiving the handover triggering information and a signal for measurement of channel quality, and a control module performing scan of neighboring base stations in a sleep mode and triggering specific handover related operation designated in the triggering information if the scan result adapts to trigger condition set in the triggering information. In this case, the control module further includes a function of changing a specific item of the handover triggering information during entry to a power saving mode.

In the above two aspects, the handover triggering information designates at least one type of power saving class which allows trigger of the handover related operation, and designates at least one handover related operation triggered as the scan result adapts to the trigger condition.

Preferably, the at least one handover related operation is independently designated for each class of the power saving mode. Preferably, the handover related operation designated in the handover triggering information includes at least one of scan report, scan request, and handover request.

BEST MODE FOR CARRYING OUT THE INVENTION

Hereinafter, structures, operations, and other features of the present invention will be understood readily by the preferred embodiments of the present invention, examples of which are illustrated in the accompanying drawings.

The operation according to the present invention will be described based on two operations in the same manner as configuration of the present invention. One of the operations indicates the operation of a mobile station and a base station when the base station does not receive uplink management message from the mobile station within a given time period during network entry of the mobile station. The other of the operations indicates the operation when the mobile station and the base station do not generate a service flow normally during a procedure of generating a provisioned service flow.

Figure 8:
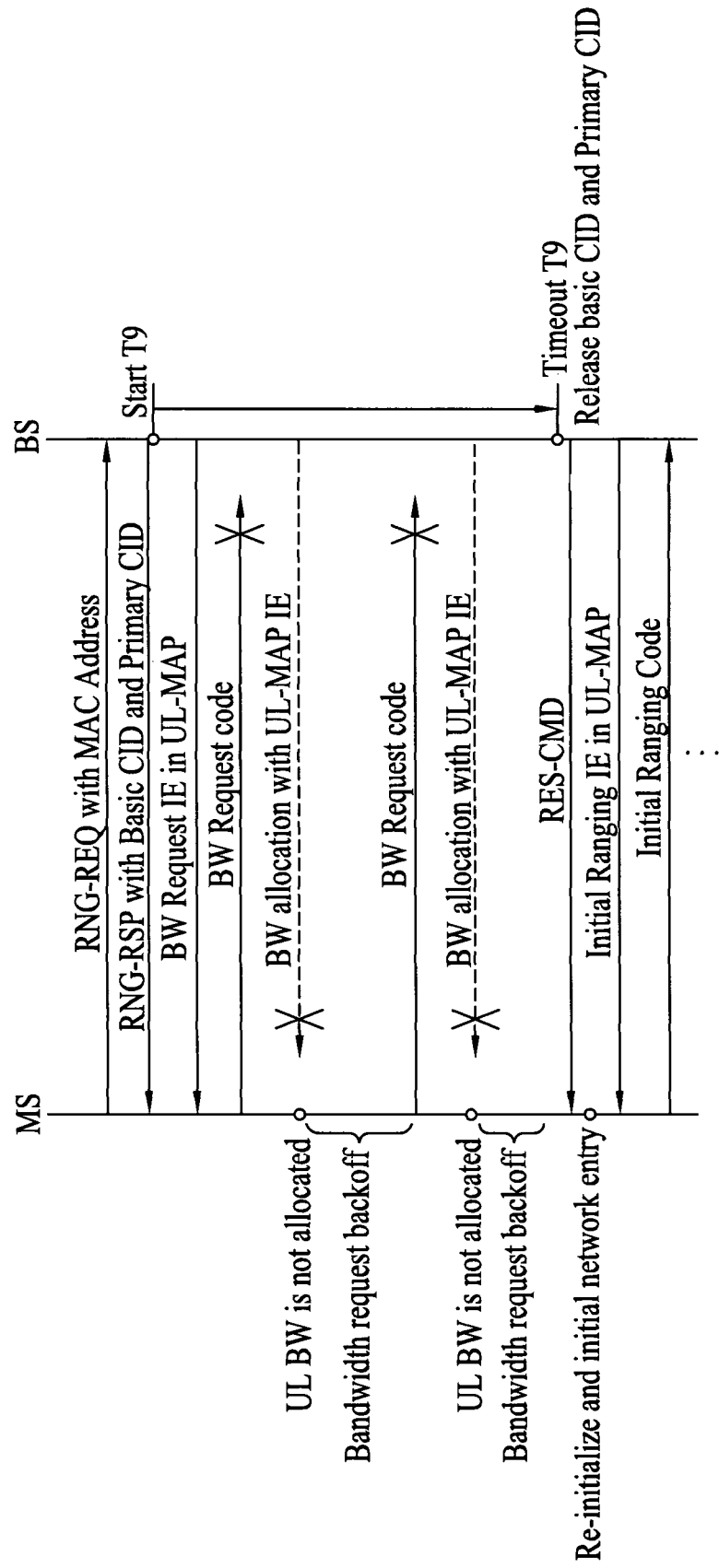
FIG. 8 to FIG. 13 are flow charts illustrating preferred embodiments according to one aspect of the present invention.

FIG. 8 is a flow chart illustrating one preferred embodiment of the present invention, which is a first embodiment corresponding to the case where the base station does not receive the uplink management message from the mobile station within a given time period during initial network entry of the mobile station.

The base station exchanges a ranging request message (RNG-REQ) and a ranging response message (RNG-RSP) with the mobile station to allocate basic CID and primary CID to the mobile station. After transmitting the corresponding ranging response message to the mobile station, the base station operates a timer T9 and waits for a basic capability request message (SBC-REQ) from the mobile station. If the mobile station receives the ranging response message which includes the basic CID and the primary CID, the mobile station requests an uplink band for transmission of the SBC-REQ message by using a band request code and a band request header. If the mobile station is not allocated with the uplink band from the base station, the mobile station repeatedly tries a band request by performing backoff.

If the base station does not receive the SBC-REQ message from the mobile station until the timer T9 expires, the base station forwards a reset command message (RES-CMD) to command initiation procedure of the mobile station to be performed again. At the same time, the base station releases the basic CID and the primary CID allocated to the mobile station. If the mobile station receives the RES-CMD from the base station, the mobile station stops an uplink band request procedure for transmission of the SBC-REQ message and again performs the initiation procedure including ranging. At this time, the mobile station releases the basic CID and the primary CID in the same manner as the base station. The mobile station transmits an initial ranging code to perform initial-ranging procedure.

Figure 9:
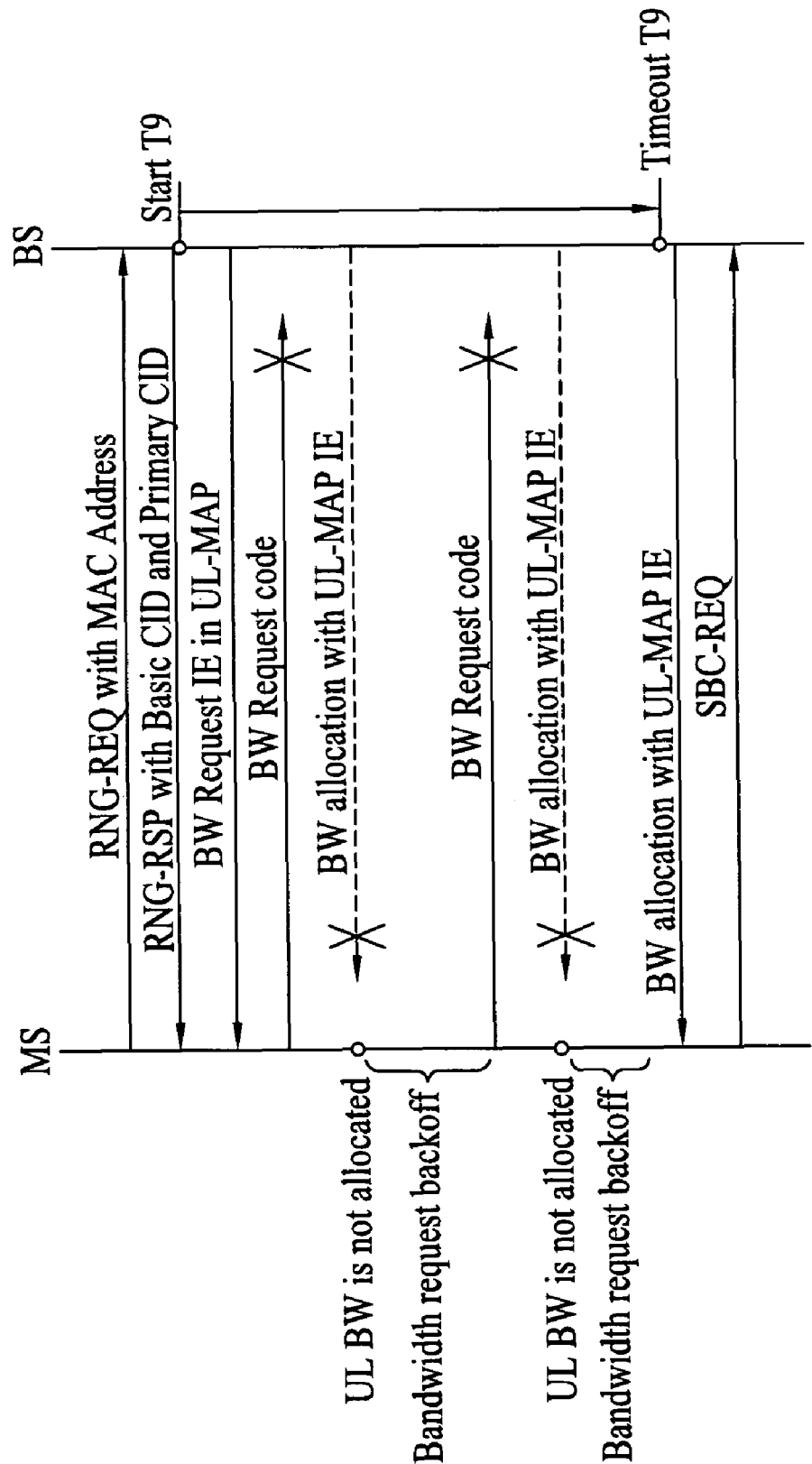

FIG. 9 is a flow chart illustrating another preferred embodiment of the present invention, which is a second embodiment corresponding to the case where the base station does not receive the uplink management message from the mobile station within a given time period during initial network entry of the mobile station.

The base station exchanges a ranging request message (RNG-REQ) and a ranging response message (RNG-RSP) with the mobile station to allocate basic CID and primary CID to the mobile station. After transmitting the corresponding ranging response message to the mobile station, the base station operates a timer T9 and waits for a basic capability request message (SBC-REQ) from the mobile station. If the mobile station receives the ranging response message which includes the basic CID and the primary CID, the mobile station requests an uplink band for transmission of the SBC-REQ message by using a band request code and a band request header. If the mobile station is not allocated with the uplink band from the base station, the mobile station repeatedly tries a band request by performing backoff.

If the base station does not receive the SBC-REQ message from the mobile station until the timer T9 expires, the base station allocates a non-contention based uplink radio resource to the mobile station allow the mobile station to the SBC-REQ message. The mobile station which has been allocated with the non-contention based uplink radio resource from the base station transmits the SBC-REQ message to the base station. However, if the base station does not receive the SBC-REQ message even though the base station has allocated the non-contention based uplink radio resource, the base station repeatedly allocates the non-contention based uplink radio resource by the number of preset times. If the base station does not receive the SBC-REQ message nonetheless, the base station regards that the mobile station is in an abnormal state and releases the basic CID and the primary CID allocated to the mobile station. Afterwards, the base station transmits the RES-CMD message to the mobile station to allow the mobile station to perform the initiation procedure again.

Figure 10:
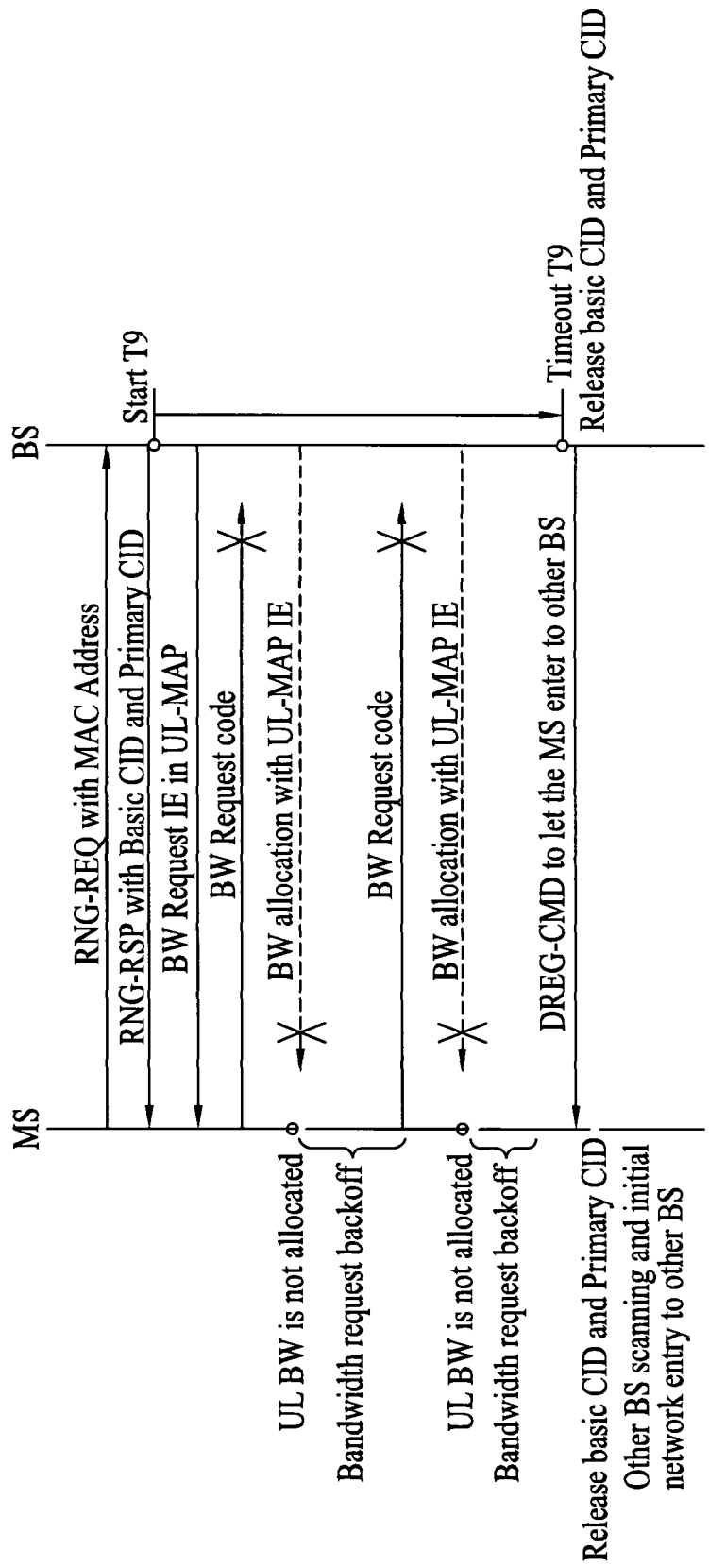

FIG. 10 is a flow chart illustrating another preferred embodiment of the present invention, which is a third embodiment corresponding to the case where the base station does not receive the uplink management message from the mobile station within a given time period during initial network entry of the mobile station.

The base station exchanges a ranging request message (RNG-REQ) and a ranging response message (RNG-RSP) with the mobile station to allocate basic CID and primary CID to the mobile station. After transmitting the corresponding ranging response message to the mobile station, the base station operates a timer T9 and waits for a basic capability request message (SBC-REQ) from the mobile station. If the mobile station receives the ranging response message which includes the basic CID and the primary CID, the mobile station requests an uplink band for transmission of the SBC-REQ message by using a band request code and a band request header. If the mobile station is not allocated with the uplink band from the base station, the mobile station repeatedly tries a band request by performing backoff.

If the base station does not receive the SBC-REQ message from the mobile station until the timer T9 expires, the base station releases the basic CID and the primary CID allocated to the mobile station and transmits a registration release command message (DREG-CMD) to the mobile station to command the mobile station to perform network entry procedure to another base station. The mobile station which has received the DREG-CMD message from the base station releases the basic CID and the primary CID allocated from the base station and performs the network entry procedure to another base station by scanning another base station channel.

In the three embodiments described with reference to FIG. 8 to FIG. 10, although the case where the mobile station does not transmit the SBC-REQ message to the base station within a given time period during the network entry procedure has been described, the same procedure may be performed even in case that the base station does not receive a PKM-REQ message for authentication and key exchange with the base station and the REG-REQ message for registration from the mobile station within a given time period after basic capability negotiation through exchange of the SBC-REQ message and SBC-RSP message between the mobile station and the base station.

Figure 11:
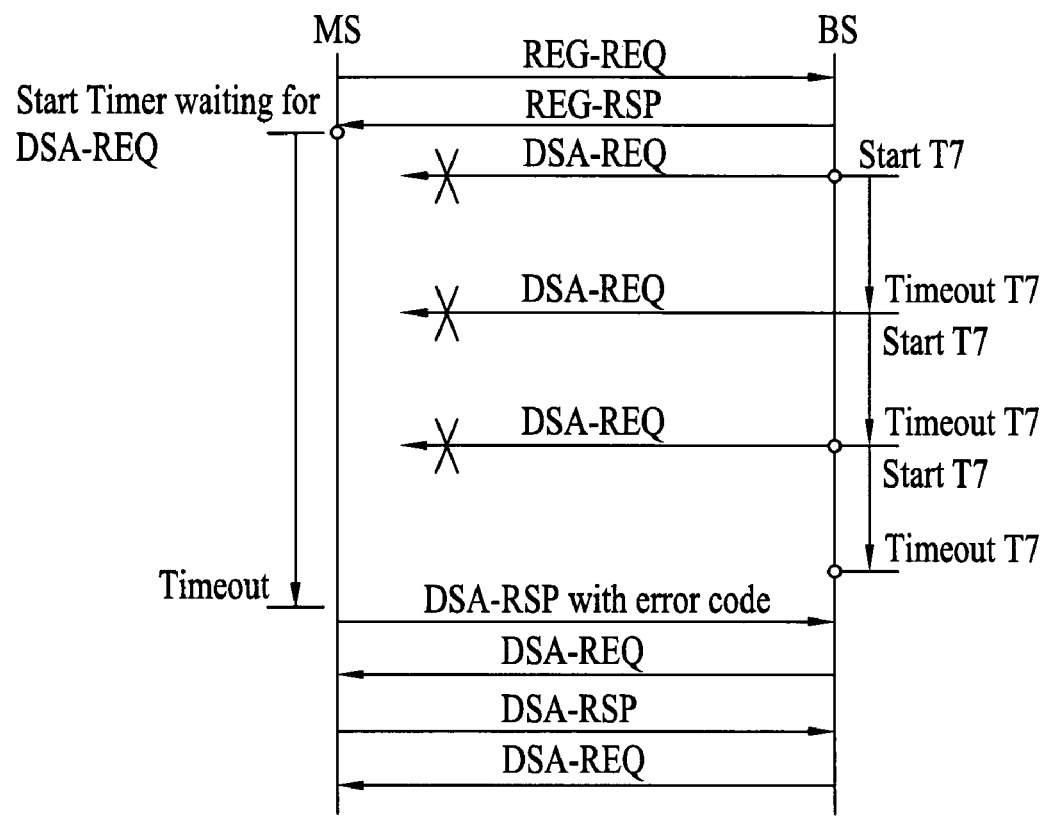

FIG. 11 is a flow chart illustrating another preferred embodiment of the present invention, which is a first embodiment corresponding to the case where the mobile station which has received the REG-RSP message from the base station and completed the registration procedure does not receive a provisioned service flow request message from the base station during initial network entry of the mobile station.

The mobile station and the base station exchange the REG-REQ message and the REG-RSP message with each other to perform the base station registration procedure of the mobile station. If the base station transmits the REG-RSP message to the mobile station to complete the registration procedure, the base station transmits a dynamic service addition request message (DSA-REQ) to generate the provisioned service flow and operates a timer T7 which waits for a dynamic service addition response message (DSA-RSP). Meanwhile, the mobile station which has received the REG-RSP message from the base station operates a timer which waits for the DSA-REQ message. After transmitting the DSA-REQ message, if the base station does not receive the DSA-RSP message from the mobile station until the timer T7 expires, the base station repeatedly transmits the DSA-REQ message by the number of preset times and waits for the DSA-RSP message.

If the mobile station does not receive the DSA-REQ message for a certain time period, the mobile station transmits uplink management message (for example, DSA-RSP message in which an error code is set) or an uplink header to notify the base station that it has not received the DSA-REQ message. Then, the base station transmits the DSA-REQ message to the mobile station by applying a coding and modulation scheme suitable for the mobile station. The mobile station which has received the DSA-REQ message from the base station forwards the DSA-RSP message to the base station to perform the procedure of generating the provisioned service flow. The base station which has received the DSA-RSP message transmits a DSA-ACK message to the mobile station to complete a corresponding service flow procedure. The mobile station and the base station exchange the DSA message with each other to generated the provisioned service flow by the number of preset times, thereby completing the network entry procedure.

Figure 12:
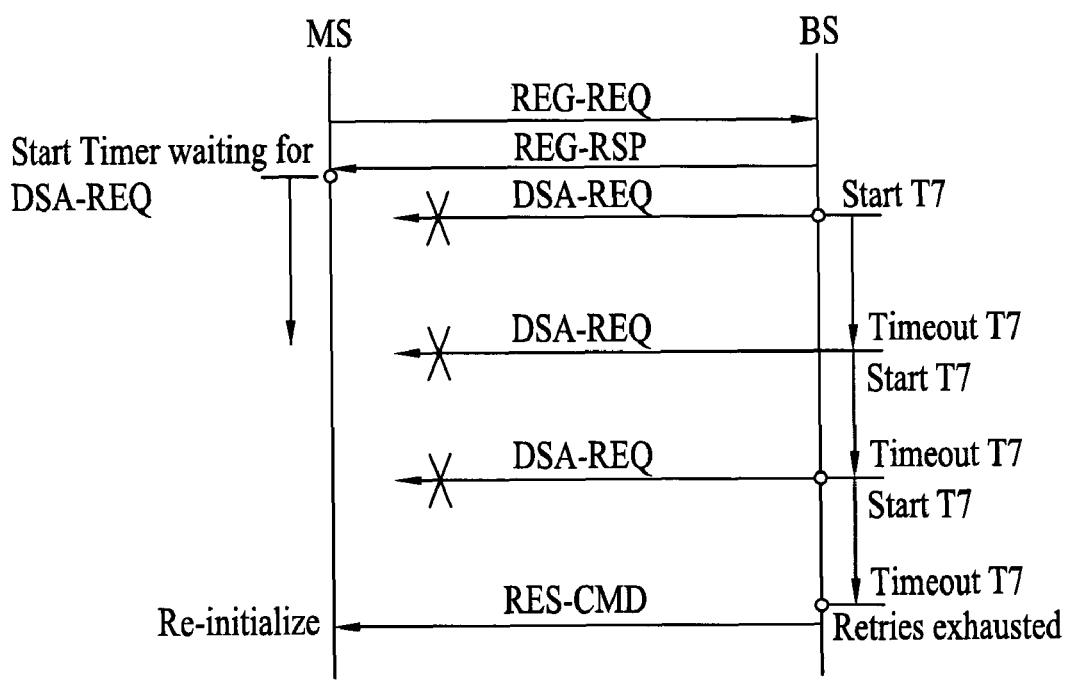

FIG. 12 is a flow chart illustrating another preferred embodiment of the present invention, which is a second embodiment corresponding to the case where the mobile station which has received the REG-RSP message from the base station and completed the registration procedure does not receive a provisioned service flow request message from the base station during initial network entry of the mobile station.

The mobile station and the base station exchange the REG-REQ message and the REG-RSP message with each other to perform the base station registration procedure of the mobile station. If the base station transmits the REG-RSP message to the mobile station to complete the registration procedure, the base station transmits a dynamic service addition request message (DSA-REQ) to generate the provisioned service flow and operates a timer T7 which waits for a dynamic service addition response message (DSA-RSP). Meanwhile, the mobile station which has received the REG-RSP message from the base station operates a timer which waits for the DSA-REQ message.

After transmitting the DSA-REQ message, if the base station does not receive the DSA-RSP message from the mobile station until the timer T7 expires, the base station repeatedly transmits the DSA-REQ message by the number of preset times and waits for the DSA-RSP message. If the base station does not receive the DSA-RSP message from the mobile station even though the base station has retransmitted the DSA-REQ message by the number of given times, the base station transmits a reset command message (RES-CMD) to allow the mobile station to perform the initiation procedure. If the mobile station which waits for the DSA-REQ message transmitted from the base station receives the RES-CMD message from the base station, the mobile station again performs the initial network entry procedure including the initial ranging procedure.

Figure 13:
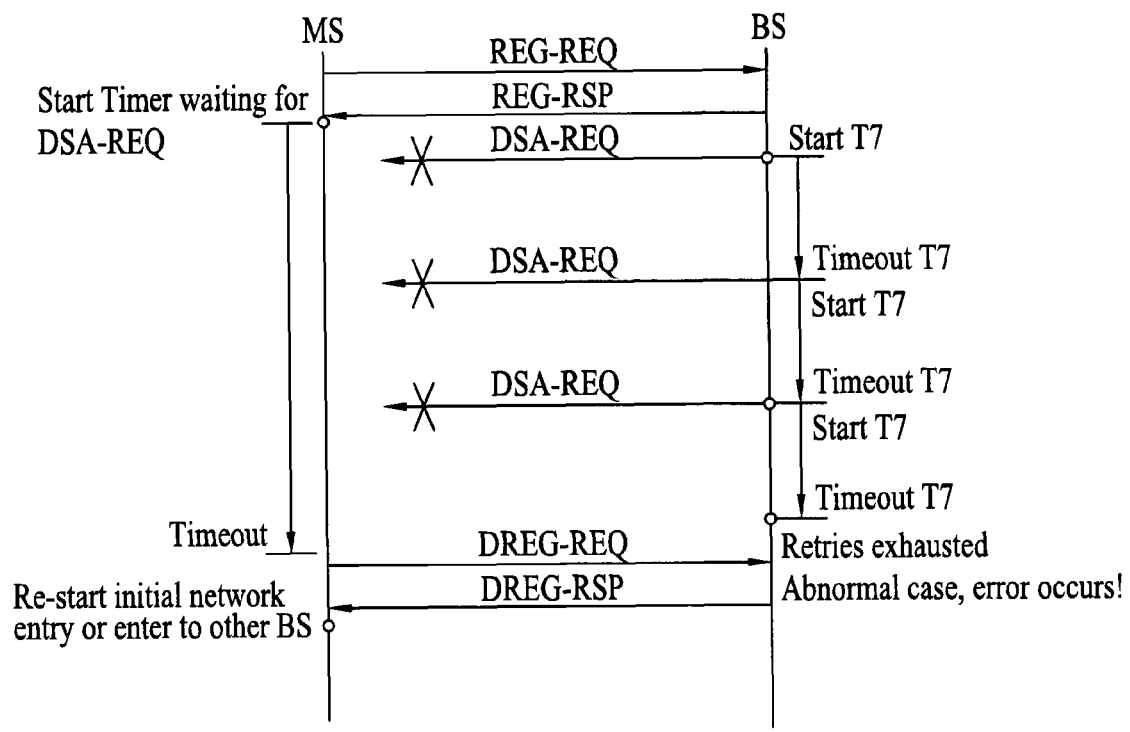

FIG. 13 is a flow chart illustrating another preferred embodiment of the present invention, which is a third embodiment corresponding to the case where the mobile station which has received the REG-RSP message from the base station and completed the registration procedure does not receive a provisioned service flow request message from the base station during initial network entry of the mobile station.

The mobile station and the base station exchange the REG-REQ message and the REG-RSP message with each other to perform the base station registration procedure of the mobile station. If the base station transmits the REG-RSP message to the mobile station to complete the registration procedure, the base station transmits a dynamic service addition request message (DSA-REQ) to generate the provisioned service flow and operates a timer T7 which waits for a dynamic service addition response message (DSA-RSP). Meanwhile, the mobile station which has received the REG-RSP message from the base station operates a timer which waits for the DSA-REQ message. After transmitting the DSA-REQ message, if the base station does not receive the DSA-RSP message from the mobile station until the timer T7 expires, the base station repeatedly transmits the DSA-REQ message by the number of preset times and waits for the DSA-RSP message.

If the mobile station does not receive the DSA-REQ message for a certain time period, the mobile station transmits a registration release request message (DREG-REQ) to the base station to request the base station to release the registration. The base station releases the basic CID, the primary CID, and management resources and transmits a registration release command message (DREG-CMD) to the mobile station to complete release of the registration. The mobile station which has received the DREG-CMD message from the base station releases the CIDs and the management resources allocated from the base station, and performs the initial network entry procedure to the base station or network entry procedure to another base station.

Another embodiment of the present invention relates to an improved network entry method and a method of transmitting and receiving control information for the same.

As described above, the initial network entry procedure can be classified into two types. In this case, according to the related art, a single value was equally applied to various kinds of control information relating to random backoff window for the two network entry procedures. Accordingly, when mobile stations which perform network entry procedure during restart of the base station try the initial network entry, possibility of collision may increase. This deteriorates system performance through network entry delay of the mobile stations and also deteriorates service quality of the mobile stations.

To solve such problems, according to another embodiment of the present invention, a backoff window value for initial ranging of the mobile station during restart of the base station is defined differently from a backoff window value for initial ranging during spontaneous network entry of the mobile station to minimize network entry collision between the mobile stations, which may occur during restart of the base station.

Furthermore, according to another embodiment of the present invention, during initial ranging backoff due to restart of the base station, different initial ranging backoff parameters are set depending on operation modes of the mobile stations, for example, normal mode, sleep mode, and idle mode. In this case, depending on the initial ranging backoff parameter set values, the mobile station in normal mode expedites initial network entry as compared with the sleep mode or the idle mode, and the base station appropriately disperses initial ranging tries of the mobile stations.

Hereinafter, various parameters suggested in the embodiment of the present invention will be described. The parameters described later are examples of parameters relating to backoff window of control information for initial ranging of the mobile station.

Table 7a illustrates an example of backoff parameter for initial ranging due to restart of the base station.

TABLE 7a

| Name | Type (1 byte) | Length | Value |
|------|---------------|--------|-------|
| BS restart ranging backoff | TBD | 1 | Parameter for initial ranging performed due to Restart of base station. In more detail, parameter obtained by expressing initial backoff window size for initial ranging as a power of 2. (Initial backoff window size for initial ranging contention due to BS restart, expressed as a power of 2.) |

Table 7b illustrates an example of backoff parameter for initial ranging due to restart of the base station, in which backoff parameter is controlled depending on operation modes of the mobile station.

TABLE 7b

| Name | Type (1 byte) | Length | Value |
|------|---------------|--------|-------|
| BS restart ranging backoff | TBD | 3 | Parameter for initial ranging performed due to Restart of base station. In more detail, parameter obtained by expressing initial backoff window size for initial ranging as a power of 2. (Initial backoff window size for initial ranging contention due to BS restart, expressed as a power of 2) Also, each bit of parameter can be comprised as follows depending on operation modes of mobile station. Bit #0~Bit #7: Backoff window size for normal mode Bit #8~Bit #15: Backoff window size for sleep mode Bit #16~Bit #23: Backoff window size for idle mode |

Table 7c illustrates an example of backoff parameter for initial ranging due to restart of the base station.

TABLE 7c

| Name | Type (1 byte) | Length | Value |
|------|---------------|--------|-------|
| BS restart ranging backoff start | TBD | 1 | Parameter for initial ranging performed due to Restart of base station. In more detail, parameter obtained by expressing initial backoff window size for initial ranging as a power of 2. (Initial backoff window size for initial ranging contention due to BS restart, expressed as a power of 2.) |
| BS restart ranging backoff end | TBD | 1 | Parameter for initial ranging performed due to restart of base station. In more detail, parameter obtained by expressing final backoff window size for initial ranging as a power of 2. Final backoff window size for initial ranging contention due to BS restart, expressed as a power of 2. |

Table 7d illustrates an example of backoff parameter for initial ranging due to restart of the base station, in which backoff parameter is controlled depending on operation modes of the mobile station.

TABLE 7d

| Name | Type (1 byte) | Length | Value |
|------|---------------|--------|-------|
| BS restart ranging backoff start | TBD | 3 | Parameter for initial ranging performed due to restart of base station. In more detail, parameter obtained by expressing initial backoff window size for initial ranging as a power of 2. (Initial backoff window size for initial ranging contention due to BS restart, expressed as a power of 2.) Also, each bit of parameter can be comprised as follows depending on operation modes of mobile station. Bit #0~Bit #7: Backoff window size for normal mode Bit #8~Bit #15: Backoff window size for sleep mode Bit #16~Bit #23: Backoff window size for idle mode |
| BS restart ranging backoff end | TBD | 3 | Parameter for initial ranging due to restart of base station. In more detail, parameter obtained by expressing final backoff window size as a power of 2. (Final backoff window size for initial ranging contention due to BS restart, expressed as a power of 2.) Also, each bit of parameter can be comprised as follows depending on operation modes of mobile station. Bit #0~Bit #7: Backoff window size for normal mode Bit #8~Bit #15: Backoff window size for sleep mode Bit #16~Bit #23: Backoff window size for idle mode |

Table 7a illustrates an example of a parameter for performing random backoff by using one backoff window regardless of operation modes of the mobile station when the mobile station performs initial ranging during restart of the base station. Also, Table 7b illustrates an example of a parameter for performing random backoff by applying backoff window value depending on operation modes of the mobile station.

When the base station performs network entry through initial ranging of the mobile station after restart by using the parameter described in Table 7b, initial ranging backoff window size depends on the operation modes of the mobile station to give different priority orders during network reentry of the mobile station. In this case, the mobile station of the normal mode, which exchanges service data with the base station, can access the network more quickly than the mobile station of the sleep mode or the idle mode. In Table 7b, although the backoff window size for initial ranging is set depending on the operation modes of the mobile station, the backoff window size for initial ranging may be set depending on activated service types of the mobile station and priority order classes of the mobile station.

The example of the above parameter relates to giving certain backoff window size if the mobile station is operated in normal mode. However, the mobile station receives various services having quality of service (QoS) before the base station restarts. In other words, the mobile station may receive a service which requires real-time transmission or a service which does not require real-time transmission relatively. If the mobile station was receiving a service which requires real-time transmission before the base station restarts, the mobile station needs to entry the network more quickly after the base station restarts.

In other words, backoff window size according to restart of the base station is more preferably set depending on service types, which are provided to the mobile station before the base station restarts, as well as operation modes of the mobile station.

Table 7c and Table 7d illustrate examples of initial backoff window size and final backoff window size of backoff window size for initial ranging of Table 7a and Table 7b.

The mobile station which has received the parameters illustrated in Table 7a and Table 7b performs random backoff by applying initial backoff window for initial ranging to the corresponding parameter. If the mobile station fails to receive the ranging response message, the mobile station can increase backoff window increasing according to index based on the related art backoff window parameter for initial ranging illustrated in Table 2. In other words, the mobile station can perform initial ranging random backoff by using the parameters illustrated in Table 7a and Table 7b only in case of initial ranging try and using the backoff parameter value for initial ranging illustrated in Table 2.

If the mobile station receives the parameters illustrated in Table 7c and Table 7d from the base station, the mobile station can use random backoff based on the parameters illustrated in Table 7c and Table 7d even in case of backoff window increasing according to index as well as initial ranging random backoff.

The parameters of Table 7a to Table 7d are only examples of the present invention, and numerical values used in each parameter are only exemplary to describe the present invention. Accordingly, it is not intended that the present invention is limited to such numerical values of the aforementioned parameters, and the numerical values can be changed freely. The types of the aforementioned operation modes can be changed depending on intention of a service provider. Accordingly, it is not intended that the present invention is limited to the aforementioned operation modes.

The examples of Table 7b and Table 7d relate to giving specific backoff window value to the mobile station. However, since the sleep mode has various classes depending on its operation characteristics, its parameter is preferably determined considering this feature. In other words, the backoff window value is more preferably set depending on which kind of class corresponds to the sleep mode.

Furthermore, the backoff window size may be determined considering a specific mode only as described above, for example, normal mode and sleep mode.

Table 8a and Table 8b illustrate examples of related art parameters corrected to adapt to the present invention.

TABLE 8a

| Name | Type (1 byte) | Length | Value |
|---|---|---|---|
| Initial_ranging_backoff_start | 198 | 1 | Parameter for initial ranging performed due to restart of base station. In more detail, parameter obtained by expressing initial backoff window size for initial ranging as a power of 2. (Initial backoff window size for initial ranging contention, expressed as a power of 2.) This TLV (Type, Length and Value) is used in NBR-ADV (Neighbor Advertisement Message) only to represent corresponding values that appear in UCD message fields. In case of BS restart, this value should be changed to accommodate MSs which have been registered before. |
| Initial_ranging_backoff_end | 199 | 1 | Parameter for initial ranging performed due to restart of base station. In more detail, parameter obtained by expressing final backoff window size as a power of 2. (Final backoff window size for initial ranging contention, expressed as a power of 2.) This TLV (Type, Length and Value) shall be used in NBR-ADV (Neighbor Advertisement Message) only to represent corresponding values that appear in UCD message fields. In case of BS restart, this value should be changed to accommodate MSs which have been registered before. |

TABLE 8b

| Name | Type (1 byte) | Length | Value |
|---|---|---|---|
| Initial_ranging_backoff_start | 198 | 1 | Parameter for initial ranging performed due to restart of base station. In more detail, |

TABLE 8b-continued

| Name | Type (1 byte) | Length | Value |
|---|---|---|---|
| | | | parameter obtained by expressing initial backoff window size as a power of 2. (Initial backoff window size for initial ranging contention, expressed as a power of 2.) This TLV(Type, Length and Value) shall be used in NBR-ADV message only to represent corresponding values that appear in UCD message fields. In case of BS restart, this parameter consists of the following three parts. Bit #0~Bit #3: Backoff window for normal mode Bit #4~Bit #5: Backoff window for sleep mode, which is calculated as a power of the value from bit #0 to bit #3. Bit #6~Bit #7: Backoff window for idle mode, which is calculated as a power of the value from bit #0 to bit #3. |
| Initial_ranging_backoff_end | 199 | 1 | Parameter for initial ranging performed due to restart of base station. In more detail, parameter obtained by expressing final backoff window size as a power of 2. (Final backoff window size for initial ranging contention, expressed as a power of 2.) This TLV(Type, Length and Value) shall be used in NBR-ADV message only to represent corresponding values that appear in UCD message fields. In case of BS restart, this parameter consists of the following three parts. Bit #0~Bit #3: Backoff window for normal mode Bit #4~Bit #5: Backoff window for sleep mode, which is calculated as a power of the value from bit #0 to bit #3. Bit #6~Bit #7: Backoff window for idle mode, which is calculated as a power of the value from bit #0 to bit #3. |

In Table 8a, when the base station restarts, the initial ranging backoff window value for network re-entry of the mobile stations which have been registered before is preferably set to be greater than that of the normal mode. In this case, collision may be avoided when the mobile stations perform initial ranging. Table 8b illustrates an example of setting different initial ranging backoff parameter values depending on the operation modes of the mobile station during initial ranging backoff due to restart of the base station.

As described above, the parameters of Table 8a to Table 8b are only examples of the present invention, and numerical values used in each parameter are only exemplary to describe the present invention. Accordingly, it is not intended that the present invention is limited to such numerical values of the aforementioned parameters, and the numerical values can be changed freely.

Hereinafter, a method of performing network re-entry of the mobile station by using the aforementioned parameters will be described.

Figure 14:
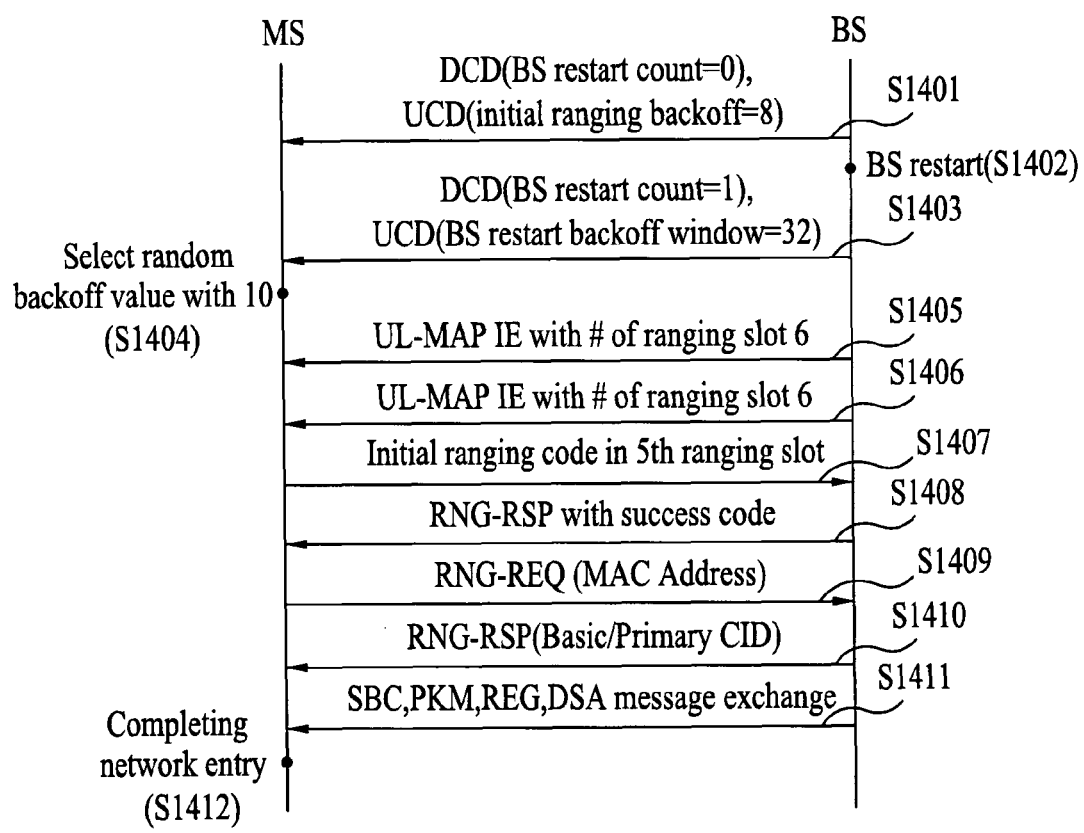
FIG. 14 is an example of a flow chart illustrating a method of performing re-entry of a mobile station when a base station restarts.

FIG. 14 is an example of a flow chart illustrating a method of performing re-entry of a mobile station when a base station restarts. Hereinafter, the method of performing network re-entry depending on the aforementioned parameters will be described with reference to FIG. 14.

Step S1401 will be described below.

The mobile station MS performs initial network entry procedure by applying random backoff during initial ranging through initial ranging backoff parameter of an uplink channel descriptor (UCD) message during initial network entry as described in the related art. FIG. 14 illustrates an example of initial ranging backoff parameter set to 8. After registration to the base station, the mobile station receives BS restart count parameter of a downlink channel descriptor message to determine whether to again perform the network entry procedure.

Step S1402 represents that the base station restarts due to power failure or maintenance.

Hereinafter, step S1403 will be described.

The base station increases the BS restart count parameter value of the downlink channel descriptor (DCD) message by 1 and then forwards the increased value to the mobile station. Also, the base station forwards backoff window value (set to 32 in FIG. 14) for initial ranging code transmission to the mobile station through the uplink channel descriptor message (UCD) during initial network entry procedure of the mobile station.

Step S1404 will now be described.

The mobile station, which has received from the base station the downlink channel descriptor message parameter representing that the BS restart count has been increased, performs the network entry procedure. At this time, the mobile station determines random backoff value (10 in example of FIG. 14) for initial ranging code transmission based on backoff window parameter value (32 in example of FIG. 14) of the uplink channel descriptor message received from the base station.

Hereinafter, step S1405 will be described.

The mobile station receives uplink slot allocation information for initial ranging code transmission from the base station through uplink map (UL-MAP) message, and transmits the initial ranging code by applying random backoff. For example, it is supposed that the random backoff value is set to 10. In this case, if 6 initial ranging slots are allocated to an uplink frame, the mobile station does not transmit the initial ranging code to the corresponding frame.

Hereinafter, step S1406 will be described.

The mobile station receives the uplink map message from the base station and checks whether the initial ranging slots have been allocated to the corresponding uplink frame.

Step S1407 will now be described.

The mobile station transmits the initial ranging code to the corresponding initial ranging slots by applying random backoff value.

Step S1408 will be described.

The base station which has received the initial ranging code from the mobile station notifies the mobile station of uplink transmission parameter adjustment values such as time offset, frequency offset and power offset through the ranging response message (RNG-RSP), and the mobile station which has received the uplink transmission parameter adjustment values adjusts uplink transmission parameters. The mobile station and the base station repeat such exchange procedures of the ranging code and the ranging response message to allow the mobile station to perform uplink transmission parameter adjustment. If the uplink transmission parameter adjustment is successfully performed, the base station forwards a success code to a corresponding mobile station along with the ranging response message.

Hereinafter, step S1409 will be described.

The base station allocates the non-contention based uplink resource to the corresponding mobile station through a specific uplink map information element (for example, CDMA Allocation UL-MAP IE) to allow the mobile station to transmit the ranging request message (RNG-REQ). The mobile station transmits the ranging request message by using the allocated uplink resource, wherein the ranging request message includes MAC address of the mobile station.

Step S1410 will be described below.

The base station which has received the ranging request message from the mobile station transmits the ranging response message for allocating the basic CID and the primary CID to the corresponding mobile station.

Hereinafter, step S1411 will be described.

Figure 1:
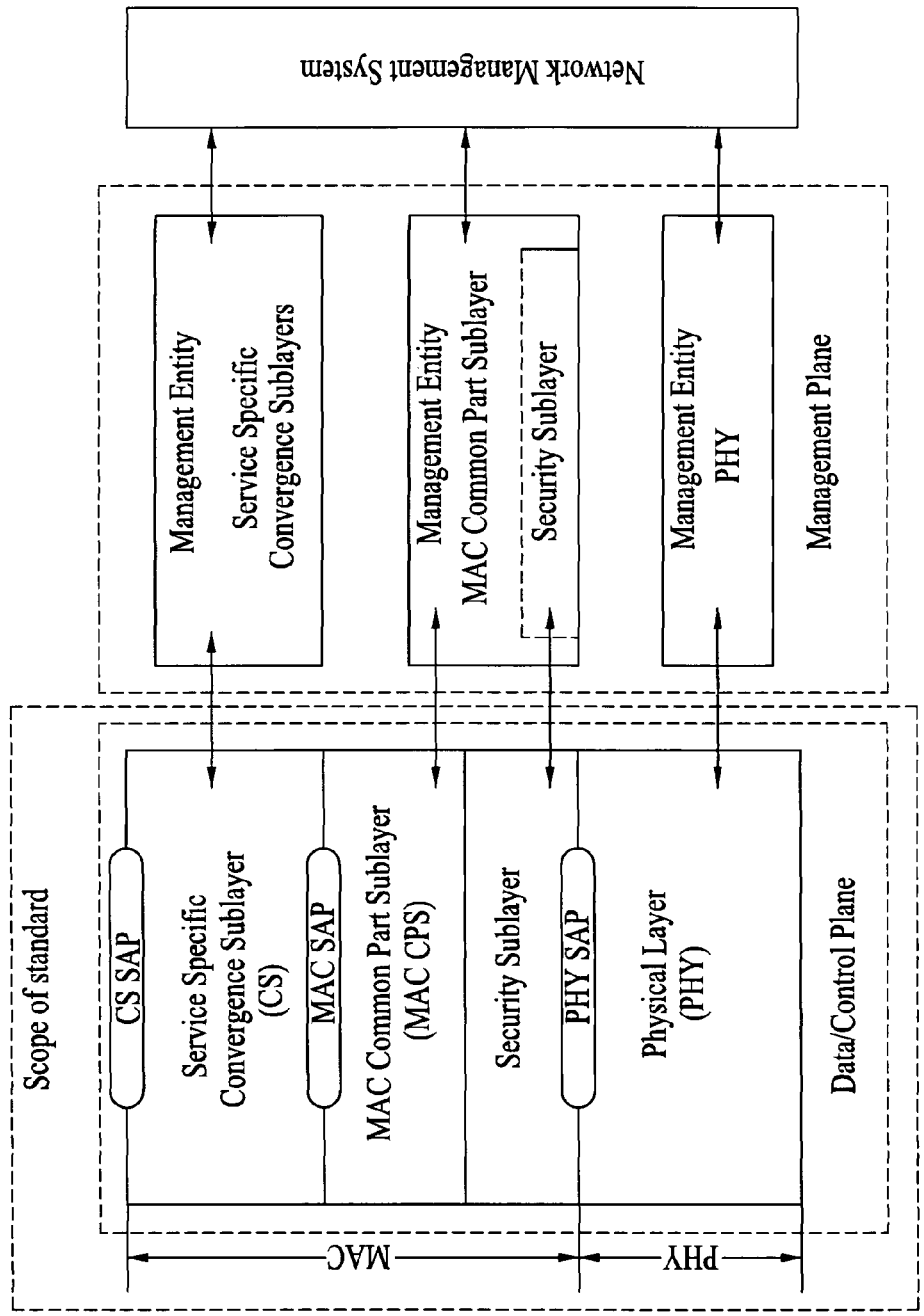
FIG. 1 illustrates a protocol hierarchal structure of a broadband wireless access system according to the related art.
Figure 2:
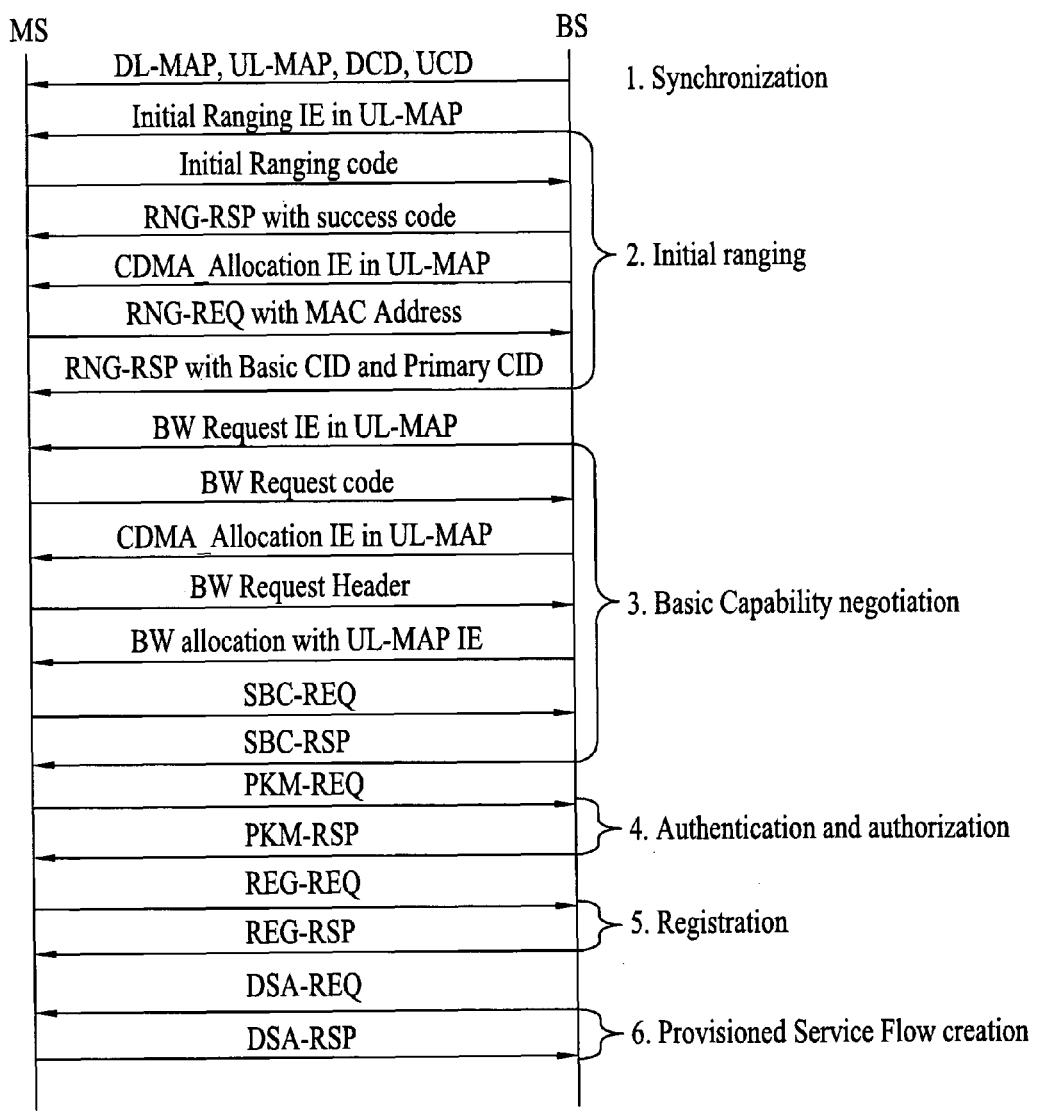
FIG. 2 illustrates procedures of performing network entry when a mobile station is initiated in an orthogonal frequency division multiple access (OFDMA) type broadband wireless access system according to the related art.
Figure 3:
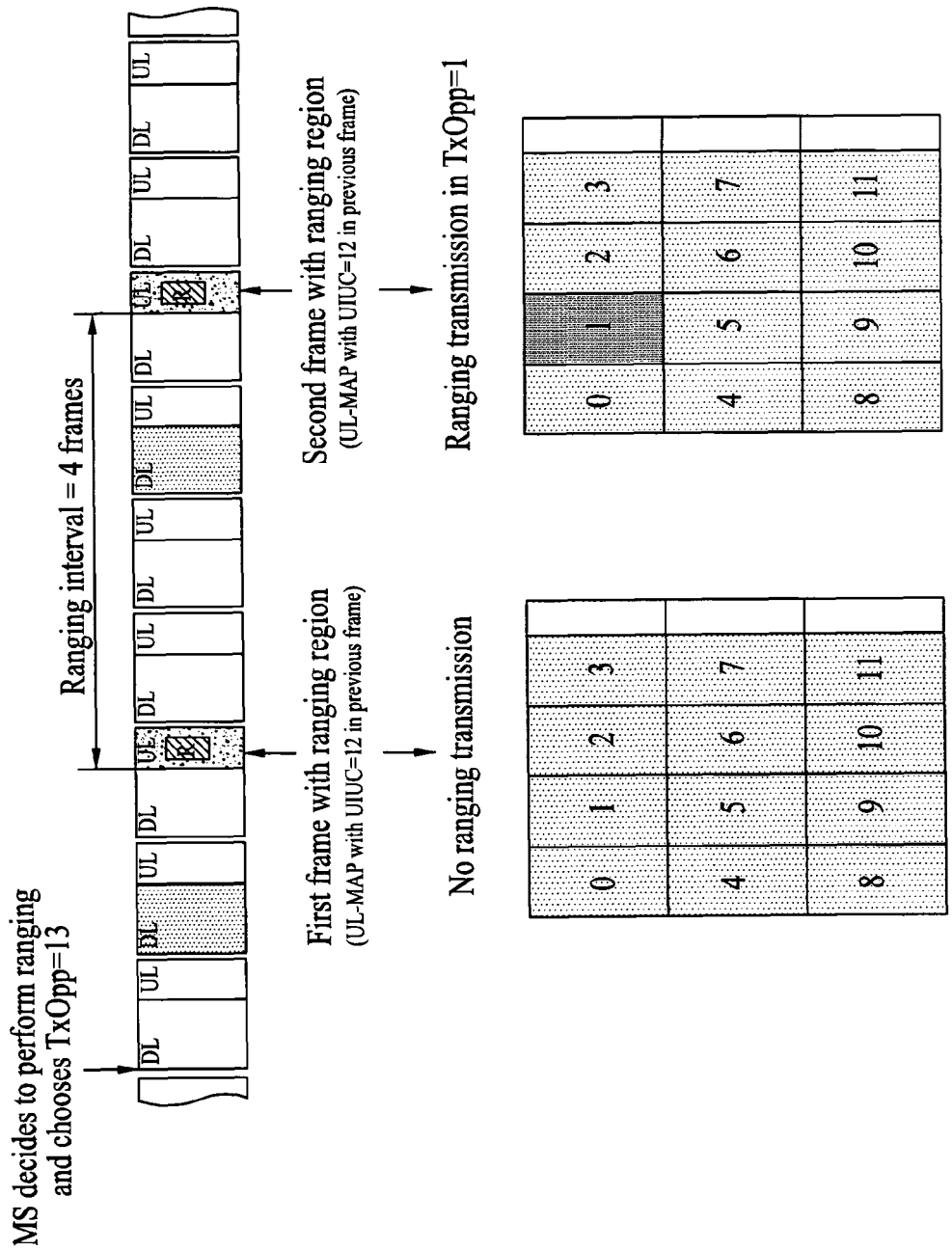
FIG. 3 is a block diagram illustrating the operation when random backoff is used during initial ranging of a mobile station.
Figure 4:
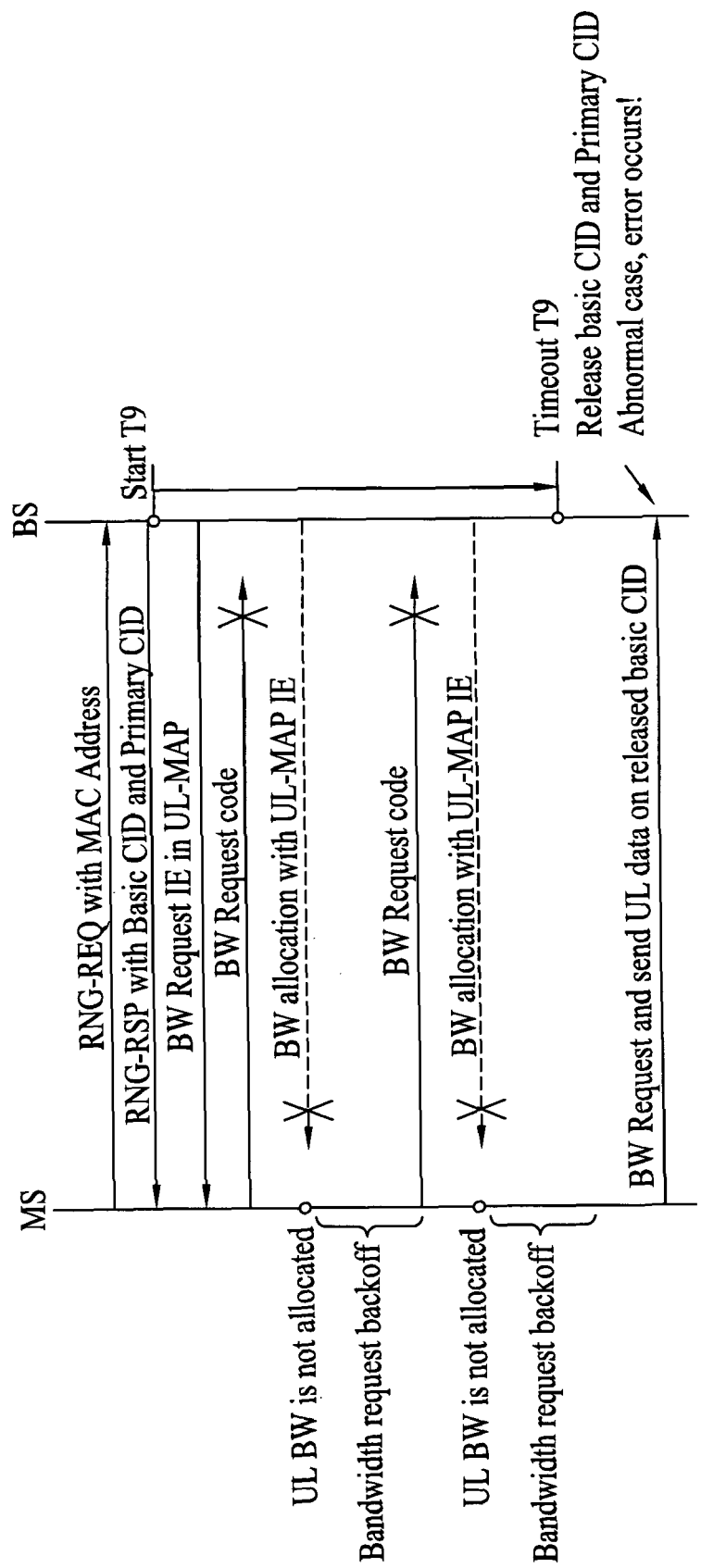
FIG. 4 illustrates problems that may occur between an initial ranging procedure and a basic capability negotiation procedure according to the related art.
Figure 5:
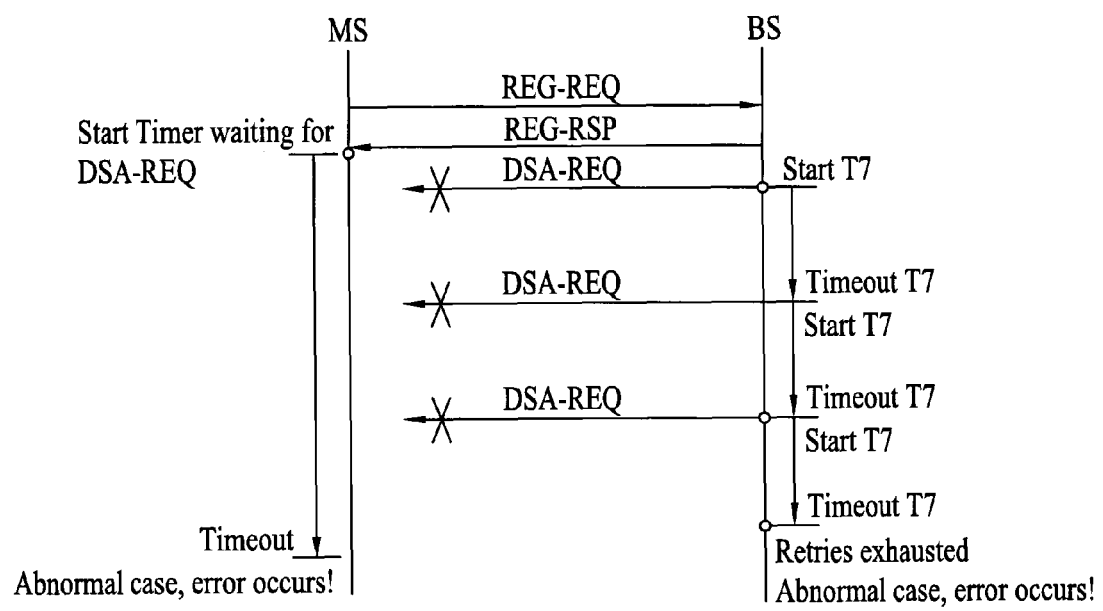
FIG. 5 illustrates problems that may occur between a base station registration procedure and a 'Provisioned Service Flow' procedure when a mobile station is initiated in the related art.

The mobile station and the base station which have completed the ranging procedure perform procedures such as basic capability negotiation, authentication and key exchange, registration and service flow setting, as illustrated in FIG. 2.

Step S1412 will be described as follows. The mobile station and the base station complete the network entry procedure and are operated in normal operation mode.

If the base station maintains information of the mobile stations during restart of the base station, the base station and the mobile station can be converted into normal operation mode through exchange of information required for the step S1411 by using the ranging message of the step S1409 and the step S1410. In this case, the message exchange procedure required for the step S1411 may be omitted.

As described above, the example of setting the backoff window value used for spontaneous network entry differently from the backoff window value used for restart of the base station has been described.

Hereinafter, an example of the operation for applying the initial ranging backoff window value depending on the operation modes of the mobile station during restart of the base station will be described.

Figure 15:
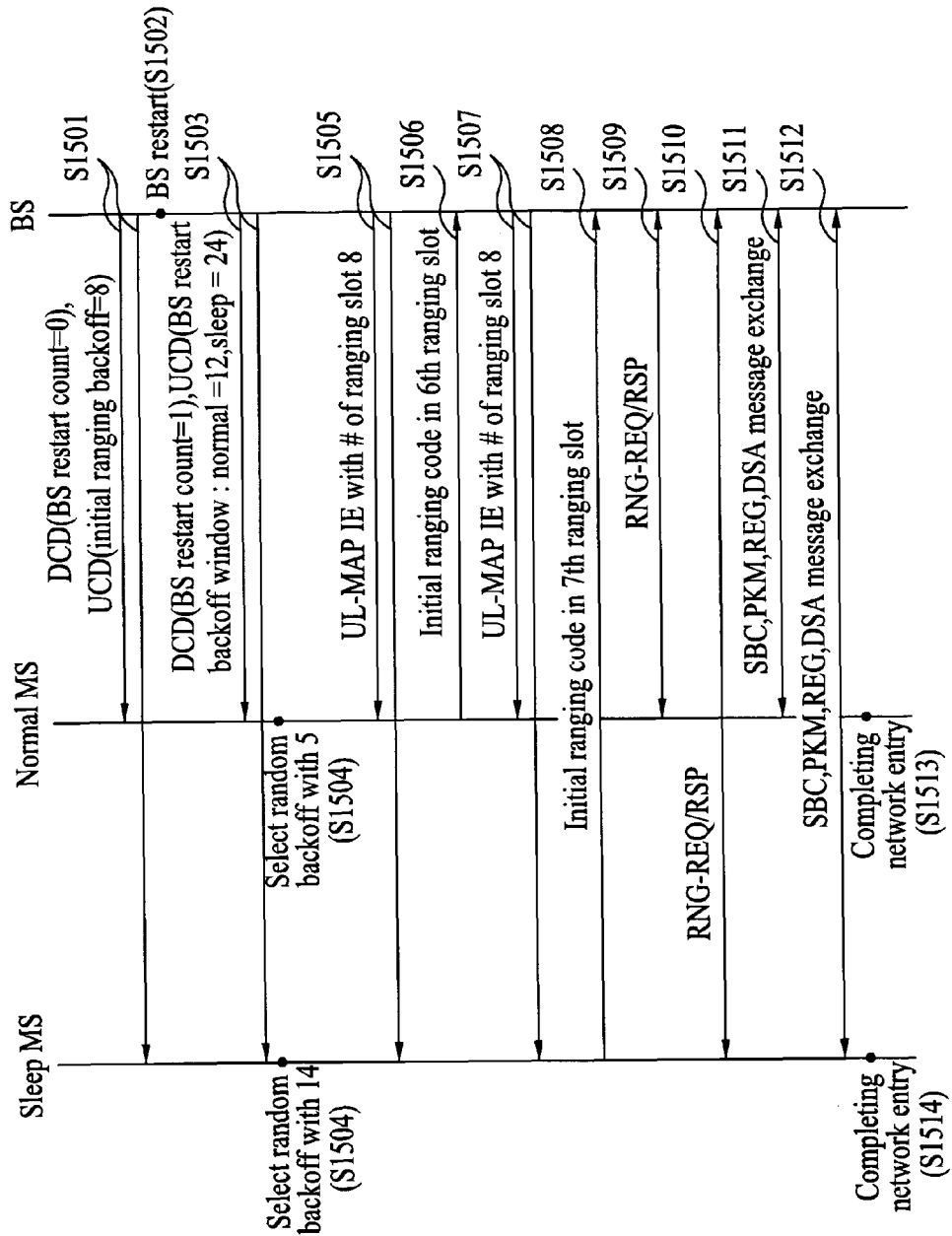
FIG. 15 is a flow chart illustrating a method of applying initial ranging backoff window depending on operation modes.

FIG. 15 is a flow chart illustrating a method of applying initial ranging backoff window depending on the operation modes. Hereinafter, the method of applying the initial ranging backoff window depending on the operation modes will be described with reference to FIG. 15.

Step S1501 will be described below.

The mobile station performs initial network entry procedure by applying random backoff during initial ranging through initial ranging backoff parameter of an uplink channel descriptor (UCD) message during initial network entry. After registration to the base station, the mobile station receives BS restart count parameter of a downlink channel descriptor (DCD) message to determine whether to again perform the network entry procedure. In the example of FIG. 15, the backoff value is set to 8.

The base station restarts due to power failure or maintenance (S1502).

Hereinafter, step S1503 will be described.

The base station increases the BS restart count parameter value of the downlink channel descriptor (DCD) message by 1 and then forwards the increased value to the mobile station. Also, the base station forwards backoff window value for initial ranging code transmission to the mobile station through the uplink channel descriptor message (UCD) during initial network entry procedure of the mobile station. At this time, the base station allows different backoff window parameter values depending on the operation modes of the mobile station. In the example of FIG. 15, the backoff window value of the mobile station in normal mode is set to 12 while the backoff window value of the mobile station in sleep mode is set to 24.

Step S1504 will now be described.

The mobile station, which has received from the base station the downlink channel descriptor message parameter representing that the BS restart count has been increased, performs the network entry procedure. At this time, the mobile station determines random backoff value for initial ranging code transmission based on the backoff window parameter value (illustrated in Table 8a and Table 8b) of the uplink channel descriptor message received from the base station. If the backoff window value depends on the operation modes, a random backoff value is set subject to the backoff window value of the corresponding mode. If the backoff window parameter value of the mobile station in normal operation mode is set to 12, the mobile station of the normal mode randomly determines the backoff value (5 in this embodiment) within 12 windows. If the backoff window parameter value of the mobile station in sleep mode is set to 24, the mobile station of the sleep mode randomly determines the backoff value (24 in this embodiment) within 24 windows.

If 8 initial ranging slots are allocated from the uplink map message (S1505), the mobile station in the normal operation mode transmits a random initial ranging code to the sixth initial ranging slot of the corresponding uplink frame by setting the random backoff value to 5 while the mobile station in the sleep mode waits for next initial ranging slots until the next initial ranging slots are allocated (S1506).

If 8 initial ranging slots are allocated from the uplink map message (S1507), the mobile station in the sleep mode transmits a random initial ranging code to the seventh initial ranging slot of the corresponding uplink frame by setting the random backoff value to 14 (S1508).

Hereinafter, step S1509 will be described.

The mobile station in normal operation mode, which has transmitted the initial ranging code, receives the ranging response message, and receives the ranging response message after transmitting the ranging request message if the ranging parameter adjustment ends, thereby completing the initial ranging procedure.

Hereinafter, step S1510 will be described.

The mobile station which has transmitted the initial ranging code receives the ranging response message, and receives the ranging response message after transmitting the ranging request message if the ranging parameter adjustment ends, thereby completing the initial ranging procedure.

Step S1511 will now be described.

The mobile station in the normal operation mode and the base station which have completed the ranging procedure perform procedures such as basic capability negotiation, authentication and key exchange, registration and service flow setting, as illustrated in FIG. 2.

Step S1512 will be described as follows.

The mobile station in the normal operation mode and the base station, which have completed the ranging procedure, perform procedures such as basic capability negotiation, authentication and key exchange, registration and service flow setting, as illustrated in FIG. 2.

Hereinafter, step S1513 will be described.

The mobile station in the normal mode and the base station complete the network re-entry procedure and are operated in the normal operation mode.

Hereinafter, step S1514 will be described.

The mobile station in the sleep mode and the base station complete the network re-entry procedure and are operated in the normal operation mode. The mobile station can request the base station of conversion to the sleep mode by using a sleep request message or a sleep control header.

If the base station maintains information of the mobile stations during restart of the base station, the base station and the mobile station can be converted into the normal operation mode through exchange of information required for the step S1511 or the step S1512 by using the ranging message of the step S1509 and the step S1510. In this case, the message exchange procedure required for the step S1511 or the step S1512 may be omitted.

Hereinafter, a method of providing a plurality of modes through separate signaling and controlling a backoff window value depending on the modes will be described.

The examples of FIG. 14 and FIG. 15 relate to a method of defining a backoff window value for performing initial ranging of the mobile station during restart of the base station differently from a backoff window value for performing initial ranging used for spontaneous network entry of the mobile station. In other words, in the examples of FIG. 14 and FIG. 15, the network determines the backoff window value suitable for detailed status and then provides the determined backoff window value to the mobile station, while the mobile station is operated depending on the backoff window value.

However, an example which will be described below provides information of a specific control mode through separate signaling. For example, if a problem occurs in performing initial ranging of the mobile station during restart of the base station, the base station determines the control mode as "1" and then transmits the determined value to the mobile station. Also, if a problem occurs in performing initial ranging used for spontaneous network entry of the mobile station, the base station determines the control mode as "0" and then transmits the determined value to the mobile station.

The mobile station can determine the backoff window value through the control mode. In other words, if the control mode is determined as "1" and then transmitted to the mobile station, the mobile station may perform network entry by setting a relatively great backoff window value. If the control mode is determined as "0" and then transmitted to the mobile station, the mobile station may perform network entry by setting a relatively small backoff window value.

Through the operation as above, overhead between the network and the mobile station can be reduced, and network entry collision between the mobile stations, which may occur during restart of the base station, can be minimized.

The example of the control mode may be applied to the operation modes (for example, normal mode, sleep mode, and idle mode) of the mobile station. For example, different control modes are allocated depending on the operation modes. In other words, the backoff window value which is to be set by the mobile station operated in normal mode may be notified through the control mode value. The backoff window value which is to be set by the mobile station operated in idle mode may be notified through the control mode value. Also, the backoff window value which is to be set by the mobile station operated in sleep mode may be notified through the control mode value.

Furthermore, the service types provided to the mobile station can be controlled by the control mode. For example, QoS information provided to the mobile station can be notified through the control mode value. In other words, a first specific control mode value can be given to the mobile station which requires real-time service, and a second specific control mode value can be given to the mobile station which does not require real-time service. The mobile station can set its suitable backoff window value through the given control mode value and try network re-entry.

The aforementioned operation modes can be selected in various modes, wherein each operation mode can be classified into various classes depending on its characteristics.

Another embodiment of the present invention relates to a method of controlling power saving class configuration information of a previous service base station to release, update or maintain a new handover target base station after handover when the mobile station in power saving mode performs handover.

Figure 16:
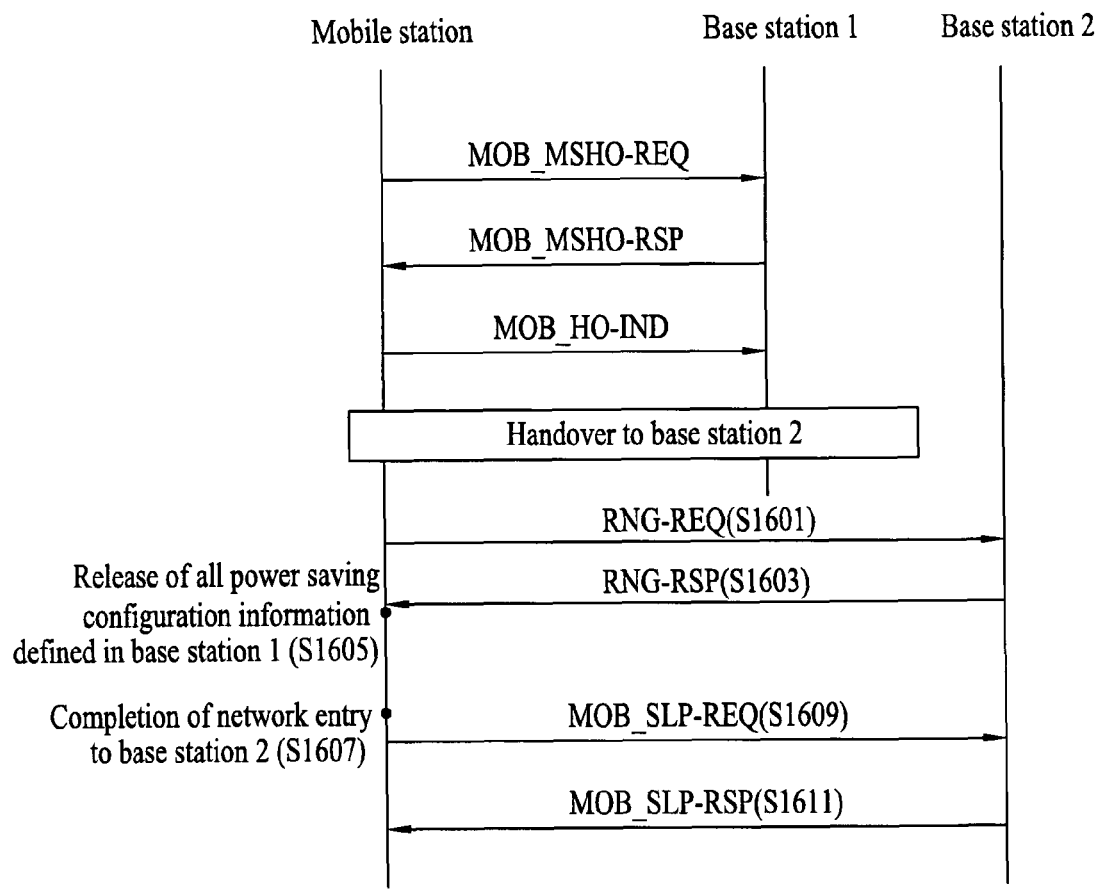
FIG. 16 is a flow chart between a mobile station and a base station to illustrate a procedure of performing handover in a power saving mode in accordance with one embodiment of the present invention.

First, an embodiment (embodiment 1) corresponding to the case where power saving class configuration information of the previous service base station is not maintained but released will be described. FIG. 16 is a signal flow between the mobile station and the base station to illustrate the procedure of performing handover in the embodiment 1.

Figure 6:
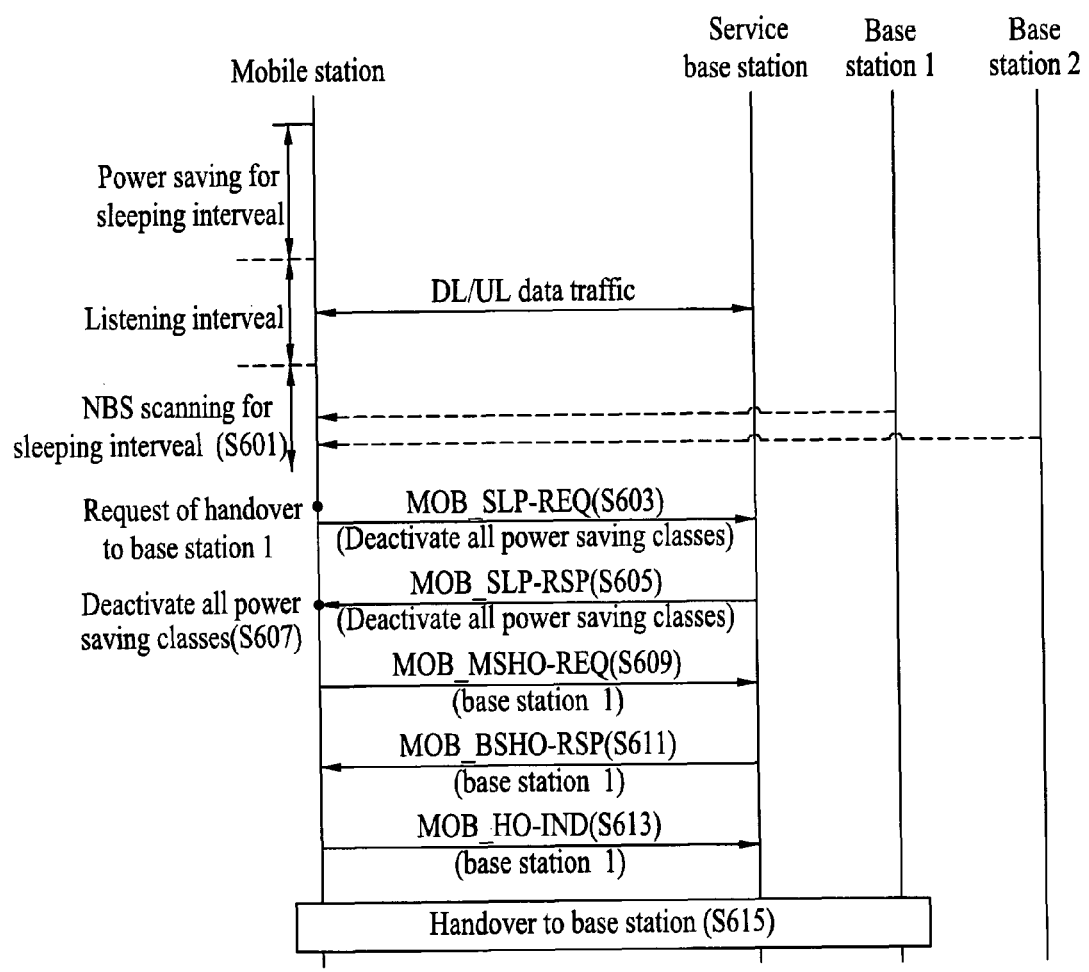
FIG. 6 is a flow chart between a mobile station and a base station to illustrate the procedure of performing related art handover in a power saving mode.
Figure 7:
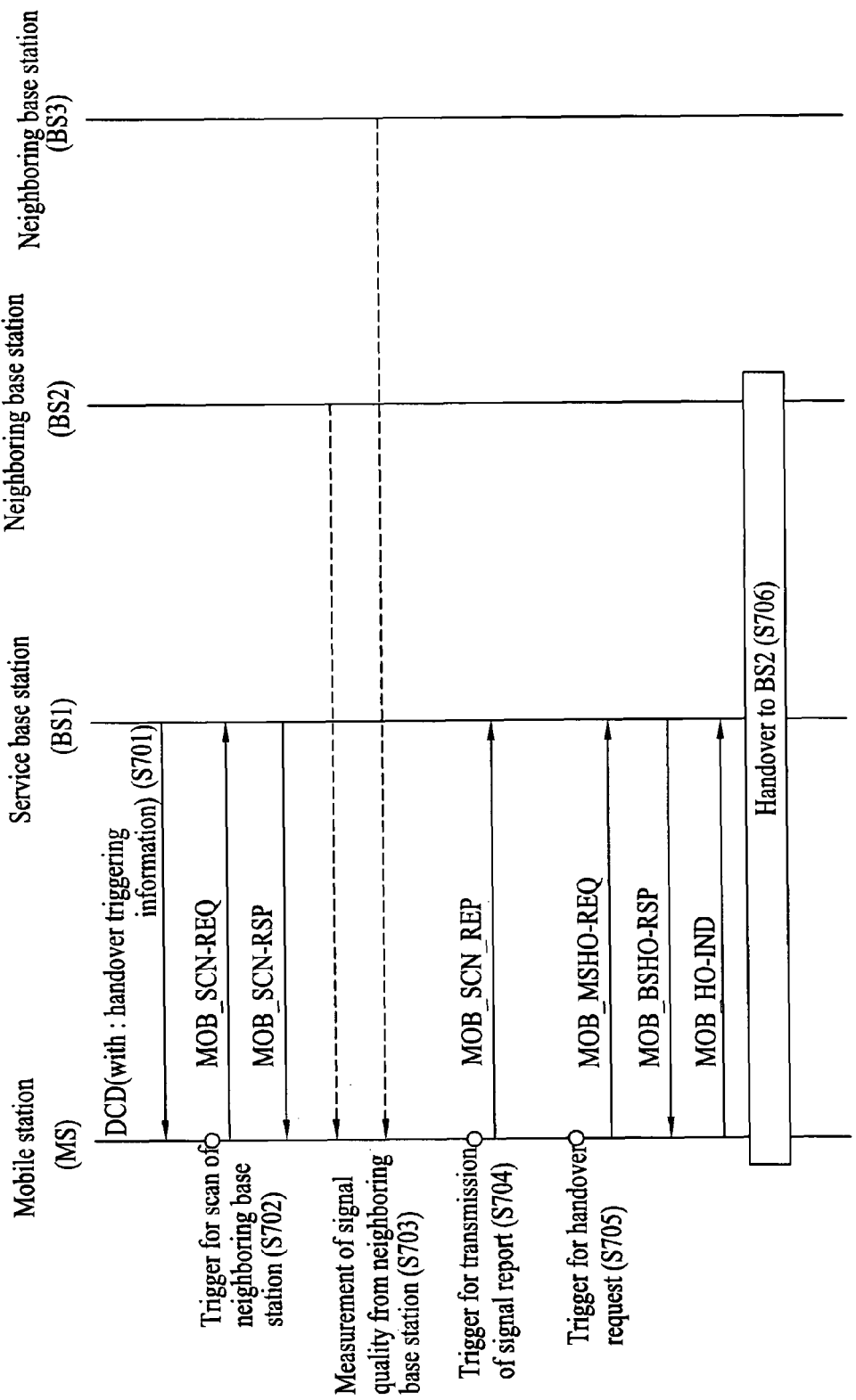
FIG. 7 is a flow chart illustrating the procedure between a mobile station and base stations to sequentially illustrate a general procedure of performing handover according to the related art.

The mobile station transmits a handover request message (MOB_MSHO-REQ) to the service base station (base station 1) and receives a handover response message (MOB_MSHO-RSP) in response to the handover request message. Afterwards, the mobile station forwards a handover indication message (MOB_HO_IND) to the service base station to request release connection with the service base station (base station 1) and performs a network re-registration procedure with the handover target base station (base station 2). This procedure has been described in the steps S609 to S615 of FIG. 6.

Subsequently, the mobile station transmits a ranging request message (RNG-REQ) to the corresponding base station to perform network entry to the handover target base station (base station 2) (S1601). The handover target base station (base station 2) which has received the ranging request message (RNG-REQ) transmits a ranging response message (RNG-RSP) to the mobile station (S1603), wherein the ranging response message includes a power saving class update parameter. At this time, a specific value (for example, 0x00 (see Table 6)) is designated in the power saving class update parameter, wherein the specific value indicates release of the power saving class configuration information of the mobile station, which is defined between the mobile station and the previous base station. Accordingly, the mobile station which has received the ranging response message (RNG-RSP)

releases previous power saving class configuration information depending on the power saving class update parameter (S1605).

Afterwards, if the network entry and registration procedure of the handover target base station (base station 2) is completed (S1607), the mobile station newly defines a power saving class and transmits a sleep request message (MOB_SLP-REQ) to the new service base station (base station 2) to request activation of the corresponding power saving class (S1609). The new service base station (base station 2) which has received the sleep request message (MOB_SLP-REQ) from the mobile station indicates definition and activation of the power saving class through a sleep response message (MOB_SLP-RSP) (S1611).

Figure 17:
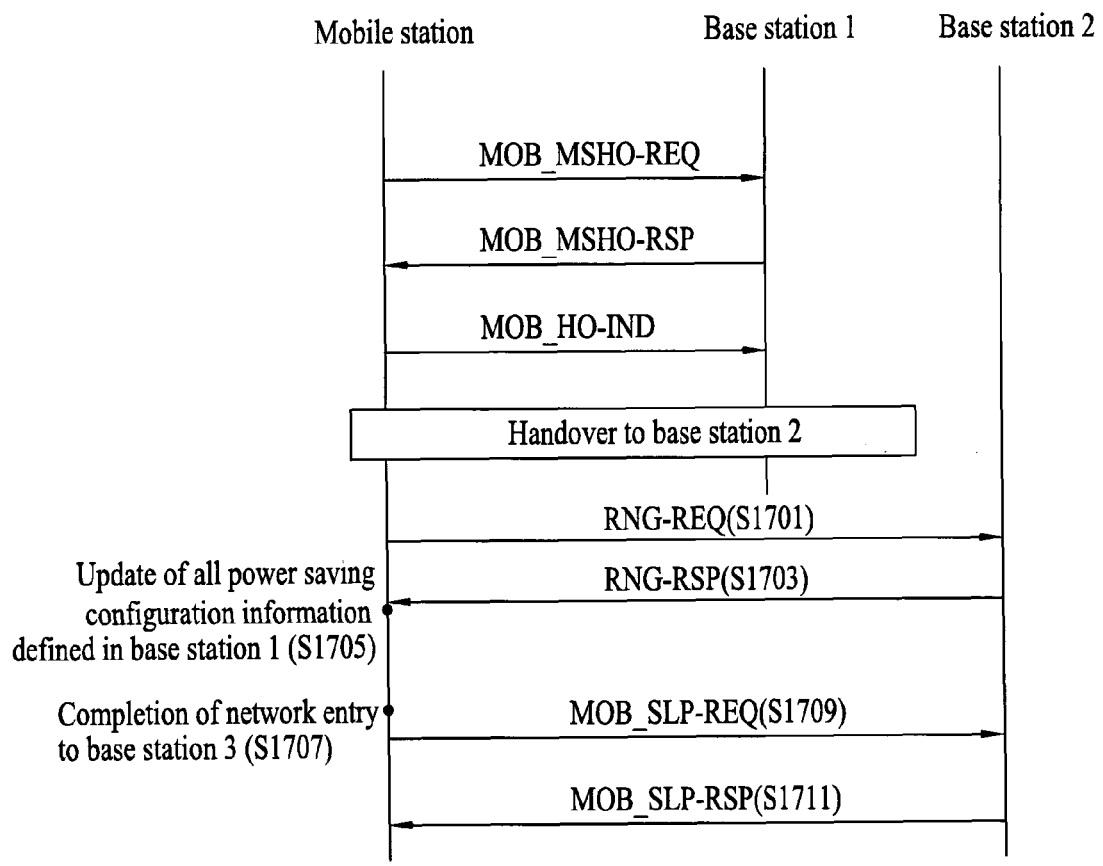
FIG. 17 is a flow chart between a mobile station and a base station to illustrate a procedure of performing handover in a power saving mode in accordance with another embodiment of the present invention.

Next, an embodiment (embodiment 2) corresponding to the case where the power saving class configuration information of the previous service base station is updated through a predetermined parameter value after handover will be described. FIG. 17 is a flow chart between the mobile station and the base station to illustrate the procedure of performing handover in the embodiment 2.

The mobile station transmits a handover request message (MOB_MSHO-REQ) to the service base station (base station 1) and receives a handover response message (MOB_MSHO-RSP) in response to the handover request message. Afterwards, the mobile station forwards a handover indication message (MOB_HO_IND) to the service base station to request release connection with the service base station (base station 1) and performs a network re-registration procedure with the handover target base station (base station 2). This procedure is the same as that described with reference to FIG. 6.

Subsequently, the mobile station transmits a ranging request message (RNG-REQ) to the corresponding base station to perform network entry to the handover target base station (base station 2) (S1701). The handover target base station (base station 2) which has received the ranging request message (RNG-REQ) transmits a ranging response message (RNG-RSP) to the mobile station (S1703), wherein the ranging response message includes a power saving class update parameter and various power saving class parameters to be updated. At this time, a specific value (for example, 0x01 (see Table 6)) is designated in the power saving class update parameter, wherein the specific value indicates update of the power saving class configuration information defined between the mobile station and the previous base station (base station 1). However, if a sleep ID parameter of the power saving class type 1 is only updated, the handover target base station may transmits sleep ID updated through the sleep ID update parameter to the mobile station, wherein the sleep update parameter includes previous sleep ID and new sleep ID.

The mobile station which has received the power saving class update indication through the ranging response message (RNG-RSP) updates the power saving class configuration information maintained with the previous base station (base station 1) to new power saving class parameter transmitted from the handover target base station (base station 2) (S1705). At this time, the mobile station may maintain or release previous configuration information of the power saving classes which are not included in the ranging response message (RNG-RSP).

An example of the power saving class parameter included in the ranging response message (RNG-RSP) is as follows.

TABLE 9

| Parameter Name | Type | length | value(variable) |
|---|---|---|---|
| Flags | 1 | 1 | Bit 0: Definition 1 = Definition of Power Saving Class present Bit 1: Operation (RNG-RSP only) 0 = Deactivation of Power Saving Class (for 1 = Activation of Power Saving Class types 1 and 2 only) Bit 2: TRF-IND-Required For Power Saving Class Type I only. 1 = BS shall transmit at least one TRF-IND message during each listening window of the Power Saving Class. This bit shall be set to 0 for another types Bits 3~7: Reserved |
| Power_Saving_Class_ID | 2 | 1 | Assigned Power Saving Class identifier Not used for RNG-REQ message |
| Power_Saving_Class_Type | 3 | 1 | Power Saving Class Type as specified in 6.3.2.3 |
| Start_frame_number | 4 | 1 | Start frame number for first sleep window Not used for RNG-REQ message |
| initial-sleep window | 5 | 1 | Initial-sleep window |
| listening window | 6 | 1 | Assigned Duration of MS listening interval(measured in frames) |
| final-sleep window base | 7 | 1 | Assigned final value for sleep interval (measured in frames) - base |
| final-sleep window exponent | 8 | 1 | Assigned final value for sleep interval (measured in frames) - exponent |
| SLPID | 9 | 1 | A number assigned by the BS whenever an MS is instructed to enter sleep mode |
| CID | 10 | 2 | CID of connection to be included into the Power Saving Class. There may be several TLVs of this type in a single compound Power_Saving_Class_Parameters TLV |
| Direction | 11 | 1 | Direction for management connection, which is added to Power Saving Class |

Afterwards, if the network entry and registration procedure of the handover target base station (base station 2) is completed (S1707), the mobile station newly defines a power saving class and transmits a sleep request message (MOB_SLP-REQ) to the new service base station (base station 2) to request activation of the corresponding power saving class (S1709). The new service base station (base station 2) which has received the sleep request message (MOB_SLP-REQ)

from the mobile station indicates definition and activation of the power saving class through a sleep response message (MOB_SLP-RSP) (S1711).

Figure 18:
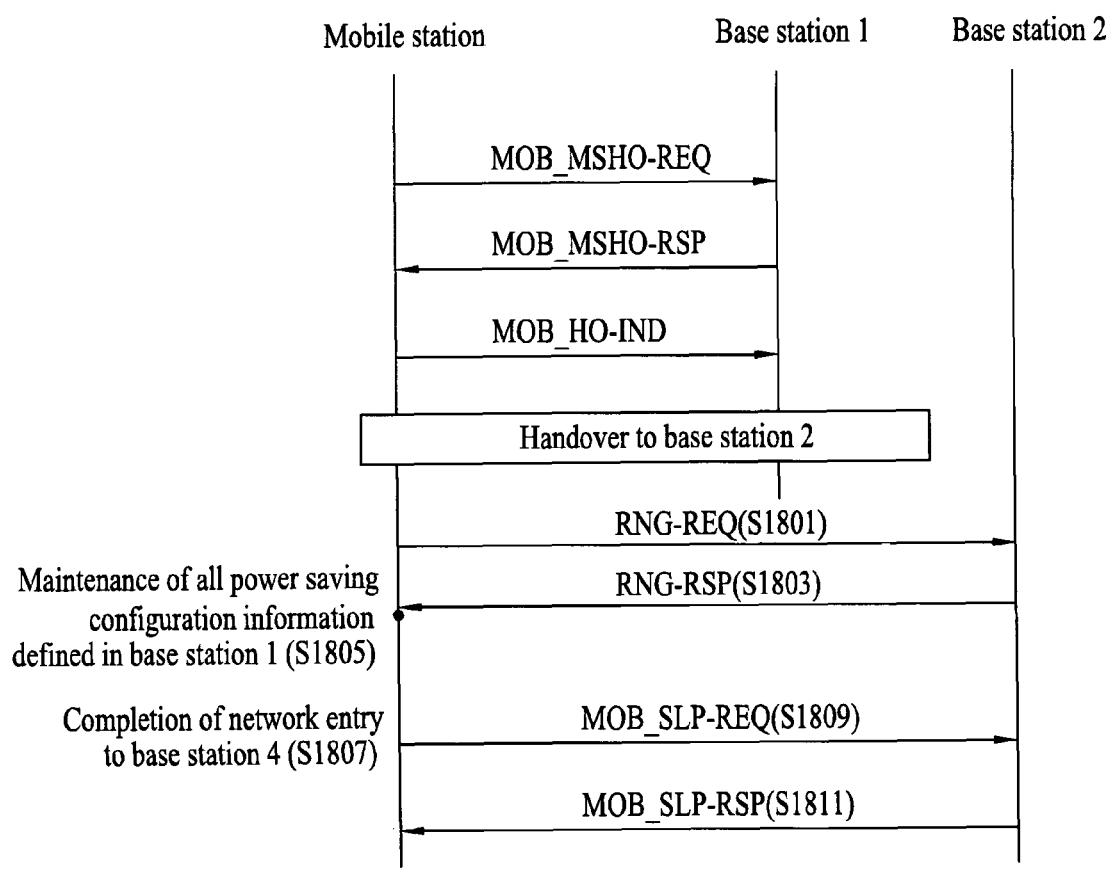
FIG. 18 is a flow chart between a mobile station and a base station to illustrate a procedure of performing handover in a power saving mode in accordance with other embodiment of the present invention.

Next, an embodiment (embodiment 3) corresponding to the case where the power saving class configuration information of the previous service base station is maintained through a predetermined parameter value after handover will be described. FIG. 18 is a flow chart between the mobile station and the base station to illustrate the procedure of performing handover in the embodiment 3.

The mobile station transmits a handover request message (MOB_MSHO-REQ) to the service base station (base station 1) and receives a handover response message (MOB_MSHO-RSP) in response to the handover request message. Afterwards, the mobile station forwards a handover indication message (MOB_HO_IND) to the service base station to request release connection with the service base station (base-station 1) and performs a network re-registration procedure with the handover target base station (base station 2). This procedure is the same as that described with reference to FIG. 6.

Subsequently, the mobile station transmits a ranging request message (RNG-REQ) to the corresponding base station to perform network entry to the handover target base station (base station 2) (S1801). The handover target base station (base station 2) which has received the ranging request message (RNG-REQ) transmits a ranging response message (RNG-RSP) to the mobile station (S1803), wherein the ranging response message includes a power saving class update parameter. At this time, a specific value (for example, 0x02 (see Table 6)) is designated in the power saving class update parameter, wherein the specific value indicates maintenance of the power saving class configuration information defined between the mobile station and the previous base station.

The mobile station which has received the power saving class parameter, which indicates maintenance of the power saving class parameter, through the ranging response message (RNG-RSP) maintains the power saving class configuration information maintained with the previous base station even after handover (S1805).

Afterwards, if the network entry and registration procedure of the handover target base station (base station 2) is completed (S1807), the mobile station newly defines a power saving class and transmits a sleep request message (MOB_SLP-REQ) to the new service base station (base station 2) to request activation of the corresponding power saving class (S1809). The new service base station (base station 2) which has received the sleep request message (MOB_SLP-REQ) from the mobile station indicates activation of the power saving class through a sleep response message (MOB_SLP-RSP) (S1811).

The power saving class update parameter defined in the present invention may be forwarded from the handover target base station to the mobile station through the ranging response message (RNG-RSP) as described in the embodiments 1, 2 and 3. Selectively, the power saving class update parameter may be forwarded to the mobile station through the registration response message (REG-RSP) from the handover target base station or the handover message (MOB_BSHO-REQ, MOB_BSHO-RSP) of the previous service base station.

Furthermore, even in case that the mobile station cancels handover to the handover target base station and performs network re-entry to the previous service base station, the procedures for release/update/maintenance of the power saving class may be performed by using the power saving class update parameter of the ranging response message (RNG-RSP) forwarded from the previous service base station as described in the embodiments 1, 2, and 3.

Meanwhile, the power saving class newly defined in the embodiment 1, the power saving class updated in the embodiment 2, and the power saving class maintained in the embodiment 3 may respectively be at least one of the classes 1 to 3. Hereinafter, when the power saving classes are set to 1, 2, 3, respectively in each embodiment, the operation of the mobile station according to the corresponding class will be described in detail.

Figure 19:
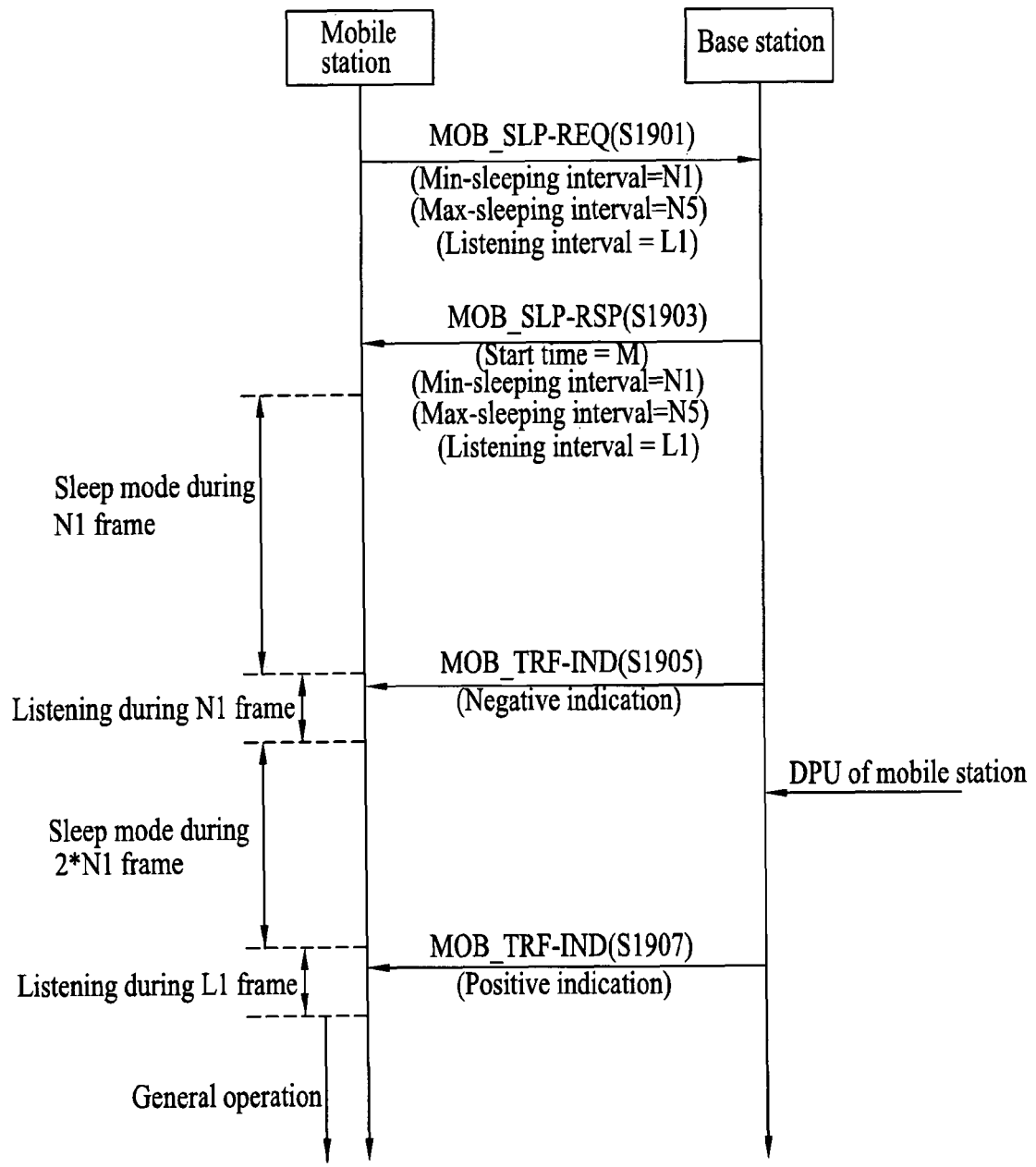
FIG. 19 is a flow chart between a mobile station and a base station to illustrate an operation procedure of the mobile station in class 1 of a power saving mode.

FIG. 19 is a flow chart between the mobile station and the base station to illustrate the operation procedure of the mobile station in class 1 of the power saving mode.

The mobile station sets values such as initial sleep window, final sleep window, and listening window in the sleep request message (MOB_SLP-REQ) and forwards the set values to the base station to request conversion to the power saving mode (S1901). An example of the sleep request message (MOB_SLP-REQ) is as follows.

TABLE 10

| Parameter Name | length (bit) | note |
| --- | --- | --- |
| Management message type = 50 | 8 | |
| Number of Classes | 8 | Number of power saving classes. |
| Definition | 1 | |
| Operation | 1 | |
| Power_Saving_Class_ID | 6 | |
| Start_frame_number | 6 | |
| Reserved | 2 | |
| Power_Saving_Class_Type | 2 | |
| Direction | 2 | |
| Traffic_triggered_wakening_flag | 1 | |
| Reserved | 3 | |
| initial-sleep window | 6, 8 | |
| listening-window | 8 | |
| final-sleep window base | 10 | |
| final-sleep window exponent | 3 | |
| Number_of_Sleep_CIDs | 3 | |
| CID | 16 | |
| TLV encoded information | variable | |

If the base station allows conversion to the power saving mode of the corresponding mobile station, the base station forwards the sleep response message (MOB_SLP-RSP) to the mobile station (S1903), wherein values such as initial sleep window, final sleep window, listening window, and initial frame number of sleep window are set in the sleep response message. At this time, an example of the sleep response message (MOB_SLP-RSP) is as follows.

TABLE 11

| Parameter Name | length (bit) | note |
| --- | --- | --- |
| Management message type = 51 | 8 | |
| Number of Classes | 8 | Number of power saving classes. |
| Length of Data | 7 | |
| Sleep Approved | 1 | |
| Definition | 1 | |
| Operation | 1 | |
| Power_Saving_Class_ID | 6 | |
| Start_frame_number | 6 | |
| Reserved | 2 | |
| Power_Saving_Class_Type | 2 | |
| Direction | 2 | |
| initial-sleep window | 8 | |
| listening-window | 8 | |
| final-sleep window base | 10 | |

TABLE 11-continued

| Parameter Name | length (bit) | note |
|---|---|---|
| final-sleep window exponent | 3 | |
| TRF-IND required | 1 | |
| Traffic_triggered_wakening_flag | 1 | |
| Reserved | 1 | |
| SLPID | 10 | |
| Reserved | 2 | |
| Number_of_CIDs | 4 | |
| CID | 16 | |
| Maintain Diversity Set and Anchor BS | 1 | |
| MDHO/FBSS duration (s) | 3 | |
| Padding | variable | If needed for alignment to byte boundary |
| Power Saving Class TLV encoded information | variable | |
| REQ-duration | 8 | |
| TLV encoded information | variable | |

The mobile station maintains a sleeping interval equal to the initial sleep window at the conversion time to the power saving mode. If the sleeping interval expires, the mobile station receives a traffic notification message (MOB_TRF_IND) from the base station for the listening interval preceded by the sleeping interval (S1905). In case of no down traffic toward the mobile station (negative indication), the mobile station maintains the power saving mode for a time period equivalent to twice of the initial sleep window. At this time, an example of the traffic notification message (MOB_TRF_IND) is as follows.

TABLE 12

| Parameter Name | length (bit) | note |
|---|---|---|
| Management message type = 52 | 8 | |
| FMT | 1 | |
| SLPID Group Indication bit-map | 32 | N-th bit of SLPID-Group indication bit-map MSB corresponds to N = 0] is allocated to SLPID Group that includes MS with SLPID values from N * 32 to N * 32 + 31 Meaning of this bit 0: There is no traffic for all the 32 MS that belong to the SLPID-Group 1: There is traffic for at least one MS in SLPID-Group. |
| Traffic Indication Bitmap | variable | Traffic Indication bit map comprises the multiples of 32-bit long Traffic Indication unit. A Traffic Indication unit for 32 SLPIDs is added to MOB_TRF-IND message whenever its SLPID Group is set to 1 32 bits of Traffic Indication Unit (starting from MSB) are allocated to MS in the ascending order of their SLPID values: 0: Negative indication 1: Positive indication |
| Num_Pos SLPIDs | 8 | Number of CIDs following |
| | 10 | |
| Padding | variable | If needed, for alignment to byte boundary. |
| TLV encoded items | variable | |

The sleeping interval continues to increase through the above manner (set next sleep window to twice of previous sleep window). The final sleep window size is set as follows through final window base and final window exponent which are determined through the sleep response message (MOB_SLP-RSP).

final sleep window=final sleep window base*$2^{final\ window\ exponent}$

If the mobile station receives the traffic notification message for the listening interval (positive indication), the mobile station ends the power saving mode, wherein the traffic notification message indicates down traffic toward the mobile station.

Figure 20:
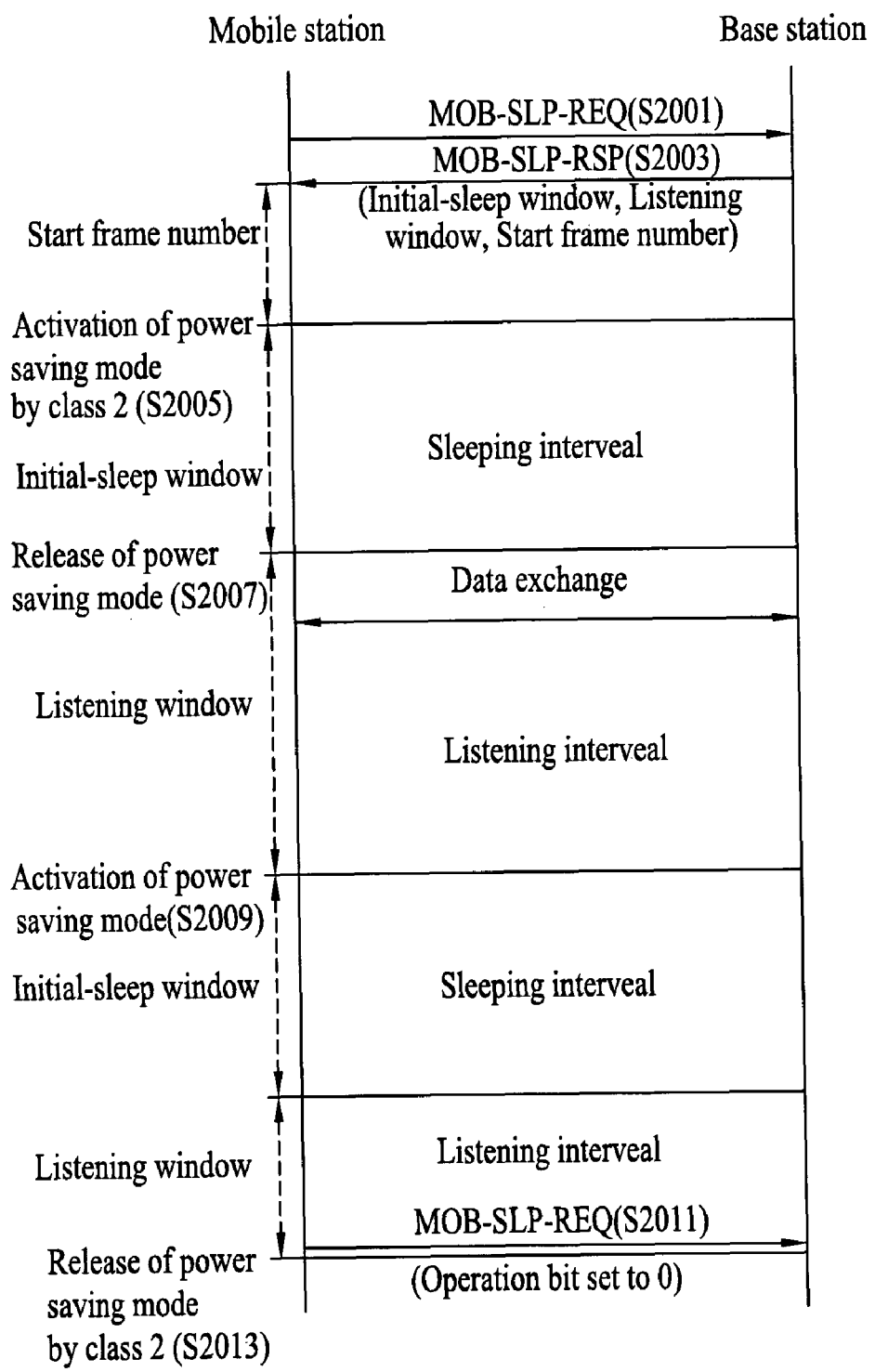
FIG. 20 is a flow chart between a mobile station and a base station to illustrate an operation procedure of the mobile station in class 2 of a power saving mode.

Next, FIG. 20 is a flow chart between the mobile station and the base station to illustrate the operation procedure of the mobile station in class 2 of the power saving mode.

The mobile station forwards the sleep request message (MOB_SLP-REQ) to the base station to request conversion to class 2 of the power saving mode (S2001). The base station which has received the sleep request message MOB_SLP-REQ) sets a fixed sleeping interval, a fixed listening interval, and conversion time to the power saving mode in the sleep response message (MOB_SLP-RSP) to allow the mobile station to perform conversion to class 2 of the power saving mode (S2003).

The mobile station maintains the power saving mode by the sleeping interval at the conversion time to the power saving mode (S2005). If the sleeping interval expires, the mobile station synchronizes with the base station to maintain uplink/downlink communication with the base station and receives downlink data from the base station and transmits uplink data to the base station for the listening interval (S2007).

If the listening interval expires, the mobile station maintains the power saving mode for the sleeping interval to save the power (S2009). Afterwards, the mobile station is operated in class 2 of the power saving mode by repeating the step S2007 and the step S2009.

If the mobile station desires to end class 2 of the power saving mode, the mobile station sets power saving mode end in the sleep request message (MOB_SLP-REQ) during the listening interval and forwards the set power saving mode end to the base station or transmits user data to the base station during the sleeping interval (S2011).

Figure 21:
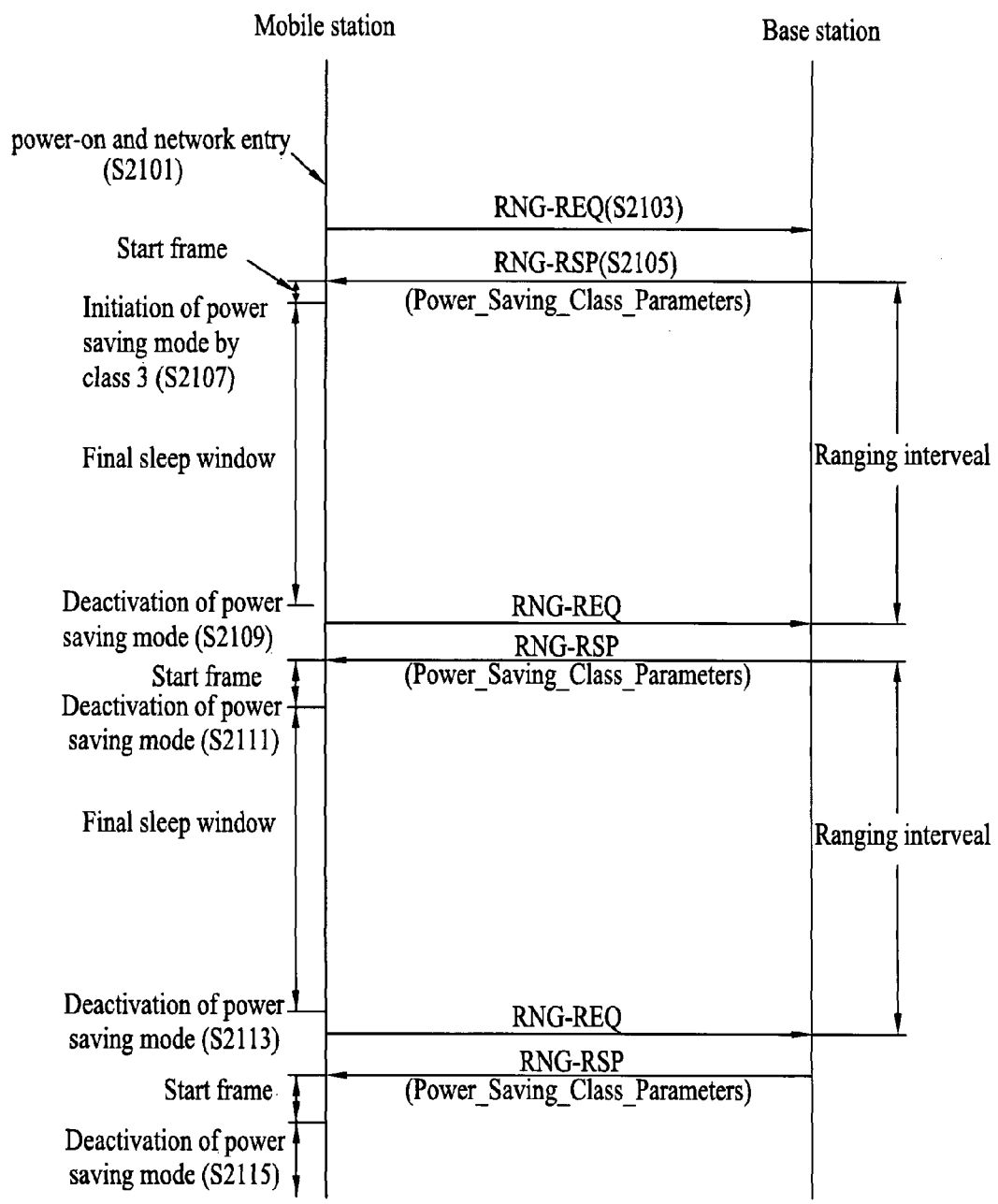
FIG. 21 is a flow chart between a mobile station and a base station to illustrate an operation procedure of the mobile station in class 3 of a power saving mode.

Next, FIG. 21 is a flow chart between the mobile station and the base station to illustrate the operation procedure of the mobile station in class 3 of the power saving mode.

The mobile station is powered on and converted into the normal operation mode by the network registration procedure (S2101). Then, the mobile station periodically performs the ranging procedure to maintain uplink communication with the base station, thereby acquiring a suitable uplink transmission parameter. Accordingly, the mobile station forwards the ranging request message (RNG-REQ) to the base station at the periodic ranging time (S2103).

The base station which has received the ranging request message from the mobile station sets uplink transmission parameter adjustment value in the ranging response message and forwards the ranging response message to the corresponding mobile station. At this time, the power saving class parameter (sleeping interval, start time, etc.) illustrated in Table 6 is included in the ranging response message so as to allow the mobile station to perform conversion to class 3 of the power saving mode (S2105).

The mobile station which has received the conversion to the power saving mode through the ranging response message maintains the power saving mode for the sleeping interval at the conversion time to the power saving mode (S2107). If the sleeping interval expires, the mobile station maintains the available communication status with the base station. The mobile station performs periodic ranging with the base station at the periodic ranging time (S2109). The mobile station receives the ranging response message (RNG-RSP) from the base station to acquire the parameter value for uplink communication and the power saving parameter (S2111). The mobile station which has received the power saving parameter maintains the power saving mode for the sleeping interval at the conversion time to the power saving mode. Afterwards, the steps S409 and S411 are repeated (S2113, S2115).

Figure 22:
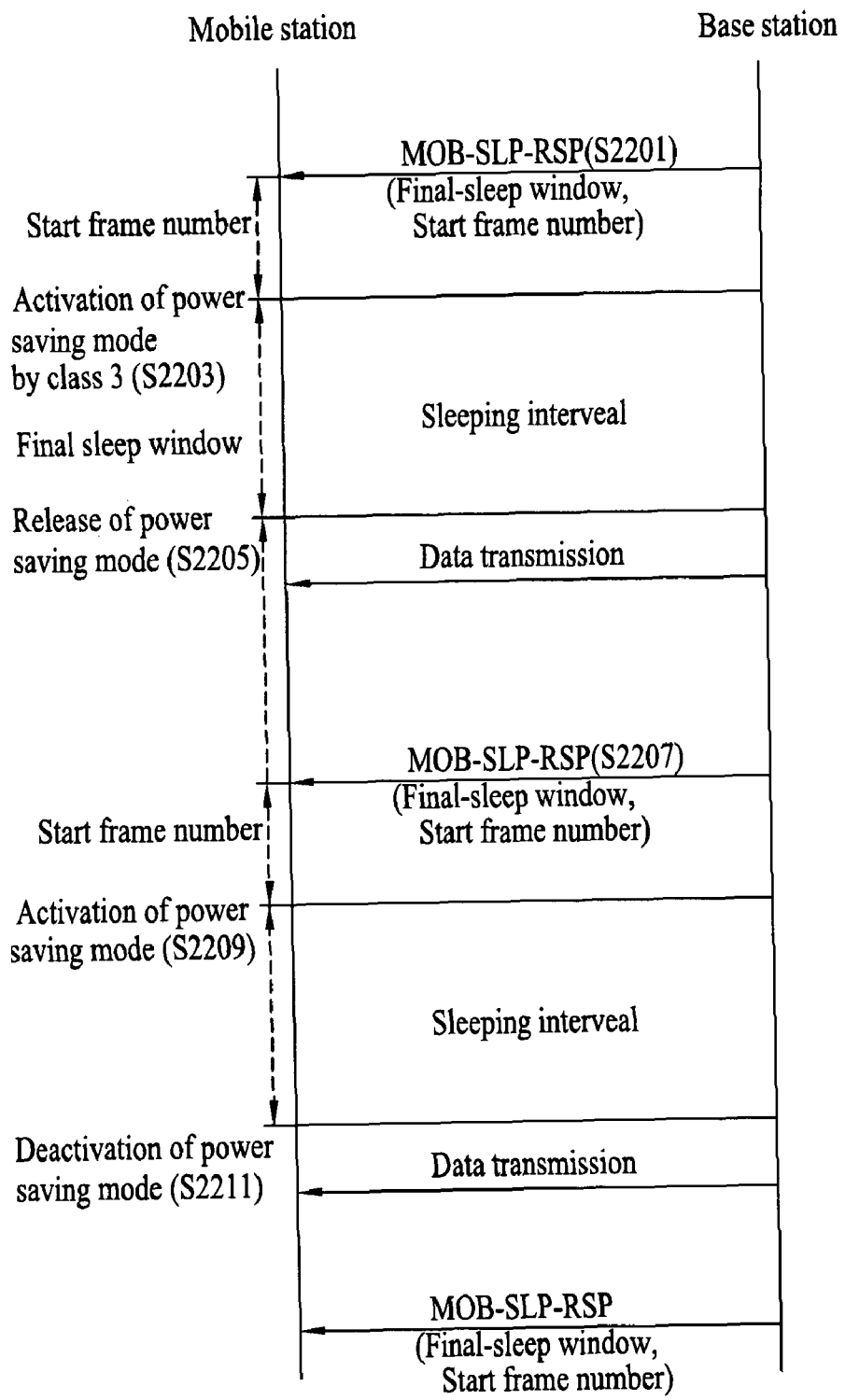
FIG. 22 is a flow chart between a mobile station and a base station to illustrate an operation procedure of the mobile station connected in multicast in class 3 of a power saving mode.

Next, FIG. 22 is a flow chart between the mobile station and the base station to illustrate the operation procedure of the mobile station connected in multicast in class 3 of the power saving mode.

The base station forwards the sleep response message (MOB_SLP-RSP) to the mobile station to allow the mobile station to perform conversion to class 3 of the power saving mode (S2201). The mobile station which has received the sleep response message maintains the power saving mode for the sleeping interval at the conversion time (start frame) to the power saving mode (S2203). If the sleeping interval expires, the mobile station maintains the available communication status with the base station and receives data forwarded from the base station through multicast connection (S2205).

If the base station forwards all the data in a state that multicast connection is maintained, the base station forwards the sleep response message (MOB_SLP-RSP) to the mobile station to allow the mobile station to perform conversion to class 3 of the power saving mode, thereby saving the power until the next multicast data are transmitted (S2207). The mobile station which has received the sleep response message maintains the power saving mode for the sleeping interval at the conversion time to the power saving mode (S2209). Afterwards, if the base station transmits data, the power saving mode is deactivated again (S2211), and the steps S2203 to S2211 are repeated.

Figure 23:
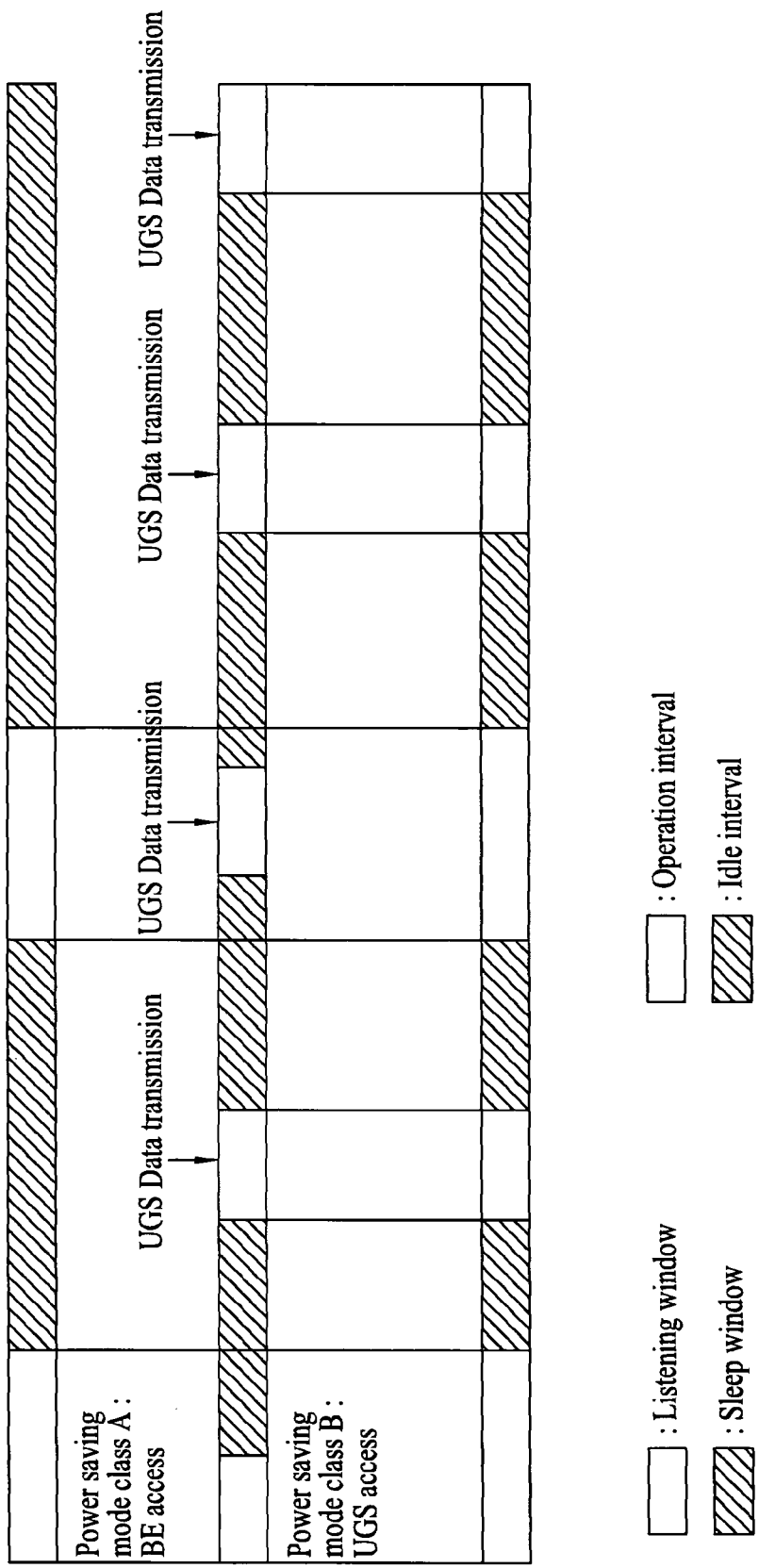
FIG. 23 is a conceptional view illustrating operation characteristics when a plurality of power saving mode classes are activated in a mobile station.

Meanwhile, FIG. 23 is a conceptional view illustrating operation characteristics when a plurality of power saving mode classes are activated in the mobile station. The broadband wireless access system supports a power saving class per connection according to the service type to reduce power consumption of the mobile station. As shown, it is noted that the mobile station in which several power saving classes are activated temporarily disables uplink and downlink communication with the base station to avoid power consumption for an overlap period of sleeping intervals for each class.

Figure 24:
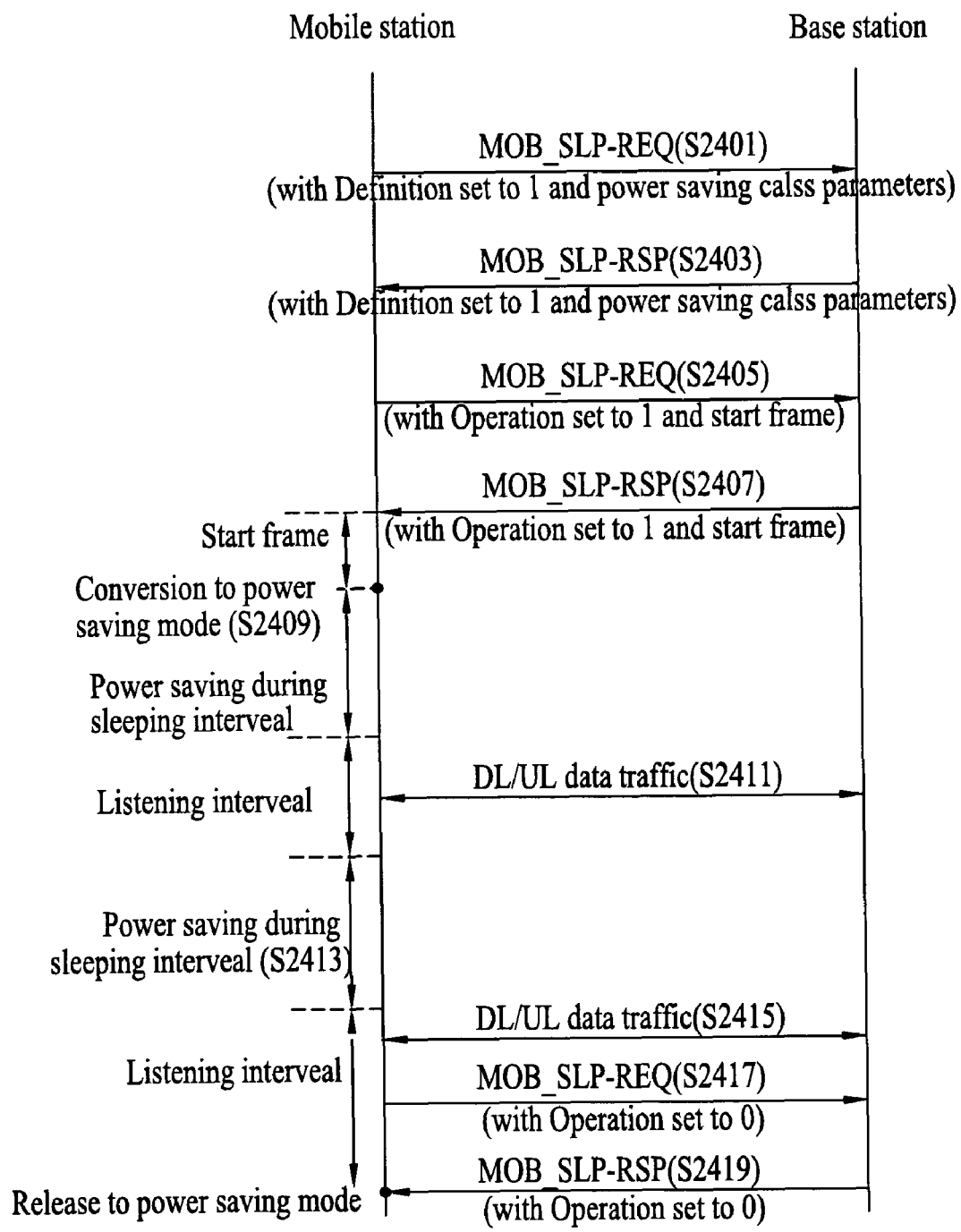
FIG. 24 is a flow chart between a mobile station and a base station to illustrate operation characteristics of the mobile station in a power saving mode.

FIG. 24 illustrates a signal flow between the mobile station and the base station to illustrate operation characteristics of the mobile station in the power saving mode converted by the classes 1 to 3.

Generally, the power saving mode is operated by two steps, a definition step of the power saving class and an operation step of the power saving class. The definition step of the power saving class is to define power saving parameters such as sleep window, listening window, and connection ID. The definition step of the power saving class includes allocating specific power saving class ID depending on the defined power saving class and allocating different power saving class IDs if different power saving parameters exist for one power saving class. Also, the operation step of the power saving class activates the operation of the defined power saving class or deactivates the operation of the activated power saving class.

To define the power saving class, the mobile station in the normal operation mode forwards the sleep request message (MOB_SLP-REQ) to the service base station (S2401), wherein the sleep request message includes power saving parameters such as power saving class type, connection direction, initial sleep window, listening window, final sleep window, final sleep window exponent, traffic indicator flag, and connection ID. At this time, a definition field is set to 1 to indicate the sleep request message for defining the power saving class.

The base station which has received the sleep request message forwards the sleep response message (MOB_SLP-RSP) to the mobile station (S2403), wherein the sleep response message includes power saving parameters such as power saving class type, connection direction, initial sleep window, listening window, final sleep window, final sleep window exponent, traffic indicator flag, sleep ID, and connection ID.

To request conversion to the power saving mode, the mobile station should forward the sleep request message (MOB_SLP-REQ) to the base station (S2405), wherein the sleep request message includes the operation field set to 1. At this time, the mobile station transmits the sleep request message along with a start time of the power saving mode.

The base station which has received the sleep request message of which operation field is set to 1 forwards the sleep response message (MOB_SLP-RSP) to the mobile station (S2407), wherein the sleep response message includes the operation field set to 1 and the conversion start time to the power saving mode.

The mobile station which has received the sleep response message is converted into the power saving mode at the start time (S2409). The mobile station does not receive a downlink signal forwarded from the service base station for the sleeping interval, which is the unavailable communication time period, to minimize power consumption, and does not transmit uplink traffic to the service base station.

On the other hand, the mobile station can receive downlink data from the service base station and transmit uplink data to the service base station for the listening interval which is the available communication time period (S2411). If the listening interval expires, the mobile station maintains the power saving mode by the sleeping interval to avoid power consumption (S2413). The mobile station performs transmission and reception of unlink/downlink data with the service base station for the listening interval (S2415).

If the mobile station should deactivate the power saving class during the listening interval, the mobile station transmits the sleep request message (MOB_SLP-REQ) or the sleep control header to the base station (S2417), wherein the sleep request message includes the operation field set to 0, the operation field indicating deactivation of the power saving mode. The service base station which has received deactivation request of the power saving mode through the sleep request message or the sleep control header forwards the sleep response message (MOB_SLP-RSP) to the mobile station (S2419), wherein the sleep response message includes the operation field set to 0, the operation field indicating deactivation of the power saving mode. The mobile station which has received the sleep response message of which operation field is set to 0 deactivates the corresponding power saving class to end the power saving mode. However, if a plurality of power saving classes are activated, the operation of the corresponding power saving class can only be deactivated.

Hereinafter, embodiments according to another aspect of the present invention will be described in detail. To this end, an embodiment of an improved handover triggering information suggested in the present invention will be described. A method of performing handover according to the present invention will be described with reference to the embodiment of the improved handover triggering information and then configuration of the mobile station which supports such handover will be described.

According to one aspect of the present invention, handover triggering information according to the related art, which is transmitted from the base station, further includes at least one operation class information so that each class performs separate handover related operation. To this end, separate control information is provided to the mobile station. One embodiment of the handover triggering information which further includes operation class information will be described.

TABLE 13

| Name | Type | Length (1 byte) | Value |
|---|---|---|---|
| Type/Function/ Action | 54.1 | 1 | |
| Trigger value | 54.2 | 1 | value to be compared with measurement metric value to decide trigger condition |
| Trigger averaging duration | 54.3 | 1 | Averaged time period of metric value measured in mobile station |
| Trigger operation mode/ Combined logical function | 54.4 | 1 | Bit #0: Normal operations<br>Bit #1: Power Saving Mode of Class 1<br>Bit #2: Power Saving Mode of Class 2<br>Bit #3: Power Saving Mode of Class 3<br>Bit #4~#7: Reserved |

As illustrated in Table 13, the handover triggering information according to the present invention further includes trigger operation mode/combined logical function item of type 54.4 to designate type of the power saving class in which handover related operation is to be triggered. Particularly, to simultaneously designate one or more power saving classes, a bit map method which allocates class for each bit constituting a corresponding item may be used. For example, if a value of trigger operation mode/combined logical function item is 0x06(00000110), a specific triggering operation is performed provided that the mobile station is operated in class 1 or class 2 of the power saving mode.

Furthermore, according to another aspect of the present invention, a plurality of handover related operations triggered in the mobile station are simultaneously designated. To this end, in handover triggering information according to the related art, Enable Action item may be designated in a bit map method or separate control information which simultaneously designates a plurality of handover related operations may be provided to the mobile station. In this case, separate control information is preferably used to simultaneously a plurality of handover related operations to be performed during the sleeping interval of the power saving mode. Table 14 illustrates an example of the improved handover triggering information according to one aspect of the present invention, and Table 15 illustrates an example of separate control information according to another aspect of the present invention.

TABLE 14

| Name | Length | Value |
|---|---|---|
| Type | 2 bits (MSB) | 0x00: CINR metric<br>0x01: RSSI metric<br>0x02: RTD metric<br>0x03: Reserved |
| Function | 3 bits | 0x00: Reserved<br>0x01: metric of neighboring base station is greater than absolute value<br>0x02: metric of neighboring base station is smaller than absolute value<br>0x03: metric of neighboring base station is relatively greater than metric of service base station<br>0x04: metric of neighboring base station is relatively smaller than metric of service base station<br>0x05: metric of service base station is greater than absolute value |

TABLE 14-continued

| Name | Length | Value |
|---|---|---|
| | | 0x06: metric of service base station is smaller than absolute value<br>0x07: Reserved |
| Enabled Action | 3 bits (LSB) | Bit #0: MOB_SCN-REP message response after each scanning time period for trigger<br>Bit #1: MOB_MSHO-REQ message response for trigger<br>Bit #2: mobile station initiates scanning of neighboring base station for trigger by transmitting MOB_SCN-REQ message |

TABLE 15

| Name | Length | Value |
|---|---|---|
| Enabled Action Triggered | 1 byte | If Bit #0 is set to 1: MOB_SCN-REP message response after each scanning time period for trigger<br>If Bit #1 is set to 1: MOB_MSHO-REQ message response for trigger<br>If Bit #2 is set to 1: mobile station initiates scanning of neighboring base station for trigger by transmitting MOB_SCN-REQ message<br>Bit #3~Bit #7: Reserved |

In Table 15, Bit #3~Bit #7 of Enabled Action Triggered item are default values and are preferably set to 0.

The handover triggering information of Table 14 and/or Table 15 may be transmitted to the mobile station through a message (downlink channel descriptor; DCD) for transmission of channel information item or a message (MOB_NBR-ADV) for transmission of neighboring base station information in the same manner as the related art. Alternatively, the handover triggering information may be transmitted to the mobile station along with the sleep response message (MOB_SLP-RSP) according to request for conversion to the sleep mode of the mobile station or the ranging response message according to request for ranging of the mobile station. Particularly, the information of Table 15 is preferably transmitted as described in another aspect of the present invention separately from the handover triggering information according to the related art. The information of Table 15 may be used when correction or update of the handover triggering information transmitted through the DCD or the MOB_NBR-ADV is needed in case of the power saving mode of the mobile station.

Hereinafter, various embodiments of performing handover in the power saving mode by using the improved handover triggering information of the present invention will be described.

Figure 25:
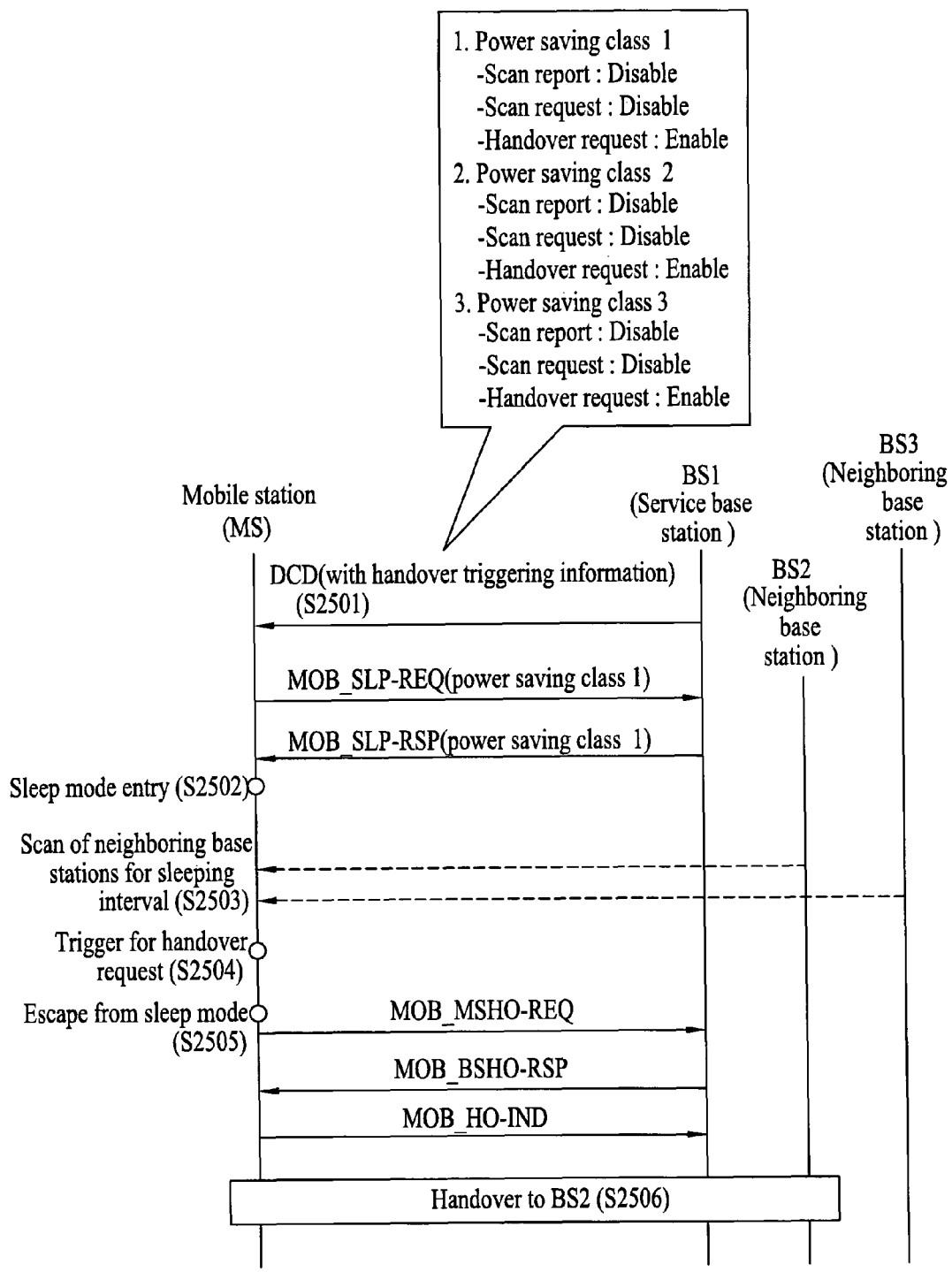
FIG. 25 is a flow chart between a mobile station and base stations to sequentially illustrate one example of a procedure of performing handover in a power saving mode in accordance with the present invention.

FIG. 25 is a flow chart between the mobile station and base stations to illustrate the embodiment of performing handover in the power saving mode by using the handover triggering information received through the downlink channel descriptor (DCD) message or the neighboring base station information (MOB_NBR-ADV) message.

In this embodiment, it is supposed that the mobile station is operated in the power saving mode of class 1. For reference, class 1 targets a best effort (BE) having characteristics of the existing Internet traffic or a non-real-time variable rate (nrt-VR), and is defined by an initial sleep window, a final window base, a final window exponent, a listening window, and a start frame number for sleep window.

The mobile station receives the handover triggering information from the service base station through the channel information message (DCD) or the neighboring base station information message (MOB_NBR-ADV). In this case, the handover triggering information includes items of Table 13 and Table 14. In the first embodiment, it is supposed that class 1 to class 3 are all designated as the operation target classes, and that scan report: disable, scan request: disable, and handover request: enable are equally designated for all the classes.

Afterwards, the mobile station transmits the sleep request message (MOB_SLP-REQ) for conversion to the power saving mode of class 1 to the service base station, and receives the sleep response message (MOB_SLP-RSP) in response to the sleep request message to enter the sleep mode (S2502).

The mobile station can perform scanning of the neighboring base station even for the sleeping interval (S2503), and compares metrics, such as signal to interference and noise ratio (SINR), received signal strength indication (RSSI) and round trip delay (RTD), which are collected through scanning, with the control information of Table 14 to identify whether to perform handover.

As a result, if a handover request event is generated as it is determined that handover is to be performed, the mobile station checks whether class 1 is designated in the control information of Table 13 as the operation target class before requesting handover of the service base station. In the first embodiment, since class 1 is designated as the operation target class and especially handover request item is set to Enable, trigger for handover request can be performed (S2504).

The mobile station escapes from the sleep mode to perform the handover procedure as the handover request trigger is performed (S2505), and transmits the handover request message (MOB_MSHO-REQ) to the service base station. If the handover response message is arrived from the service base station, the mobile station transmits the handover indication message (MOB_HO-IND) to the corresponding base station to release connection with the service base station. Subsequently, the mobile station performs the network re-registration procedure with the handover target base station (BS 2) (S2506).

Figure 26:
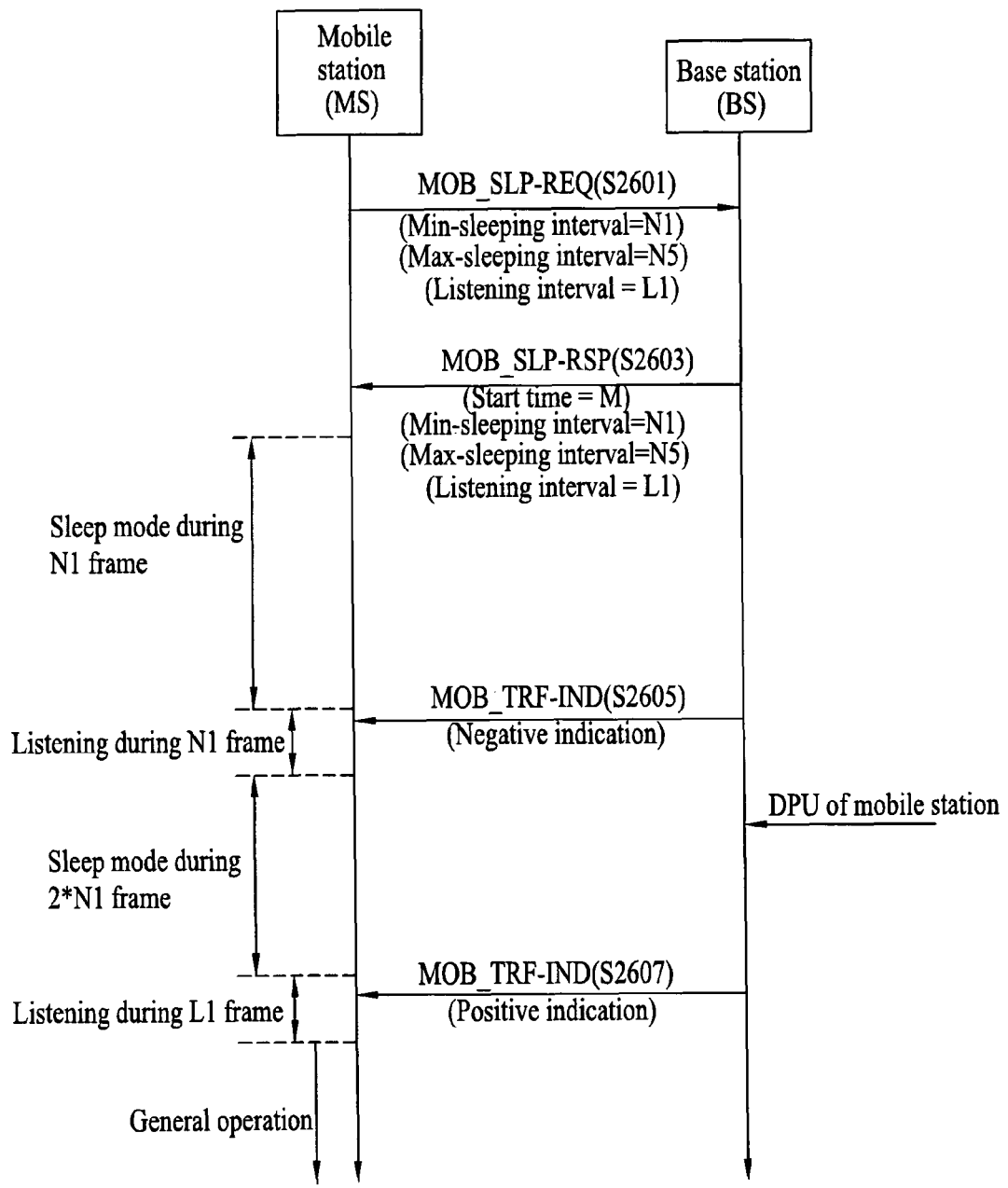
FIG. 26 is a flow chart between a mobile station and a base station to illustrate a general operation procedure of the mobile station in class 1 of a power saving mode.

The step S2503, i.e., the operation procedure in class 1 of the power saving mode will be described in more detail with reference to FIG. 26.

The mobile station sets values such as initial sleep window, final sleep window and listening window in the sleep request message (MOB_SLP-REQ) and forwards the set values to the base station to request conversion to class 1 of the power saving mode (S2601). An example of the sleep request message (MOB_SLP-REQ) is as follows.

TABLE 16

| Parameter Name | length (bit) | note |
| --- | --- | --- |
| Management message type = 50 | 8 | |
| Number of Classes | 8 | Number of power saving classes. |
| Definition | 1 | |
| Operation | 1 | |
| Power_Saving_Class_ID | 6 | |
| Start_frame_number | 6 | |
| Reserved | 2 | |
| Power_Saving_Class_Type | 2 | |
| Direction | 2 | |
| Traffic_triggered_wakening_flag | 1 | |
| Reserved | 3 | |
| initial-sleep window | 6, 8 | |
| listening-window | 8 | |
| final-sleep window base | 10 | |
| final-sleep window exponent | 3 | |
| Number_of_Sleep_CIDs | 3 | |

TABLE 16-continued

| Parameter Name | length (bit) | note |
| --- | --- | --- |
| CID | 16 | |
| TLV encoded information | variable | |

If the base station allows conversion to the power saving mode of the corresponding mobile station, the base station forwards the sleep response message (MOB_SLP-RSP) to the mobile station (S2603), wherein values such as initial sleep window, final sleep window, listening window, and initial frame number of sleep window are set in the sleep response message. At this time, an example of the sleep response message (MOB_SLP-RSP) is as follows.

TABLE 17

| Parameter Name | length (bit) | note |
| --- | --- | --- |
| Management message type = 51 | 8 | |
| Number of Classes | 8 | Number of power saving classes. |
| Length of Data | 7 | |
| Sleep Approved | 1 | |
| Definition | 1 | |
| Operation | 1 | |
| Power_Saving_Class_ID | 6 | |
| Start_frame_number | 6 | |
| Reserved | 2 | |
| Power_Saving_Class_Type | 2 | |
| Direction | 2 | |
| initial-sleep window | 8 | |
| listening-window | 8 | |
| final-sleep window base | 10 | |
| final-sleep window exponent | 3 | |
| TRF-IND required | 1 | |
| Traffic_triggered_wakening_flag | 1 | |
| Reserved | 1 | |
| SLPID | 10 | |
| Reserved | 2 | |
| Number_of_CIDs | 4 | |
| CID | 16 | |
| Maintain Diversity Set and Anchor BS | 1 | |
| MDHO/FBSS duration (s) | 3 | |
| Padding | variable | If needed for alignment to byte boundary |
| Power Saving Class TLV encoded information | variable | |
| REQ-duration | 8 | |
| TLV encoded information | variable | |

The mobile station maintains a sleeping interval equal to the initial sleep window at the conversion time to the power saving mode. If the sleeping interval expires, the mobile station receives a traffic notification message (MOB_TRF_IND) from the base station for the listening interval preceded by the sleeping interval (S2605). In case of no down traffic toward the mobile station (negative indication), the mobile station maintains the power saving mode for a time period equivalent to twice of the initial sleep window. At this time, an example of the traffic notification message (MOB_TRF_IND) is as follows.

TABLE 18

| Parameter Name | length (bit) | note |
| --- | --- | --- |
| Management message type = 52 | 8 | |

TABLE 18-continued

| Parameter Name | length (bit) | note |
|---|---|---|
| FMT | 1 | |
| SLPID Group Indication bit-map | 32 | N-th bit of SLPID-Group indication bit-map MSB corresponds to N = 0] is allocated to SLPID Group that includes MS with SLPID values from N * 32 to N * 32 + 31 Meaning of this bit 0: There is no traffic for all the 32 MS that belong to the SLPID-Group 1: There is traffic for at least one MS in SLPID-Group. |
| Traffic Indication Bitmap | variable | Traffic Indication bit map comprises the multiples of 32-bit long Traffic Indication unit. A Traffic Indication unit for 32 SLPIDs is added to MOB_TRF-IND message whenever its SLPID Group is set to 1 32 bits of Traffic Indication Unit (starting from MSB) are allocated to MS in the ascending order of their SLPID values: 0: Negative indication 1: Positive indication |
| Num_Pos SLPIDs | 8 10 | Number of CIDs following |
| Padding | variable | If needed, for alignment to byte boundary. |
| TLV encoded items | variable | |

The sleeping interval continues to increase through the above manner (set next sleep window to twice of previous sleep window). The final sleep window size is set as follows through final window base and final window exponent which are determined through the sleep response message (MOB_SLP-RSP).

$$\text{final sleep window} = \text{final sleep window base} * 2^{\text{final window exponent}}$$

If the mobile station receives the traffic notification message for the listening interval (positive indication), the mobile station ends the power saving mode, wherein the traffic notification message indicates down traffic toward the mobile station.

Figure 27:
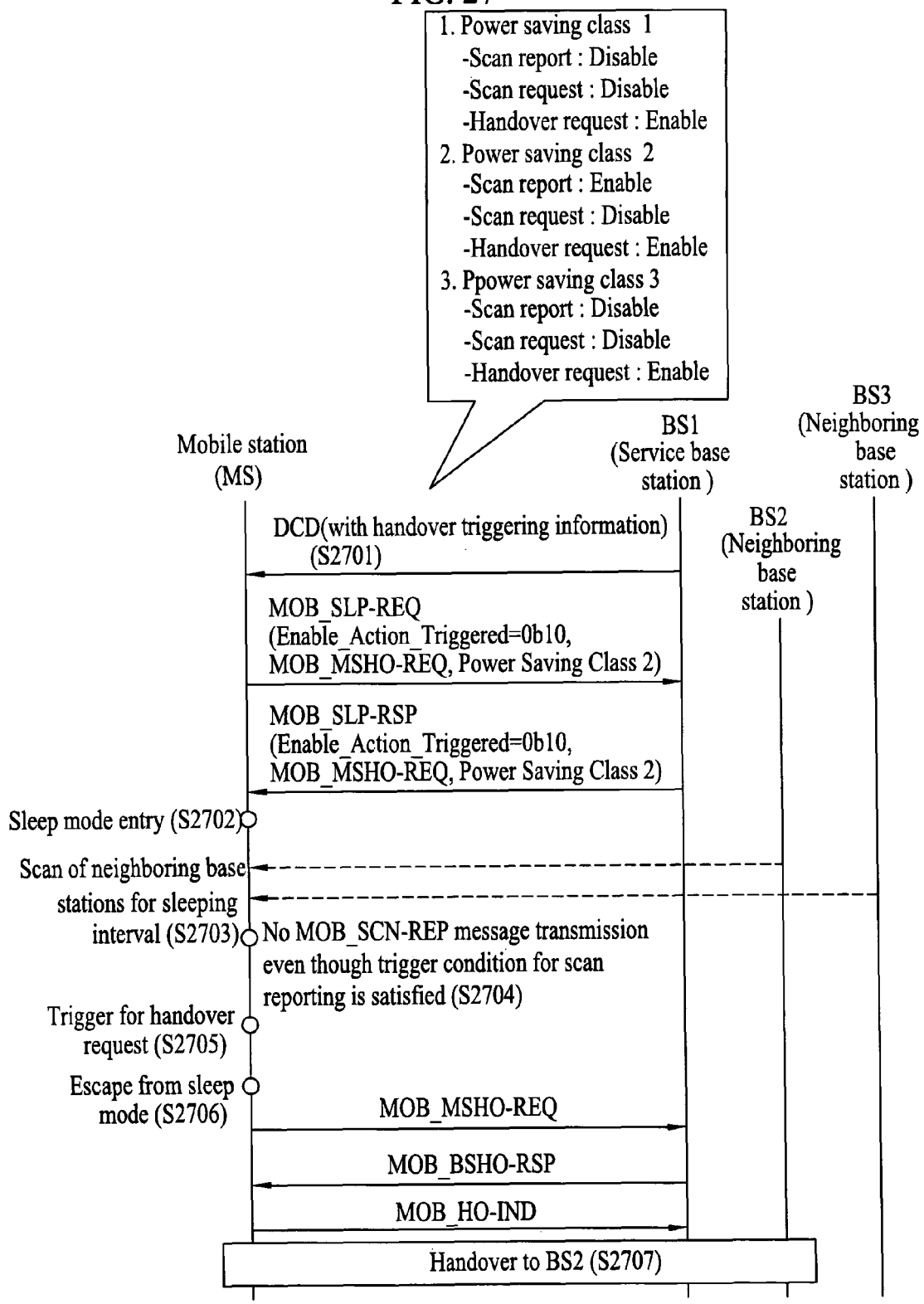
FIG. 27 is a flow chart between a mobile station and base stations to sequentially illustrate another example of a procedure of performing handover in a power saving mode in accordance with the present invention.

FIG. 27 is a flow chart between the mobile station and base stations to illustrate the embodiment of performing handover in the power saving mode by using the handover triggering information received through the downlink channel descriptor (DCD) message or the neighboring base station information (MOB_NBR-ADV) message at the conversion time to the power saving mode.

In this embodiment, the enabled scan report operation is disabled in the power saving mode, and it is supposed that the mobile station is operated in the power saving mode of class 2. For reference, class 2 targets VoIP or a real-time variable rate (rt-VR), and is defined by three values, i.e., initial sleep window, listening window, and start frame number for sleep window.

The mobile station receives the handover triggering information from the service base station through the channel information message (DCD) or the neighboring base station information message (MOB_NBR-ADV) (S2701). In this case, the handover triggering information includes items of Table 13 and Table 14. In the second embodiment, it is supposed that class 1 to class 3 are all designated as the operation target classes, and that scan report: disable, scan request: disable, and handover request: enable are designated for class 1 and class 3 and scan report: enable, scan request: disable, and handover request: enable are designated for class 2.

Afterwards, the mobile station transmits the sleep request message (MOB_SLP-REQ) for conversion to the power saving mode of class 2 to the service base station, and receives the sleep response message (MOB_SLP-RSP) in response to the sleep request message to enter the sleep mode (S2702). At this time, if the mobile station desires to disable the scan report operation during the power saving mode and enable the handover request operation only, the mobile station sets Bit #0 of Enabled_Action_Triggered item (Table 15) included in the sleep request message (MOB_SLP-REQ) to 1. If the response message (MOB_SLP-RSP) to the corrected sleep request message (MOB_SLP-REQ) is received, the mobile station corrects Enabled Action item (Table 14) of the handover triggering information to the Enabled_Action_Triggered item.

Meanwhile, the mobile station can perform scanning of the neighboring base station even for the sleeping interval (S2703), and compares metric values, such as signal to interference and noise ratio (SINR), received signal strength indication (RSSI) and round trip delay (RTD), which are collected through scanning, with the control information of Table 14 to identify whether to perform scan report.

In this case, even though the predetermined metric values collected by scanning satisfy function item of Table 14 to adapt to an occurrence condition of a scan report event, since Bit #0 is disabled in Enabled_Action item of Table 14, scan report trigger is not actually performed (S2704). However, as a result of scanning, if it is determined that handover is to be performed, since Bit #1 (handover request item) is enabled in Enabled_Action item of Table 14, handover request trigger is normally performed (S2705).

The mobile station escapes from the sleep mode to perform the handover procedure as the handover request trigger is performed (S2706), and transmits the handover request message (MOB_MSHO-REQ) to the service base station. If the handover response message is arrived from the service base station, the mobile station again transmits the handover indication message (MOB_HO-IND) to the corresponding base station to release connection with the service base station. Subsequently, the mobile station performs the network re-registration procedure with the handover target base station (BS 2) (S2707).

Figure 28:
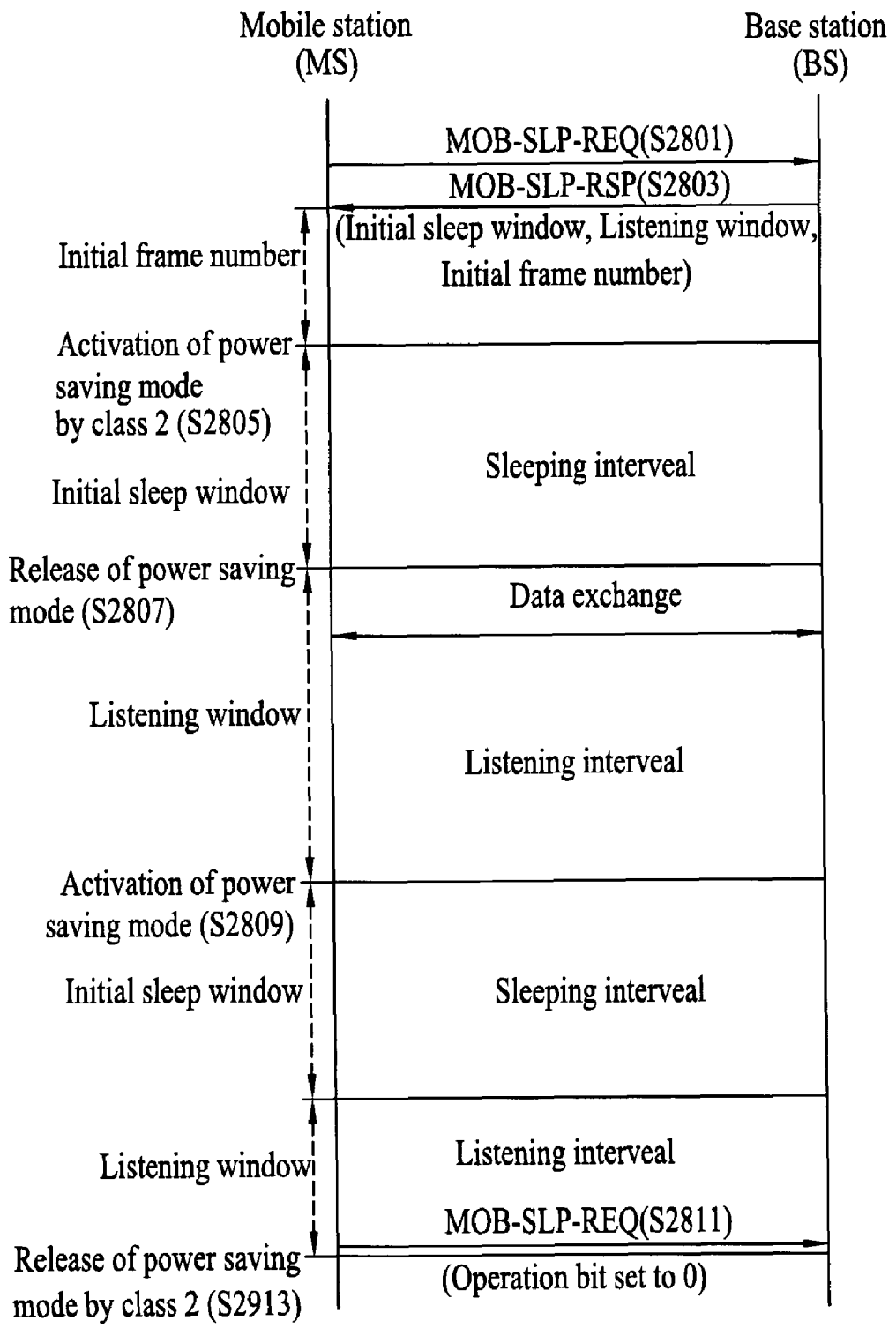
FIG. 28 is a flow chart between a mobile station and a base station to illustrate a general operation procedure of the mobile station in class 2 of a power saving mode.

The step S2702, i.e., the operation procedure of the mobile station in class 2 of the power saving mode will be described in more detail with reference to FIG. 28.

The mobile station forwards the sleep request message (MOB_SLP-REQ) to the base station to especially request conversion to class 2 of the power saving mode (S2801). The base station which has received the sleep request message MOB_SLP-REQ sets a fixed sleeping interval, a fixed listening interval, and conversion time to the power saving mode in the sleep response message (MOB_SLP-RSP) to allow the mobile station to perform conversion to class 2 of the power saving mode (S2803).

The mobile station maintains the power saving mode by the sleeping interval at the conversion time to the power saving mode (S2805). If the sleeping interval expires, the mobile station synchronizes with the base station to maintain uplink/downlink communication with the base station and receives downlink data from the base station and transmits uplink data to the base station for the listening interval (S2807).

If the listening interval expires, the mobile station maintains the power saving mode for the sleeping interval to avoid power consumption (S2809). Afterwards, the mobile station is operated in class 2 of the power saving mode by repeating the step S2807 and the step S2809.

If the mobile station desires to end class 2 of the power saving mode, the mobile station sets power saving mode end in the sleep request message (MOB_SLP-REQ) during the listening interval and forwards the set power saving mode end to the base station or transmits user data to the base station during the sleeping interval (S2811). After ending the power saving mode of class 2 (S2813), the mobile station is normally operated.

Figure 29:
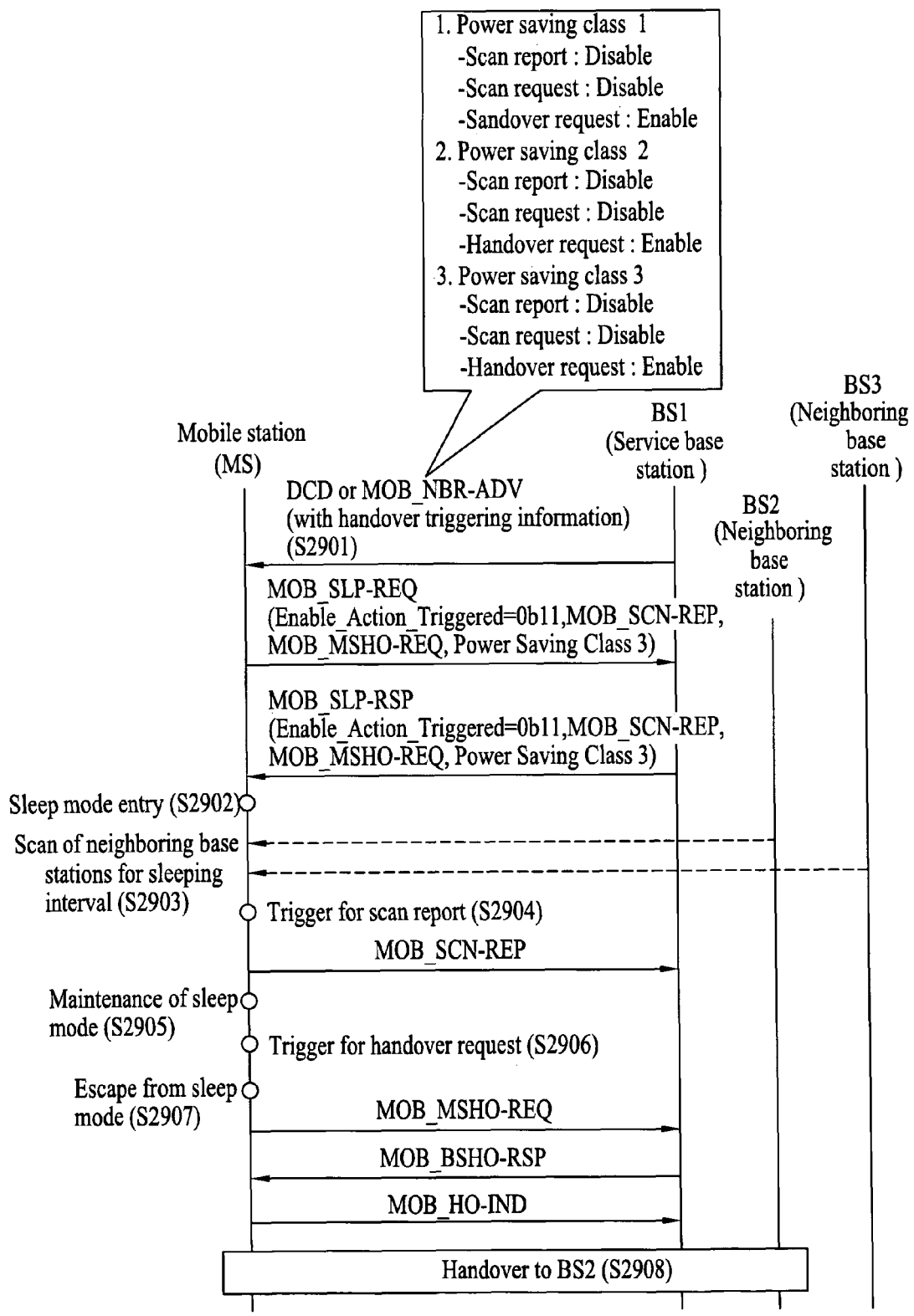
FIG. 29 is a flow chart between a mobile station and base stations to sequentially illustrate other example of a procedure of performing handover in a power saving mode in accordance with the present invention.

FIG. 29 is a flow chart between the mobile station and base stations to illustrate another embodiment of performing handover in the power saving mode by using the handover triggering information received through the downlink channel descriptor (DCD) message or the neighboring base station information (MOB_NBR-ADV) message at the conversion time to the power saving mode.

In this embodiment, the disabled scan report operation is enabled in the power saving mode, and it is supposed that the mobile station is operated in the power saving mode of class 3. For reference, class 3 is for a management message, such as DCD/UCD and MOB_NBR-ADV, to be periodically forwarded to the mobile station which is in the power saving mode, or data to be forwarded in multicast, and is defined by final window base, final window exponent, and start frame number for sleep window.

The mobile station receives the handover triggering information from the service base station through the channel information message (DCD) or the neighboring base station information message (MOB_NBR-ADV) (S2901). In this case, the handover triggering information includes items of Table 13 and Table 14. In the third embodiment, it is supposed that class 1 to class 3 are all designated as the operation target classes, and that scan report: disable, scan request: disable, and handover request: enable are designated for all the classes 1 to class 3.

Afterwards, the mobile station transmits the sleep request message (MOB_SLP-REQ) for conversion to the power saving mode of class 3 to the service base station, and receives the sleep response message (MOB_SLP-RSP) in response to the sleep request message to enter the sleep mode (S2902). At this time, if the mobile station desires to enable the scan report operation during the power saving mode, the mobile station sets Bit #0 of Enabled_Action_Triggered item (Table 15) included in the sleep request message (MOB_SLP-REQ) to 1. If the response message (MOB_SLP-RSP) to the corrected sleep request message (MOB_SLP-REQ) is received, the mobile station corrects Enabled Action item (Table 14) of the handover triggering information to the Enabled_Action_Triggered item.

Meanwhile, the mobile station can perform scanning of the neighboring base station even for the sleeping interval (S2903), and compares metric values, such as signal to interference and noise ratio (SINR), received signal strength indication (RSSI) and round trip delay (RTD), which are collected through scanning, with the control information of Table 14 to identify whether to perform scan report.

In this case, even though the predetermined metric values collected by scanning satisfy function item of Table 14 to adapt to an occurrence condition of a scan report event, since Bit #0 is enabled in Enabled_Action item of Table 14, scan report trigger is performed (S2904). In this way, if the condition for performing scan report is satisfied after conversion to the power saving mode, the mobile station transmits a scanning report message (MOB_SCN-REP) of a communication available interval (listening interval or availability interval) to the service base station and then maintains the power saving mode (S2905).

Meanwhile, as a result of scanning, if it is determined that handover is to be preformed, since Bit #1 (handover request item) is enabled in Enabled_Action item of Table 14, handover request trigger is normally preformed (S2906).

The mobile station escapes from the sleep mode to perform the handover procedure as the handover request trigger is performed (S2907), and transmits the handover request message (MOB_MSHO-REQ) to the service base station. If the handover response message is arrived from the service base station, the mobile station again transmits the handover indication message (MOB_HO-IND) to the corresponding base station to release connection with the service base station. Subsequently, the mobile station performs the network re-registration procedure with the handover target base station (BS 2) (S2908).

Figure 30:
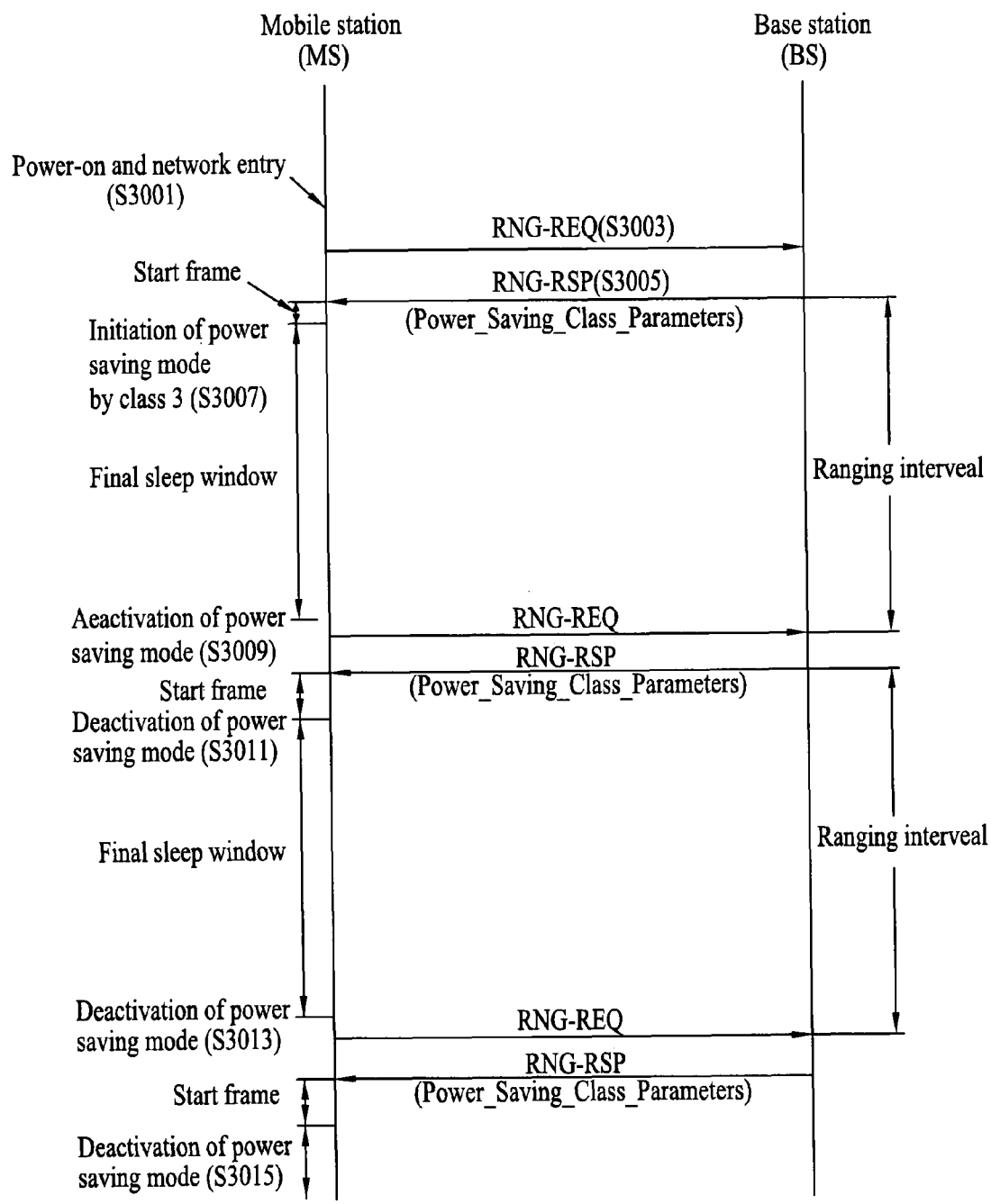
FIG. 30 is a flow chart between a mobile station and a base station to illustrate a general operation procedure of the mobile station in class 3 of a power saving mode.

The step S2902, i.e., the operation procedure of the mobile station in class 2 of the power saving mode will be described in more detail with reference to FIG. 30.

The mobile station is powered on and converted into the normal operation mode by the network registration procedure (S3001). Then, the mobile station periodically performs the ranging procedure to maintain uplink communication with the base station, thereby acquiring a suitable uplink transmission parameter. Accordingly, the mobile station forwards the ranging request message (RNG-REQ) to the base station at the periodic ranging time (S2103).

The base station which has received the ranging request message from the mobile station sets uplink transmission parameter adjustment value in the ranging response message and forwards the ranging response message to the corresponding mobile station. At this time, the power saving class parameter (sleeping interval, start time, etc.) illustrated in Table 18 is included in the ranging response message so as to allow the mobile station to perform conversion to class 3 of the power saving mode (S3005).

The mobile station which has received the conversion to the power saving mode through the ranging response message maintains the power saving mode for the sleeping interval at the conversion time to the power saving mode (S3007). If the sleeping interval expires, the mobile station maintains the available communication status with the base station. The mobile station performs periodic ranging with the base station at the periodic ranging time (S3009). The mobile station receives the ranging response message (RNG-RSP) from the base station to acquire the parameter value for uplink communication and the power saving parameter (S3011). The mobile station which has received the power saving parameter maintains the power saving mode for the sleeping interval at the conversion time to the power saving mode. Afterwards, the steps S3009 and S3011 are repeated (S3013, S3015).

Figure 31:
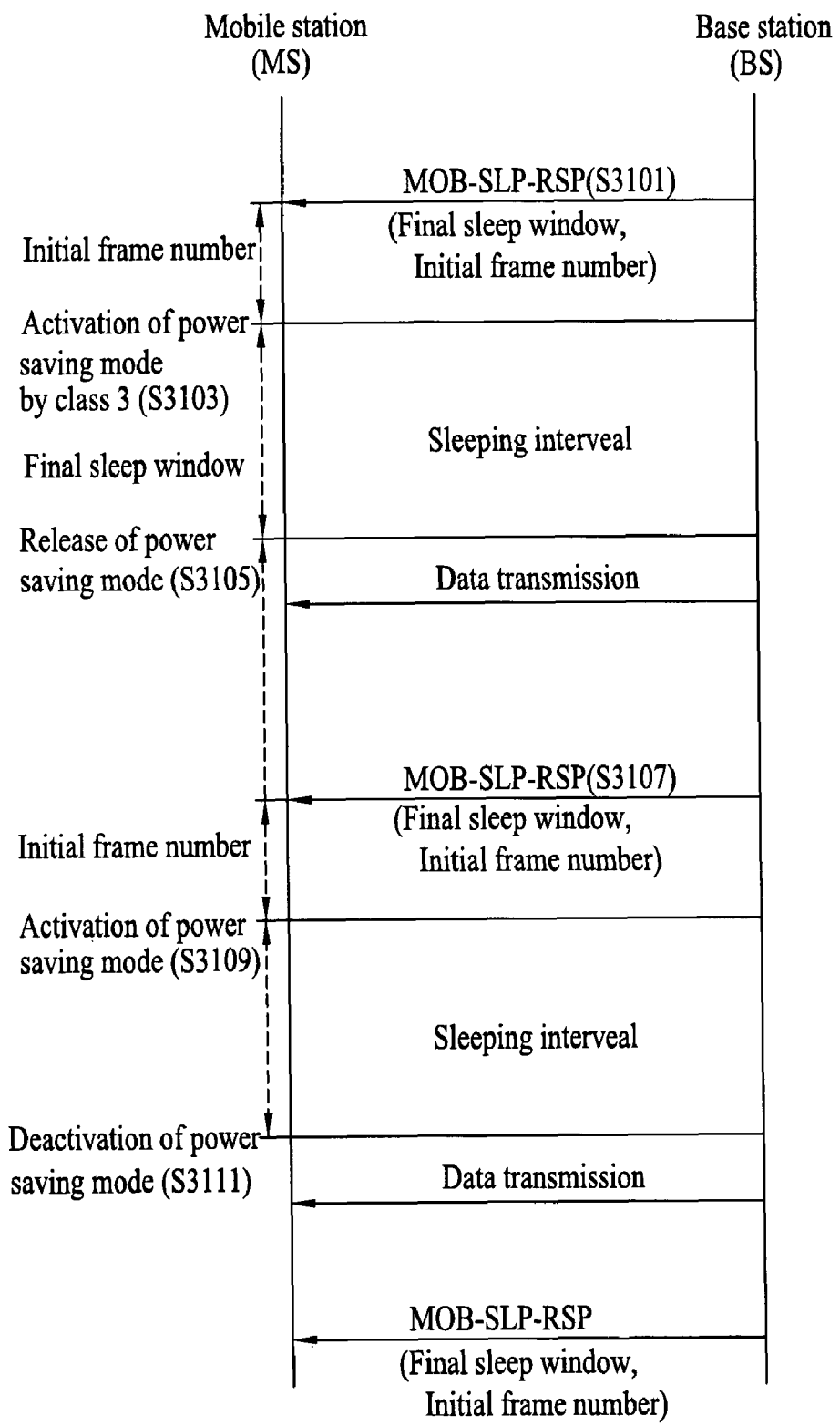
FIG. 31 is a flow chart between a mobile station and a base station to illustrate an operation procedure of the mobile station connected in multicast in class 3 of a power saving mode.

Next, FIG. 31 is a flow chart between the mobile station and the base station to illustrate the operation procedure of the mobile station connected in multicast in class 3 of the power saving mode.

The base station forwards the sleep response message (MOB_SLP-RSP) to the mobile station to allow the mobile station to perform conversion to class 3 of the power saving mode (S3101). The mobile station which has received the sleep response message maintains the power saving mode for the sleeping interval at the conversion time (start frame) to the power saving mode (S3103). If the sleeping interval expires, the mobile station maintains the available communication status with the base station and receives data forwarded from the base station through multicast connection (S3105).

If the base station forwards all the data in a state that multicast connection is maintained, the base station forwards the sleep response message (MOB_SLP-RSP) to the mobile station to allow the mobile station to perform conversion to class 3 of the power saving mode, thereby saving the power until the next multicast data are transmitted (S3107). The mobile station which has received the sleep response message maintains the power saving mode for the sleeping interval at the conversion time to the power saving mode (S3109). Afterwards, if the base station transmits data, the power saving mode is deactivated again (S3111), and the steps S3103 to S3111 are repeated.

Figure 32:
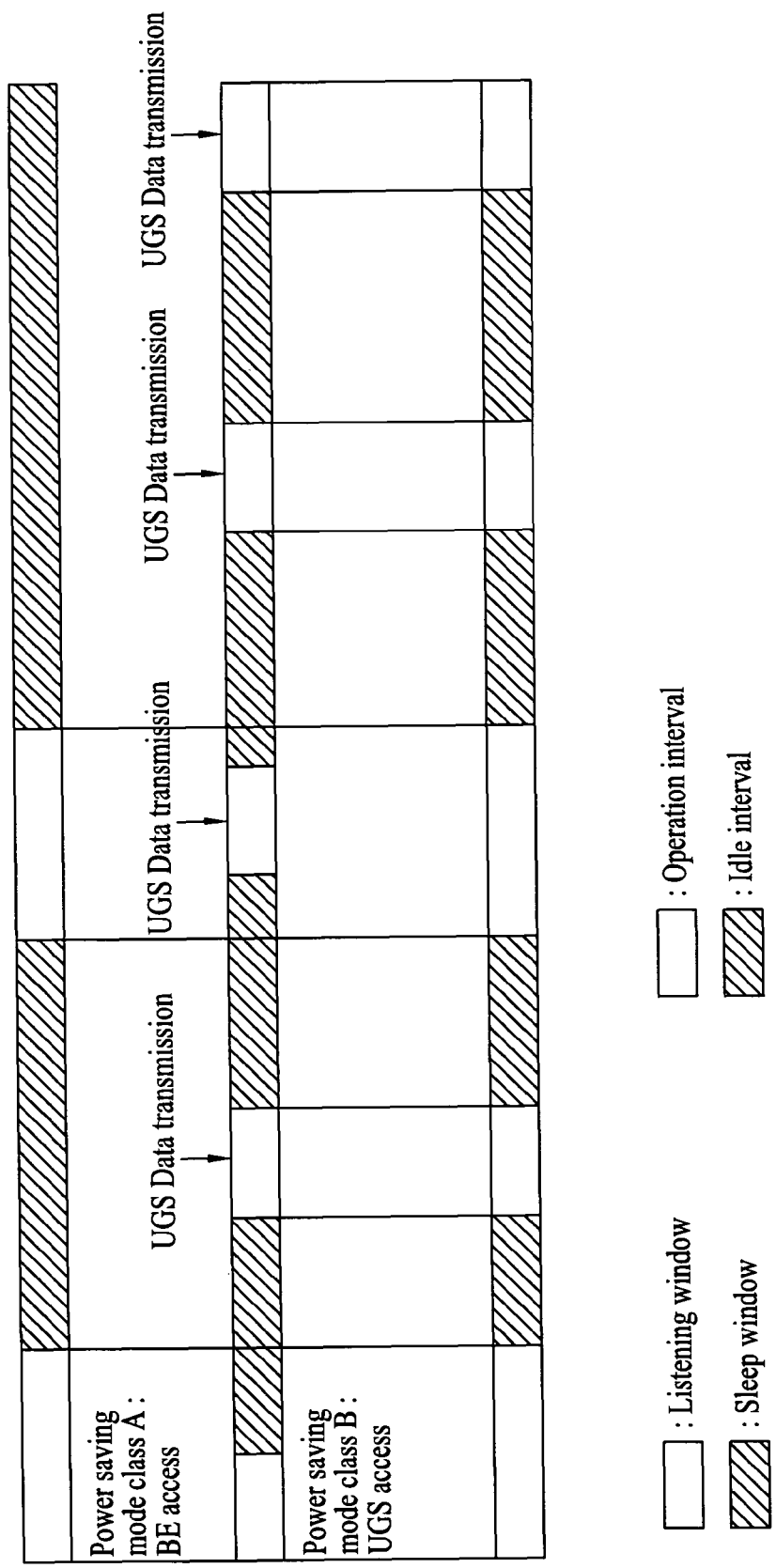
FIG. 32 is a conceptional view illustrating operation characteristics when a plurality of power saving mode classes are activated in a mobile station.

Meanwhile, FIG. 32 is a conceptional view illustrating operation characteristics when a plurality of power saving mode classes are activated in the mobile station. The broadband wireless access system supports a power saving class per connection according to the service type to reduce power consumption of the mobile station. As shown, it is noted that the mobile station in which several power saving classes are activated temporarily disables uplink and downlink communication with the base station to avoid power consumption for an overlap time period of sleeping intervals for each class.

Figure 33:
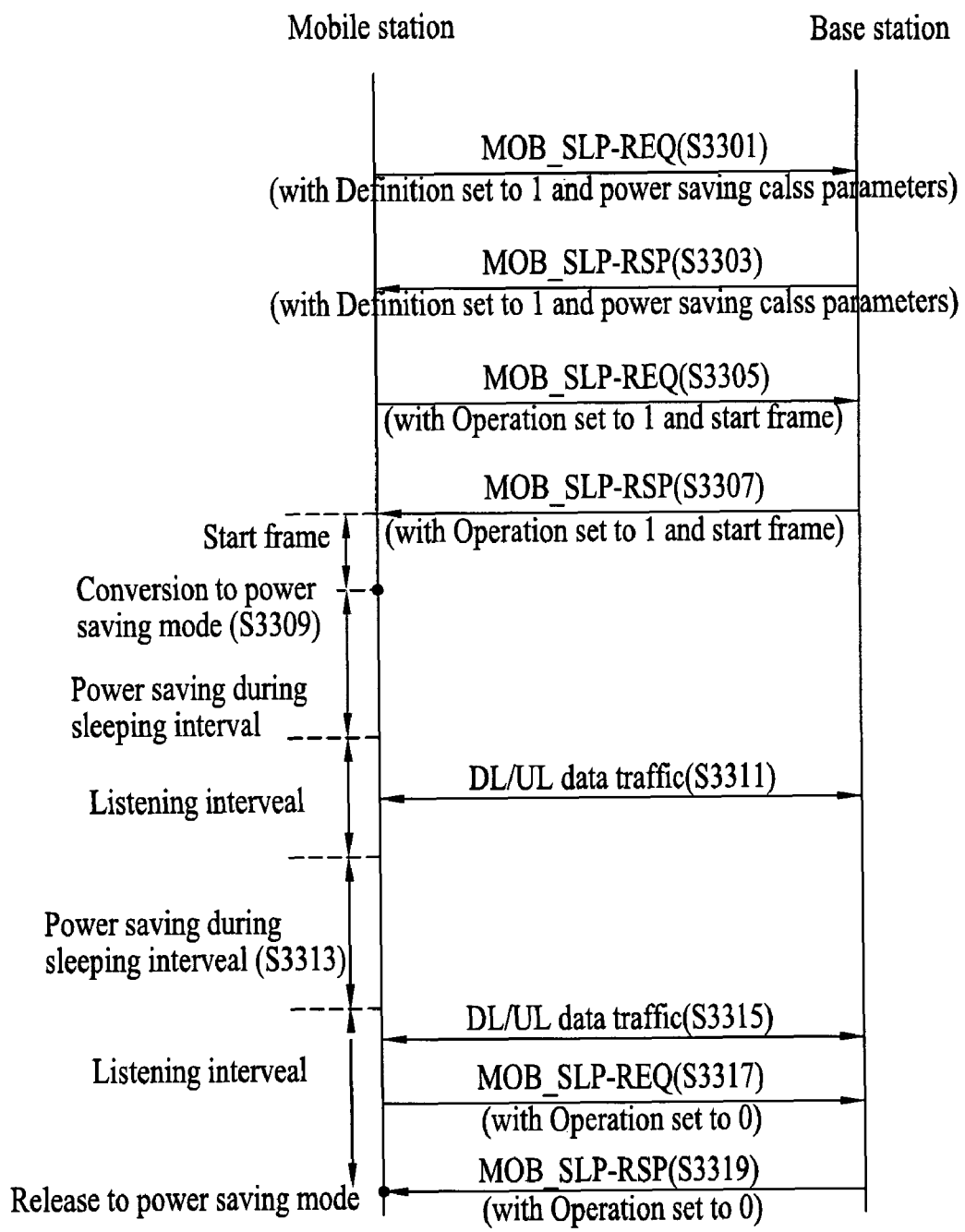
FIG. 33 is a flow chart between a mobile station and a base station to illustrate operation characteristics of the mobile station in a power saving mode.

FIG. 33 illustrates a signal flow between the mobile station and the base station to illustrate operation characteristics of the mobile station in the power saving mode converted by the classes 1 to 3.

Generally, the power saving mode is operated by two steps, a definition step of the power saving class and an operation step of the power saving class. The definition step of the power saving class is to define power saving parameters such as sleep window, listening window, and connection ID. The definition step of the power saving class includes allocating specific power saving class ID depending on the defined power saving class and allocating different power saving class IDs if different power saving parameters exist for one power saving class. Also, the operation step of the power saving class activates the operation of the defined power saving class or deactivates the operation of the activated power saving class.

To define the power saving class, the mobile station in the normal operation mode forwards the sleep request message (MOB_SLP-REQ) to the service base station (S3301), wherein the sleep request message includes power saving parameters such as power saving class type, connection direction, initial sleep window, listening window, final sleep window, final sleep window exponent, traffic indicator flag, and connection ID. At this time, a definition field is set to 1 to indicate the sleep request message for defining the power saving class.

The base station which has received the sleep request message forwards the sleep response message (MOB_SLP-RSP) to the mobile station (S3303), wherein the sleep response message includes power saving parameters such as power saving class type, connection direction, initial sleep window, listening window, final sleep window, final sleep window exponent, traffic indicator flag, sleep ID, and connection ID.

To request conversion to the power saving mode, the mobile station should forward the sleep request message (MOB_SLP-REQ) to the base station (S3305), wherein the sleep request message includes the operation field set to 1. At this time, the mobile station transmits the sleep request message along with a start time of the power saving mode.

The base station which has received the sleep request message of which operation field is set to 1 forwards the sleep response message (MOB_SLP-RSP) to the mobile station (S2407), wherein the sleep response message includes the operation field set to 1 and the conversion start time to the power saving mode.

The mobile station which has received the sleep response message is converted into the power saving mode at the start time (S3309). The mobile station does not receive a downlink signal forwarded from the service base station for the sleeping interval, which is the unavailable communication time period, to minimize power consumption, and does not transmit uplink traffic to the service base station.

On the other hand, the mobile station can receive downlink data from the service base station and transmit uplink data to the service base station for the listening interval which is the available communication time period (S3311). If the listening interval expires, the mobile station maintains the power saving mode by the sleeping interval to avoid power consumption (S3313). The mobile station performs transmission and reception of unlink/downlink data with the service base station for the listening interval (S3315).

If the mobile station should deactivate the power saving class during the listening interval, the mobile station transmits the sleep request message (MOB_SLP-REQ) or the sleep control header to the base station (S3317), wherein the sleep request message includes the operation field set to 0, the operation field indicating deactivation of the power saving mode. The service base station which has received deactivation request of the power saving mode through the sleep request message or the sleep control header forwards the sleep response message (MOB_SLP-RSP) to the mobile station (S3319), wherein the sleep response message includes the operation field set to 0, the operation field indicating deactivation of the power saving mode. The mobile station which has received the sleep response message of which operation field is set to 0 deactivates the corresponding power saving class to end the power saving mode. However, if a plurality of power saving classes are activated, the operation of the corresponding power saving class can only be deactivated.

Now, elements of the mobile station which supports the aforementioned method of performing handover will be described.

Figure 34:
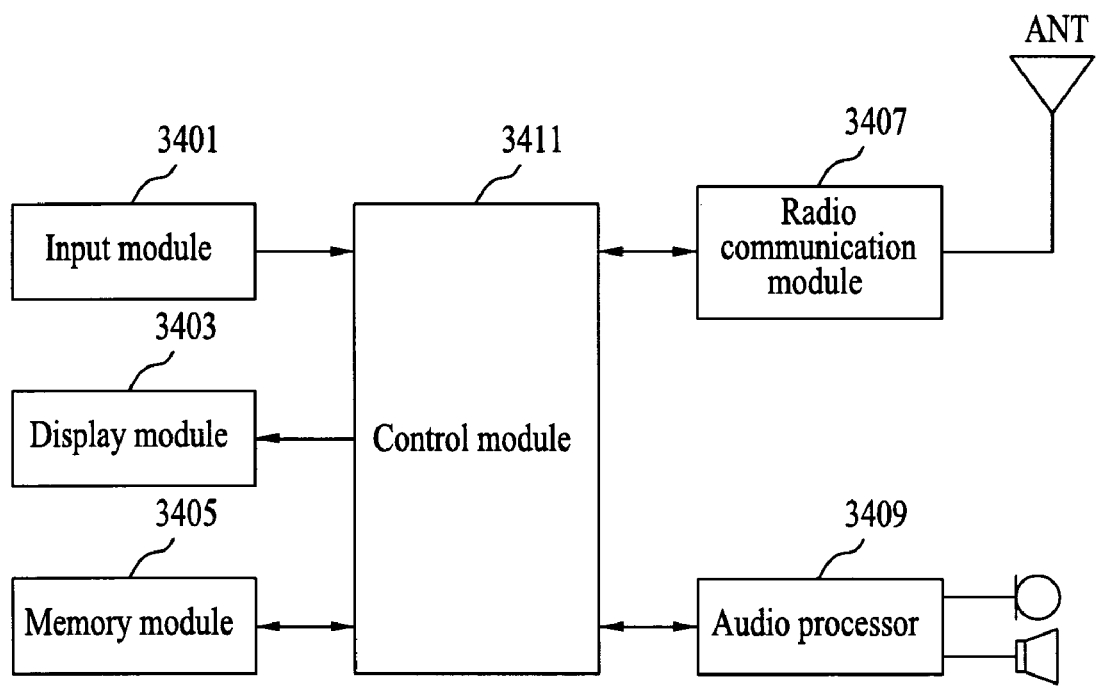
FIG. 34 is a block diagram illustrating main elements of a mobile station which supports a handover method of the present invention.

FIG. 34 is a block diagram illustrating main elements of a mobile station which supports a handover method of the present invention.

The user mobile station includes an input module 3401 selecting a desired function or inputting information, a display module 3403 displaying various kinds of information for operating the user mobile station, a memory module 3405 storing various programs required to operate the user mobile station and data to be transmitted to a receiving side, a radio communication module 3407 receiving an external signal and transmitting data to the receiving side, an audio processor 3409 converting a digital audio signal into an analog audio signal, amplifying the converted audio signal, and outputting the amplified signal to a speaker, or amplifying an audio signal a mike (MIC) and converting the amplified signal into a digital signal, and a control module 3411 controlling entire driving of the user mobile station.

The radio communication module 3407 further includes a function of receiving handover triggering information and a signal for measurement of channel quality. The control module 3411 further includes a function of performing scan of neighboring base stations in the sleep mode, and triggering specific handover related operation designated in the triggering information if the scan result adapts to trigger condition set in the triggering information.

Particularly, the control module 3411 may further include a function of including Enabled_Action_Triggered item of Table 15 in the sleep request message (MOB_SLP-REQ) transmitted to the base station to enter the power saving mode or the ranging request message (RNG-REQ) for handover, and may further include a function of correcting Enabled_Action item of Table 14 to Enabled_Action_Triggered item included in the sleep request message (MOB_SLP-REQ) or the ranging request message (RNG-REQ).

Hereinafter, the operation procedure of the mobile station according to another embodiment of the present invention will be described.

Supposing that the mobile station controls power saving class configuration information of the first base station during handover from the first base station to the second base station, the radio communication module 3407 transmits the ranging request message for network entry to the second base station and receives the ranging response message from the second base station, wherein the ranging response message includes control information of the power saving class configuration information of the first base station.

Furthermore, the control module 3411 processes the power saving class configuration information of the first base station depending on the control information, specifically releases, updates, and maintains the power saving class configuration information of the first base station.

At this time, if the control module 3411 releases the power saving class configuration information, the radio communication module 3407 transmits a request message for definition and activation of a new power saving class to the second base station, and receives a response message from the second base station in response to the request message. The control module 3411 defines and activates the new power saving class in accordance with the corresponding response message to perform conversion to the power saving mode.

Furthermore, if the control module 3411 updates the power saving class configuration information, the control module 3411 updates the existing class configuration information to class configuration information included in the triggering information. In this case, the radio communication module 3407 transmits a request message for activation of the updated power saving class to the second base station, and receives a response message from the second base station in response to the request message. The control module 3411 activates the power saving class in accordance with the corresponding response message to perform conversion to the power saving mode.

Furthermore, if the control module 3411 maintains the power saving class configuration information, the control module 3411 maintains corresponding class configuration information in accordance with the triggering information. At this time, the radio communication module 3407 transmits a request message for activation of the maintained power saving class to the second base station, and receives a response message from the second base station in response to the request message. The control module 3411 activates the power saving class in accordance with the corresponding response message to perform conversion to the power saving mode.

Meanwhile, examples of the user mobile station according to the present invention include personal digital assistant (PDA), cellular phone, personal communication service (PCS) phone, global system for mobile (GSM) phone, wideband CDMA (WCDMA) phone, and mobile broadband system (MBS) phone.

According to one embodiment of the present invention, if the management message required for the network entry procedure is not exchanged with another one within a suitable time period in the procedure of performing the network entry procedure of the mobile station, the definite operation is defined to perform the normal operation between the mobile station and the base station.

According to another embodiment of the present invention, the backoff window value for initial ranging of the mobile station during restart of the base station is defined differently from the backoff window value for initial ranging during spontaneous network entry of the mobile station to minimize network entry collision between the mobile stations, which may occur during restart of the base station. Furthermore, during initial ranging backoff due to restart of the base station, different initial ranging backoff parameters are set depending on the operation modes of the mobile stations, so that the mobile station in normal mode expedites initial network entry depending on the initial ranging backoff parameter set values as compared with the sleep mode or the idle mode, and the base station appropriately disperses initial ranging tries of the mobile stations.

According to another embodiment of the present invention, since a means for releasing/maintaining/updating the power saving class deactivated for handover in the first base station after handover to the second base station is provided, it is possible to control the mobile station so as to operate the mobile station in the most efficient power saving mode depending on the network status during handover. Also, it is possible to prevent repeated procedures from being performed to perform conversion to the power saving mode in the second base station which is newly entered.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system such as a wireless Internet system and a mobile communication system.

The invention claimed is:

1. A method of performing handover of a mobile station in a power saving mode and controlling power saving class configuration information of a first base station during handover from the first base station to a second base station, the method comprising:
   transmitting a first ranging request message for network entry from the mobile station to the second base station;
   receiving a first ranging response message from the second base station, the first ranging response message including first control information of the power saving class configuration information of the first base station;
   processing the power saving class configuration information of the first base station according to the first control information;
   transmitting a request message for activation of an updated power saving class from the mobile station to the second base station;
   receiving, from the second base station, a response message to the request message;
   activating the updated power saving class according to the response message; and
   performing conversion to the power saving mode,
   wherein the first control information includes a power saving class update indication and a power saving class parameter, the power saving class update indication indicating an update of the power saving class configuration information of the first base station and the power saving class parameter corresponding to a new power saving class configuration information to be updated, wherein the mobile station updates existing power saving class configuration information to the power saving class parameter included in the first control information, and wherein an item of the existing power saving class configuration information, which is not updated, is released.

2. The method of claim 1, further comprising:

canceling handover to the second base station and performing re-entry to the first base station;

transmitting a second ranging request message for network re-entry to the first base station;

receiving a second ranging response message from the first base station, the second ranging response message including second control information of the power saving class configuration information of the first base station; and processing the power saving class configuration information of the first base station according to the second control information.

3. A method of performing handover of a mobile station in a power saving mode and controlling power saving class configuration information of the mobile station during handover from a first base station to a second base station, the method comprising:

receiving a ranging request message for network entry to the second base station from the mobile station;

transmitting a ranging response message to the mobile station, the ranging response message including control information of the power saving class configuration information of the first base station;

receiving a request message for activation of an updated power saving class from the mobile station; and transmitting, to the mobile station, a response message to the request message for activating the updated power saving class, wherein the control information includes a power saving class update indication and a power saving class parameter, the power saving class update indication indicating an update of the power saving class configuration information of the first base station and the power saving class parameter corresponding to a new power saving class configuration information to be updated, wherein the mobile station updates existing power saving class configuration information to the power saving class parameter included in the control information, and wherein an item of the existing power saving class configuration information, which is not updated, is released.

* * * * *